US012134027B2

(12) United States Patent
Hiura et al.

(10) Patent No.: US 12,134,027 B2
(45) Date of Patent: Nov. 5, 2024

(54) GAME MAT, INFORMATION PROCESSING APPARATUS, AND INFORMATION PROCESSING METHOD

(71) Applicant: SONY GROUP CORPORATION, Tokyo (JP)

(72) Inventors: Yuji Hiura, Kanagawa (JP); Hisanori Arai, Tokyo (JP); Masahiro Sueyoshi, Tokyo (JP); Junya Matsui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 58 days.

(21) Appl. No.: 17/776,861

(22) PCT Filed: Nov. 9, 2020

(86) PCT No.: PCT/JP2020/041735
§ 371 (c)(1),
(2) Date: May 13, 2022

(87) PCT Pub. No.: WO2021/100517
PCT Pub. Date: May 27, 2021

(65) Prior Publication Data
US 2023/0356072 A1    Nov. 9, 2023

(30) Foreign Application Priority Data
Nov. 22, 2019  (JP) .................. 2019-211521

(51) Int. Cl.
*A63F 13/214*    (2014.01)
*A63F 13/235*    (2014.01)
(Continued)

(52) U.S. Cl.
CPC .......... *A63F 13/214* (2014.09); *A63F 13/235* (2014.09); *A63F 13/79* (2014.09); *A63F 13/95* (2014.09)

(58) Field of Classification Search
CPC ....... A63F 13/214; A63F 13/235; A63F 13/98
See application file for complete search history.

(56) References Cited

U.S. PATENT DOCUMENTS 10,688,378 B2 *   6/2020  Aman .................... G06F 3/011
10,758,828 B1 *   9/2020  Howell .................. A63F 13/63
(Continued)

FOREIGN PATENT DOCUMENTS

JP    2005-276086 A    10/2005
JP    2009-006131 A     1/2009
(Continued)

*Primary Examiner* — Chase E Leichliter
(74) *Attorney, Agent, or Firm* — Paratus Law Group, PLLC

(57) ABSTRACT

A game mat according to an aspect of the present technology is a mat including: a mobile terminal antenna that receives a radio wave output by a reader/writer of a mobile terminal that communicates with a server that manages a game using an IC card; an IC card antenna that communicates with the IC card including an IC chip for an IC card in which reading/writing of data is performed contactlessly by a command transmitted from the reader/writer; a memory that stores a mat ID, which is identification information of a mat; and an internal IC chip that receives a command transmitted from the reader/writer and stores, into the memory in association with the mat ID, information regarding the game transmitted from the server. The present technology can be applied to a play mat of a card game using a smartphone having an NFC function and an IC card.

18 Claims, 48 Drawing Sheets

(51) Int. Cl.
*A63F 13/79* (2014.01)
*A63F 13/95* (2014.01)

(56) References Cited

U.S. PATENT DOCUMENTS

| | | | | |
|---|---|---|---|---|
| 11,383,172 | B1* | 7/2022 | Howell | G10H 1/0025 |
| 2010/0032900 | A1* | 2/2010 | Wilm | A63F 3/00643 |
| | | | | 273/237 |
| 2012/0077593 | A1* | 3/2012 | Sarmenta | A63F 13/98 |
| | | | | 463/40 |
| 2014/0038720 | A1* | 2/2014 | Reeskamp | A63F 13/24 |
| | | | | 463/40 |
| 2014/0094312 | A1* | 4/2014 | Wouhaybi | A63F 3/00006 |
| | | | | 463/42 |
| 2015/0328541 | A1* | 11/2015 | Van Haaften | A63F 1/02 |
| | | | | 463/42 |
| 2016/0310832 | A1* | 10/2016 | Dandamudi | A63F 13/235 |
| 2017/0120140 | A1* | 5/2017 | Lee | A63F 3/00006 |
| 2017/0186411 | A1* | 6/2017 | Mintz | A63F 9/24 |
| 2018/0178113 | A1* | 6/2018 | Knippen | A63F 3/02 |
| 2018/0256971 | A1* | 9/2018 | Tsuda | G06F 3/0488 |
| 2019/0009168 | A1 | 1/2019 | Aman et al. | |
| 2020/0009454 | A1* | 1/2020 | Kaiho | H04B 5/72 |
| 2020/0282297 | A1* | 9/2020 | Mehta | A63F 3/00643 |
| 2020/0384354 | A1* | 12/2020 | Miki | A63F 13/245 |
| 2020/0391100 | A1* | 12/2020 | Fujimoto | A63F 1/18 |
| 2023/0356072 | A1* | 11/2023 | Hiura | G06K 17/00 |

FOREIGN PATENT DOCUMENTS

| | | |
|---|---|---|
| JP | 2010-069207 A | 4/2010 |
| JP | 2012-178067 A | 9/2012 |
| JP | 2013-192855 A | 9/2013 |

* cited by examiner

GAME MAT, INFORMATION PROCESSING APPARATUS, AND INFORMATION PROCESSING METHOD

CROSS REFERENCE TO PRIOR APPLICATION

This application is a National Stage Patent Application of PCT International Patent Application No. PCT/JP2020/041735 (filed on Nov. 9, 2020) under 35 U.S.C. § 371, which claims priority to Japanese Patent Application No. 2019-211521 (filed on Nov. 22, 2019), which are all hereby incorporated by reference in their entirety.

TECHNICAL FIELD

The present technology particularly relates to a game mat, an information processing apparatus, and an information processing method that can manage information regarding a game played using cards, in association with a mat ID of a mat serving as a storage space of the cards.

BACKGROUND ART

In the online game using a smartphone, rewarding, setting of a difficulty level of the game, saving of an execution history, and the like are performed in association with the user account. By managing the information indicating the reward amount, the difficulty level of the game, and the execution history in association with the information on the user account, the server can customize and provide the mode of the game for each user.

Patent Document 1 describes a trading card game using a contactless IC tag. The user can play the trading card game by placing a card on the card reading sheet equipped with a reading apparatus.

CITATION LIST

Patent Document

Patent Document 1: Japanese Patent Application Laid-Open No. 2005-276086

SUMMARY OF THE INVENTION

Problems to be Solved by the Invention

In the technology described in Patent Document 1, it is possible to provide the user with an experience of playing a game using cards in a real space, but it is not possible to customize modes of the game such as a character, a scene, and a flow of a story as in an online game using a smartphone.

The present technology has been made in view of such a situation, and an object thereof is to be able to manage information regarding a game played using cards in association with a mat ID of a mat serving as a storage space of the cards.

Solutions to Problems

A game mat according to a first aspect of the present technology includes: a mobile terminal antenna that receives a radio wave output by a reader/writer of a mobile terminal that communicates with a server that manages a game using an IC card; an IC card antenna that communicates with the IC card including an IC chip for an IC card in which reading/writing of data is performed contactlessly by a command transmitted from the reader/writer; a memory that stores a mat ID, which is identification information of a mat; and an internal IC chip that receives a command transmitted from the reader/writer and stores, into the memory in association with the mat ID, information regarding the game transmitted from the server.

An information processing apparatus according to a second aspect of the present technology includes: a communication unit that transmits information regarding a game using an IC card to a mobile terminal equipped with a reader/writer placed on a game mat including a mobile terminal antenna that receives a radio wave output by the reader/writer of the mobile terminal that communicates with a server that manages a game using the IC card, an IC card antenna that communicates with the IC card including an IC chip for an IC card in which reading/writing of data is performed contactlessly by a command transmitted from the reader/writer, a memory that stores a mat ID, which is identification information of a mat, and an internal IC chip; and a control unit that stores information regarding the game in the internal IC chip of the game mat in association with the mat ID.

In the present technology, information regarding the game generated by the server is stored in association with the mat ID.

MODE FOR CARRYING OUT THE INVENTION

Figure 1:
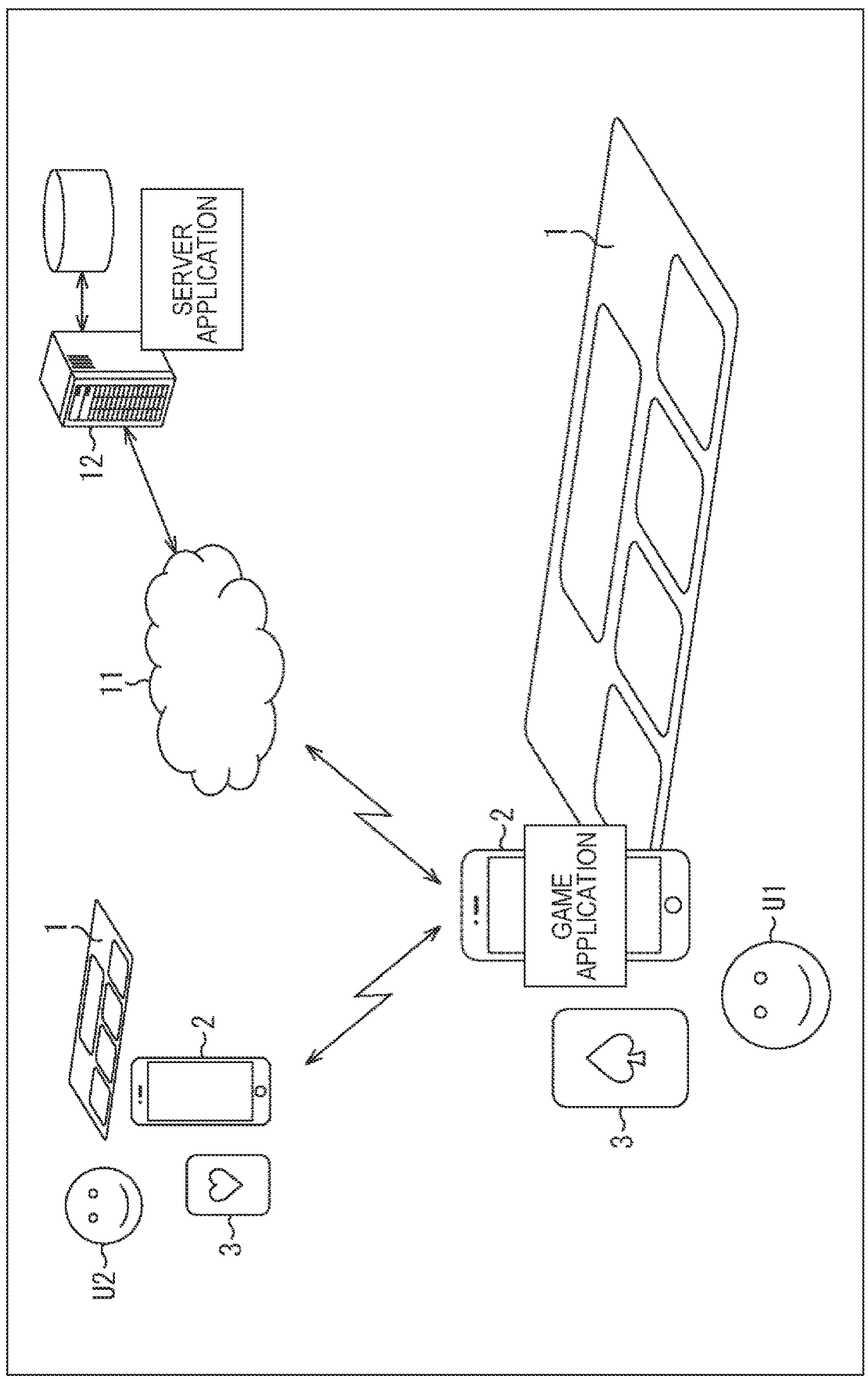
FIG. 1 is a view showing a configuration example of a game system according to an embodiment of the present technology.

Modes for carrying out the present technology will be described below. The description will be given in the following order.

1. Game system
2. Play mat configuration
3. Flow of basic processing using play mat
4. Application example
5. Flow of card game
6. Configuration of each apparatus
7. Others <<Game System>>
<System Configuration>

FIG. 1 is a view showing a configuration example of a game system according to an embodiment of the present technology.

A game played in the game system of FIG. 1 is a so-called card game played by a plurality of users playing cards in hand at a determined place.

The card game is played, for example, by a plurality of users in a state where a play mat 1, a smartphone 2, and a card 3 are prepared. In the example of FIG. 1, the play mat 1, the smartphone 2, and the card 3 are prepared by each of two users, a user U1 and a user U2.

The play mat 1 is a game mat used as a field of the card game using the card 3. The play mat 1 includes a thin material having flexibility, for example. The user can roll up and carry the play mat 1 and unfold the play mat 1 to a desired place.

The smartphone 2 is a mobile terminal in which a game application that is an application for playing the card game is installed. The smartphone 2 executes the game application and performs various types of processing according to a user's operation. Other apparatuses such as a tablet terminal and a PC may be used instead of the smartphone 2.

The card 3 is a card prepared for the card game. On the surface of the card 3, an illustration of a character or the like, an explanation of the ability of the character, and the like are printed. In the example of FIG. 1, one card is illustrated as the card 3 of each user, but the card game is appropriately played using a plurality of cards.

As indicated by a bidirectional arrow, the smartphone 2 of the user U1 and the smartphone 2 of the user U2 communicate with each other via near-field wireless communication such as Bluetooth (trademark) or a wireless LAN, or via a network 11 such as the Internet.

In the game system of FIG. 1, a game management server 12, which is an information processing apparatus that manages the card game is prepared. The game management server 12 executes a server application and communicates with the smartphone 2 via the network 11, thereby managing the progress of the card game.

Figure 2:
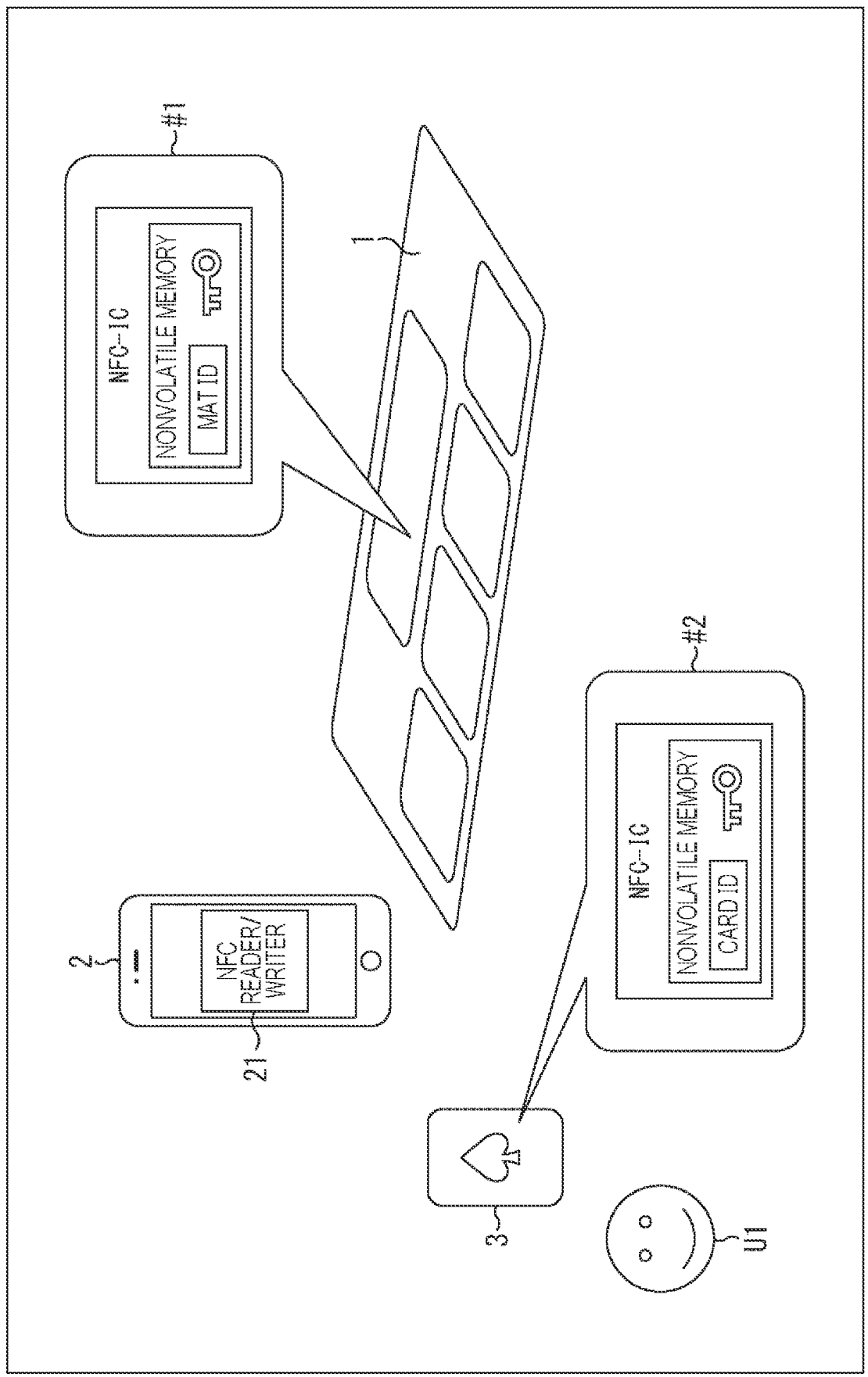
FIG. 2 is a view showing an example of a module equipped on each tool.

FIG. 2 is a view showing an example of a module equipped on each tool.

As shown in FIG. 2, the smartphone 2 is equipped with an NFC reader/writer 21, which is a reader/writer of NFC communication of a predetermined standard.

On the other hand, as shown in a balloon #1, the play mat 1 is provided with an NFC IC having a function of NFC communication (near-field wireless communication) of a predetermined standard. Furthermore, as shown in a balloon #2, the card 3 is provided with an NFC IC having a function of NFC communication of the same standard as the play mat 1.

As the NFC ICs of the play mat 1 and the card 3, for example, an IC chip compatible with the standard of FeliCa (registered trademark) can be used.

The NFC ICs provided in the play mat 1 and the card 3 are IC chips that perform NFC communication with an external reader/writer including the NFC reader/writer 21 and read and write data according to a command transmitted by the reader/writer. Hereinafter, the NFC IC is also appropriately referred to as an IC chip.

The IC chip is provided with a nonvolatile memory. The nonvolatile memory stores various types of information such as identification information of an IC chip and an encryption key used for encryption/decryption of data.

The identification information stored in the nonvolatile memory of the IC chip provided in the play mat 1 serves as a mat ID for identifying the play mat 1. On the other hand, the identification information stored in the nonvolatile memory of the IC chip provided in the card 3 serves as a card ID for identifying the card 3.

Figure 3:
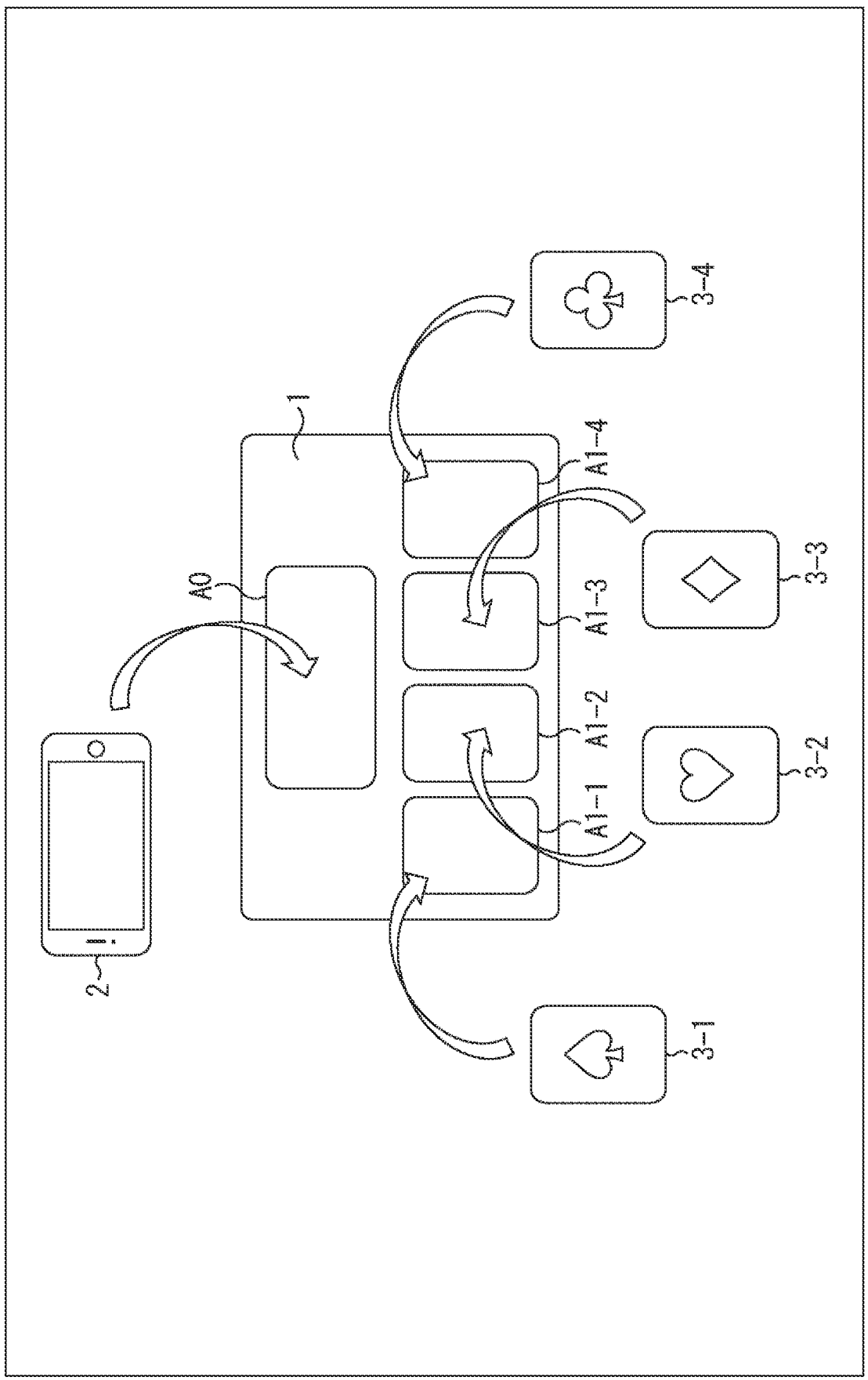
FIG. 3 is a view showing an example of arrangement of each tool in a case where a card game is played.

FIG. 3 is a view showing an example of arrangement of each tool in a case where the card game is played.

As shown in FIG. 3, a plurality of sections of a section A0 and sections A1-1 to A1-4 is formed on the play mat 1. Each section is formed by printing a rectangular section on the surface of the play mat 1, for example.

The section A0 is a place for placing the smartphone 2. Furthermore, the sections A1-1 to A1-4 are places for placing the card 3.

As described later, a smartphone antenna is disposed on the back side of the section A0. The smartphone antenna is an antenna for receiving radio waves output from the NFC reader/writer 21 equipped on the smartphone 2 and communicating with the NFC reader/writer 21.

Furthermore, an IC card antenna is disposed on the back side of each of the sections A1-1 to A1-4. The IC card antenna is an antenna for performing communication with the IC card.

Thus, the play mat 1 is an apparatus having one antenna as an antenna for the smartphone 2 and a plurality of antennas as antennas for the card 3.

As indicated by a white arrow, the card game is played in a state where the smartphone 2 is placed in the section A0 and the card 3 is placed in each of the sections A1-1 to A1-4. The card game is sometimes played by holding the smartphone 2 or the card 3 over each section instead of placing it.

In the example of FIG. 3, cards 3-1 to 3-4 are placed in the sections A1-1 to A1-4, respectively. At least one card 3 is placed in any of the sections A1-1 to A1-4.

A command transmitted from the NFC reader/writer 21 in a state where a tool is placed in each section is received by the smartphone antenna of the play mat 1, and is executed in an internal IC chip in a case where the internal IC chip of the play mat 1 is designated as the transmission destination.

A response to the command is transmitted from the smartphone antenna of the play mat 1 to the NFC reader/writer 21. The response from the internal IC chip of the play mat 1 includes a mat ID, for example.

Furthermore, the command transmitted from the NFC reader/writer 21 is received by the smartphone antenna of the play mat 1, and in a case where the card 3 (IC chip of the card 3) is designated as the transmission destination, the command is transmitted from the IC card antenna to the card 3 designated as the transmission destination. In the card 3 that has received the command, the command is executed, and a response to the command is transmitted to the play mat 1.

The response transmitted from the card 3 is received by the IC card antenna of the play mat 1 and transmitted from the smartphone antenna to the NFC reader/writer 21. The response from the card 3 includes a card ID, for example.

Thus, the play mat 1 has not only a function of performing the NFC communication with the NFC reader/writer 21 and executing the command from the NFC reader/writer 21 by itself but also a function of relaying the NFC communication between the NFC reader/writer 21 and the card 3.

The play mat 1 itself is identified by the game application of the smartphone 2 on the basis of the mat ID included in the response from the card 3. Furthermore, the card 3 placed on the play mat 1 is identified by the game application of the smartphone 2 on the basis of the card ID included in the response from the card 3.

Figure 4:
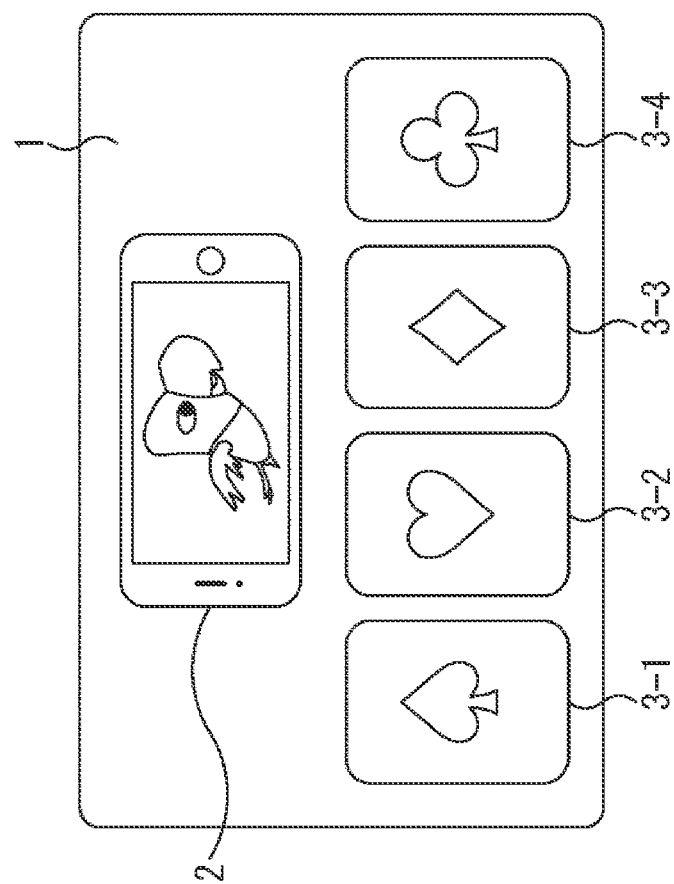
FIG. 4 is a view showing an example of how to play a card game.

In the game application, the card game is played as shown in FIG. 4, for example, according to the play mat 1 and the card 3 placed on the play mat 1.

In the example of FIG. 4, a character is displayed on the display of the smartphone 2 in response to the cards 3-1 to 3-4 being placed on the play mat 1. The card game is played among a plurality of users by causing characters displayed when the card 3 is placed on the play mat 1 to battle with one another.

As described in detail later, in the game system of FIG. 1, various types of information regarding the card game are managed in association with the mat ID.

<Battle Method>

Figure 5:
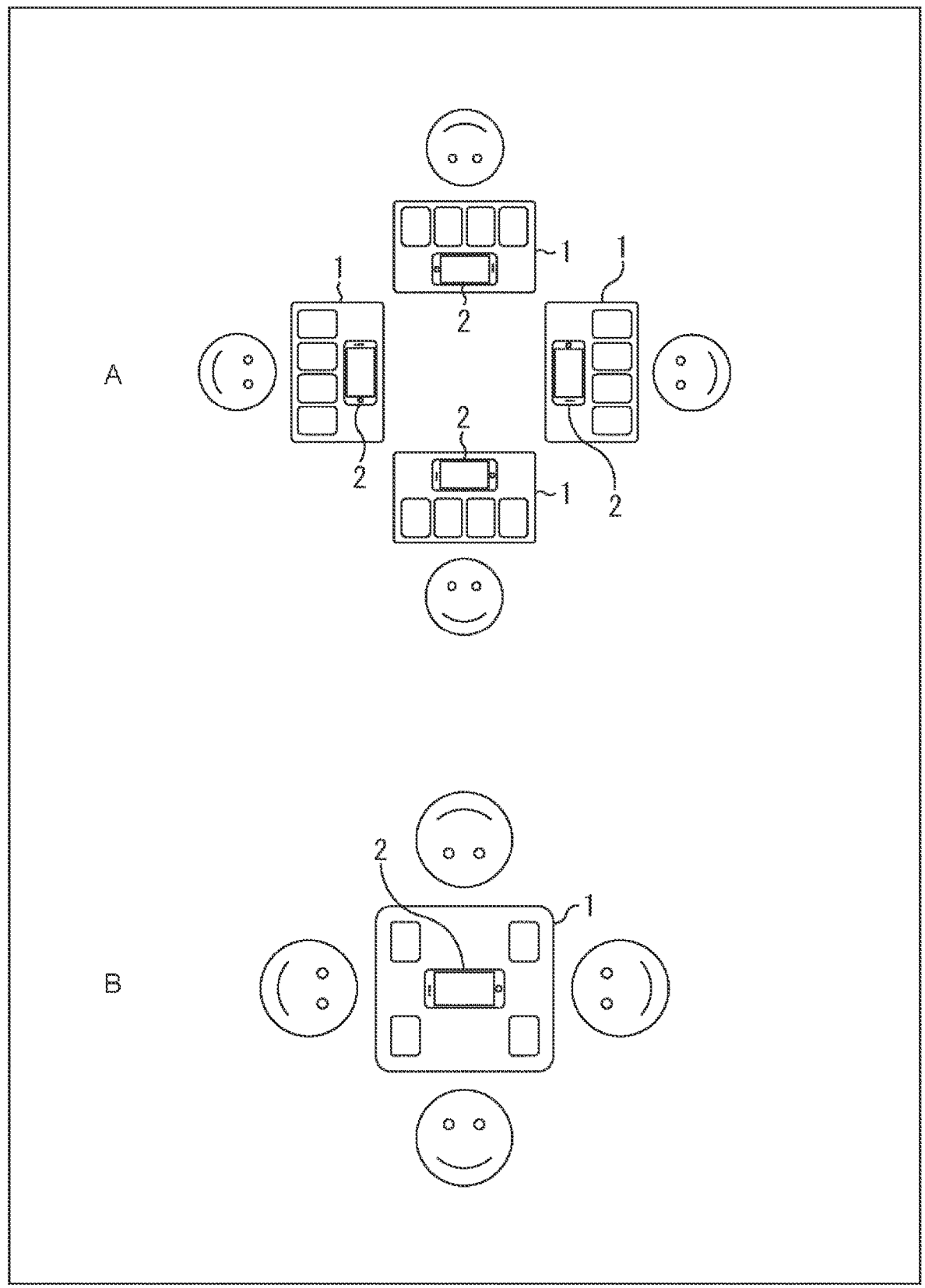
FIG. 5 is a view showing an example of a battle method of a card game.
Figure 6:
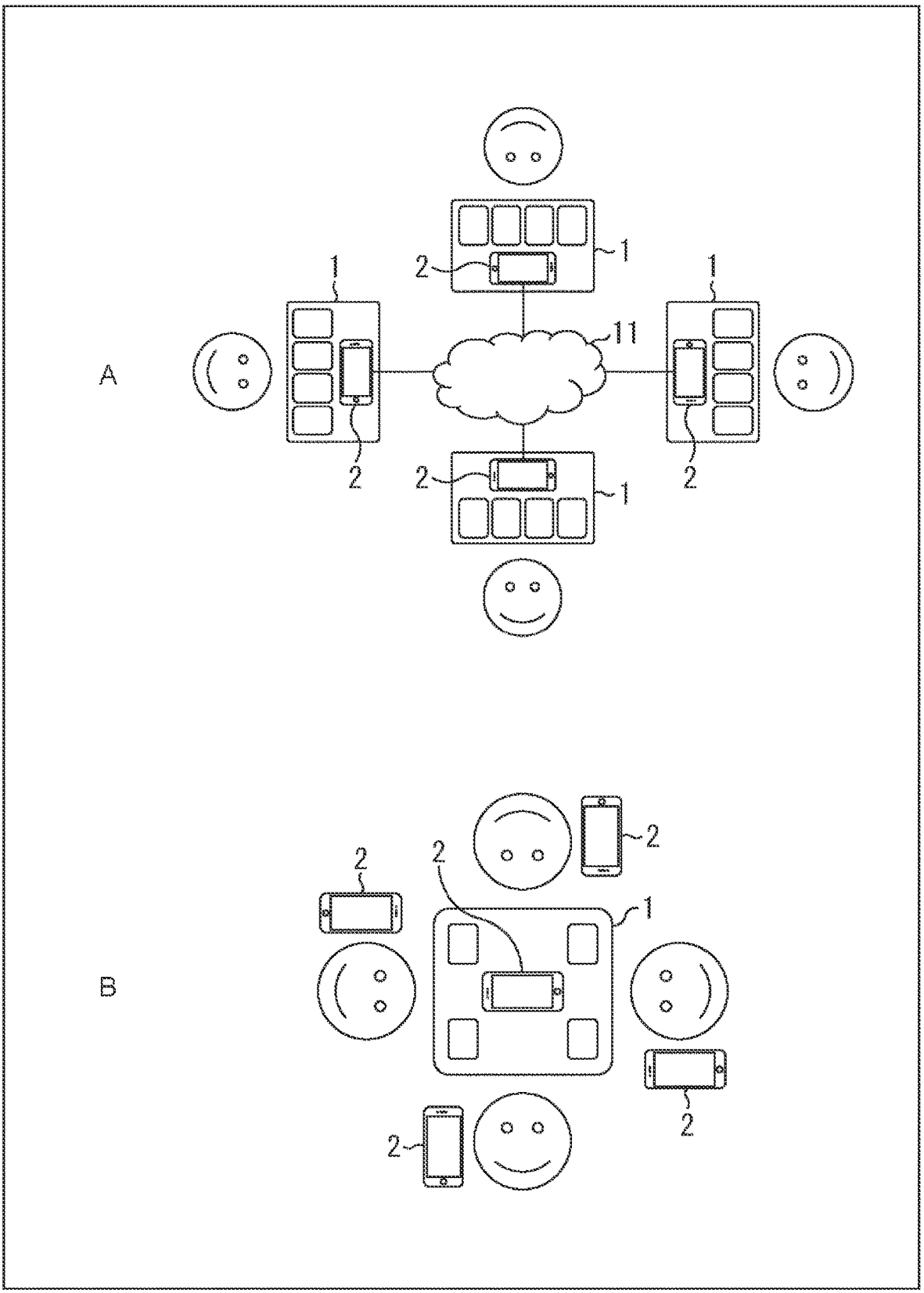
FIG. 6 is a view showing an example of a battle method of a card game.

FIGS. 5 and 6 are views showing an example of the battle method of a card game.

The battle method shown in A of FIG. 5 uses individual mats (Own Mat Method).

The battle in Own Mat Method is played in a state where the plurality of users each prepares their own play mat 1 and smartphone 2. The smartphone 2 is placed on the play mat 1 of each user. In this case, each user brings his/her own play mat 1 and smartphone 2 to the place of the venue and plays the card game.

The battle method shown in B of FIG. 5 uses a mat in the center of the players (Center Mat Method).

The battle in Center Mat Method is played using one play mat 1 and one smartphone 2. For example, the play mat 1 and the smartphone 2 of one user serving as a leader are used.

The battle method shown in A of FIG. 6 uses mats in remote places.

The battle using mats in remote places is played in a state where a plurality of users at distant places each prepares his/her own play mat 1 and smartphone 2. The smartphone 2 is placed on the play mat 1 of each user. The individual smartphones 2 perform communication via the network 11.

The battle method shown in B of FIG. 6 uses hybrid mats.

The battle using hybrid mats is played by each of the plurality of users operating the smartphone 2 in a state where one smartphone 2 is placed on one play mat 1. Information common to all the users is displayed on the display of the smartphone 2 placed on the play mat 1, and a screen for each user is displayed on the display of the smartphone 2 held by each user.

Thus, the user can play the card game in various battle methods.

<Game Management Information>

Figure 7:
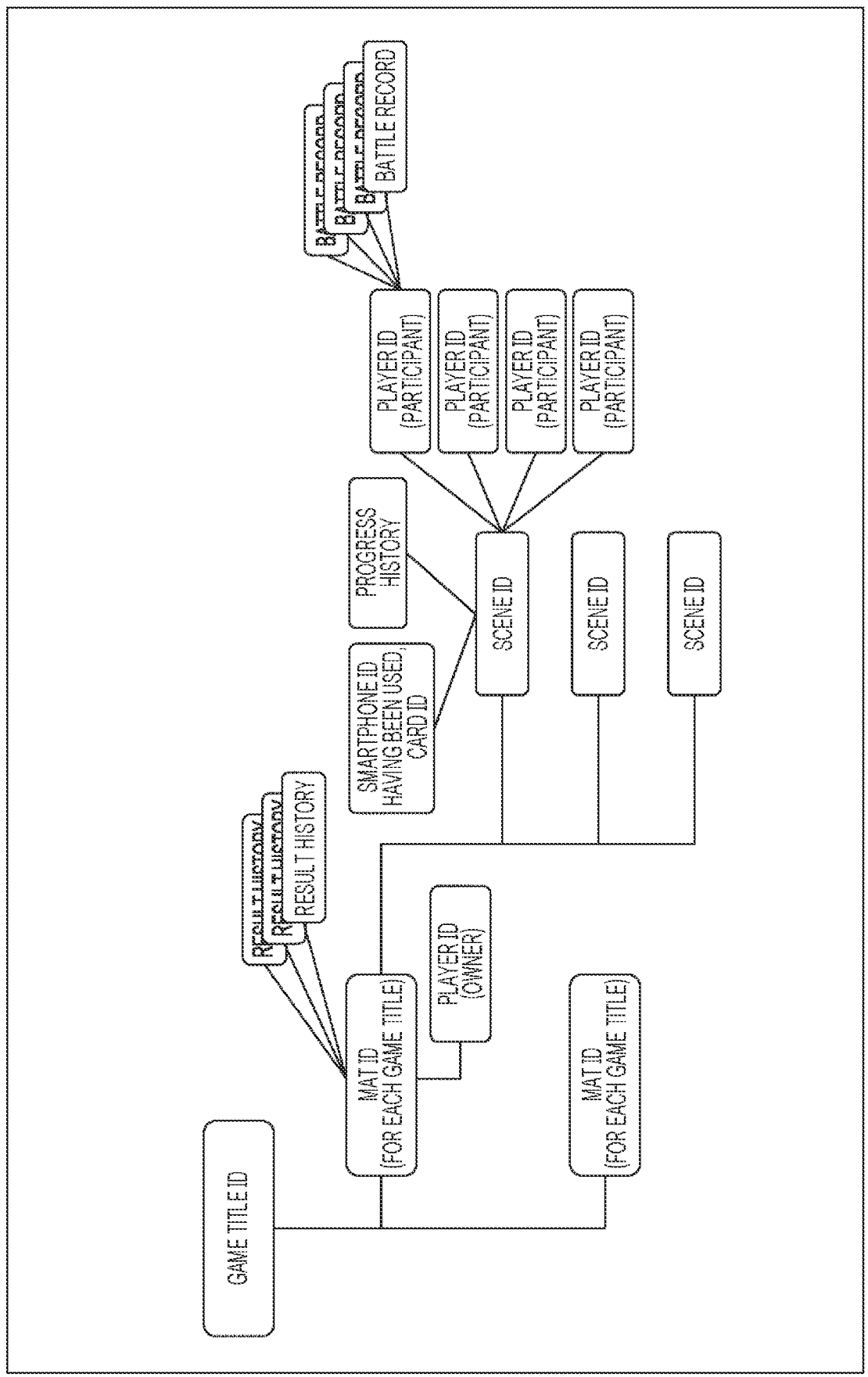
FIG. 7 is a view showing an example of a data structure of game management information.

FIG. 7 is a view showing an example of the data structure of game management information.

The game management information is information for managing various types of information regarding the card game in association with the mat ID.

As shown in FIG. 7, the mat ID is associated with a game title ID. The game title ID is an ID of the title of the card game. In the game system of FIG. 1, a plurality of types of card games is prepared.

In a case where the card game is played using the play mat 1, the mat ID of the play mat 1 used for the card game is associated with the game title ID of the card game.

A player ID of the owner of the play mat 1 is associated with the mat ID, and a result history is associated with the mat ID. A result of the card game played using the play mat 1 is stored as a result history in association with the mat ID of the play mat 1.

Furthermore, a scene ID is associated with the mat ID. The scene ID is an ID of a scene during the card game. A plurality of scenes such as a stage is set in the card game. The ID of the scene of the card game played using the play mat 1 is associated with the mat ID of the play mat 1.

The scene ID is associated with the ID of the smartphone 2 used in the card game and the card ID of the card 3. Furthermore, a progress history and the player ID, which is the ID of the participant, are associated with the scene ID. The player ID of the participant is associated with a battle record of each participant.

On the basis of the game information having such a data structure, the type of the card game played using the play mat 1, the owner of the play mat 1, the scene of the card game played using the play mat 1, the participants, and the like are specified.

Figure 8:
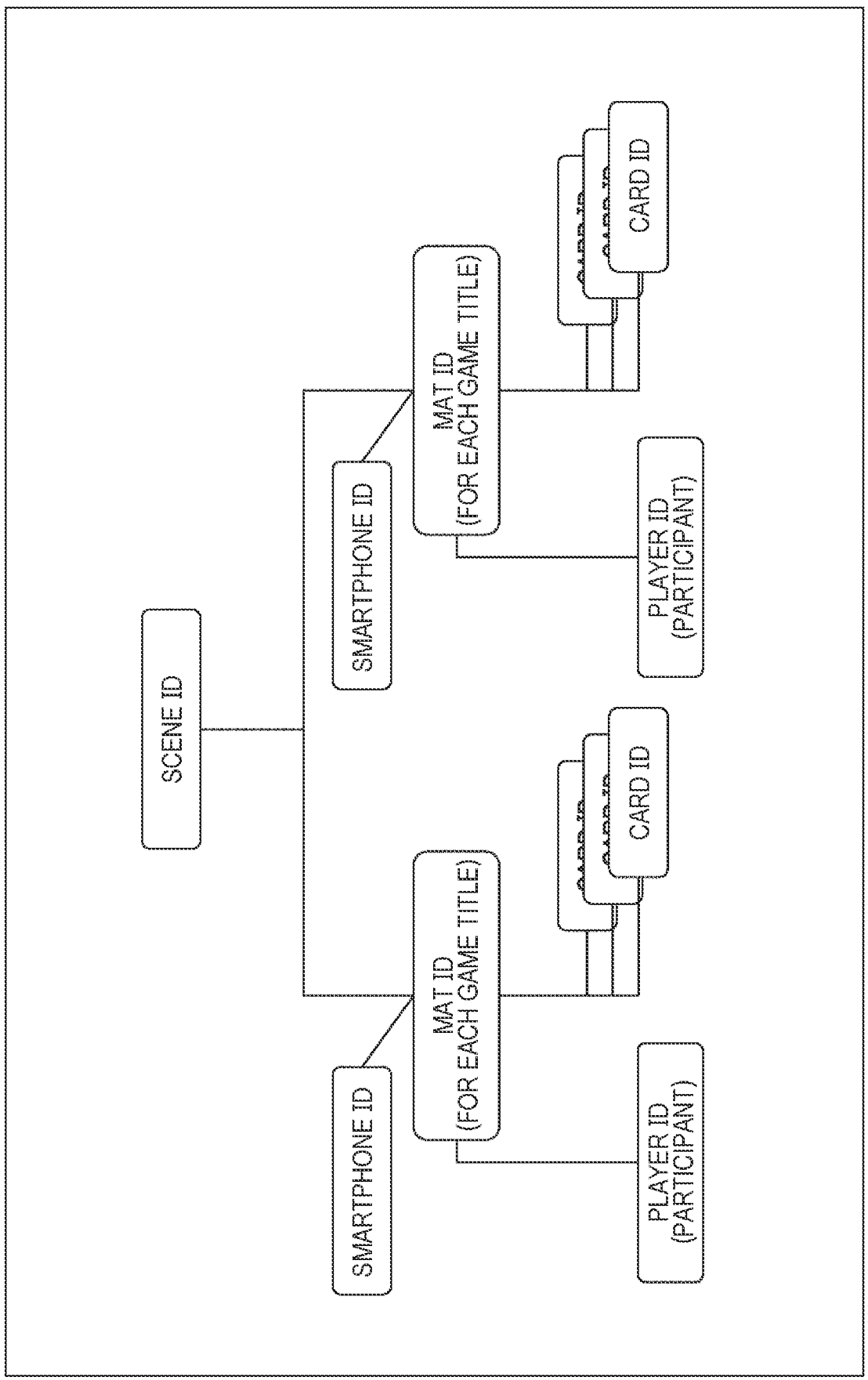
FIG. 8 is a view showing an example of another data structure of game management information.

FIG. 8 is a view showing an example of another data structure of game management information.

In the example of FIG. 8, a plurality of mat IDs is associated with one scene ID.

The mat ID is associated with the smartphone ID and the player ID of the participant. Furthermore, a card ID is associated with the mat ID.

For example, in a case where each user prepares one play mat 1 and one smartphone 2 and plays the card game by Own Mat Method in A of FIG. 5, the ID of the smartphone 2 used in the card game and the player ID of the participating user are associated with the mat ID of each play mat 1.

Figure 9:
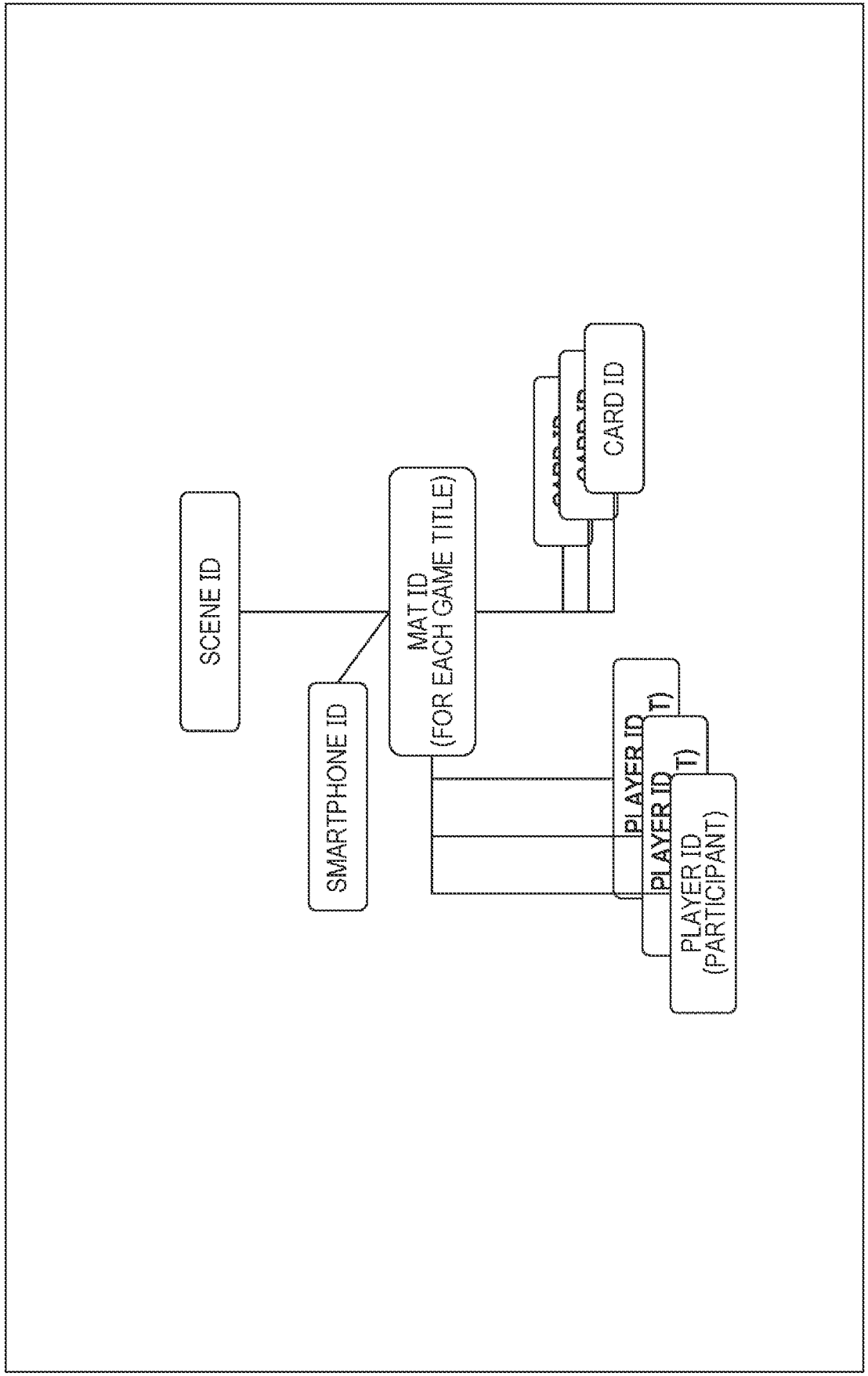
FIG. 9 is a view showing an example of still another data structure of game management information.

FIG. 9 is a view showing an example of still another data structure of game management information.

In the example of FIG. 9, one mat ID is associated with one scene ID.

The mat ID is associated with the smartphone ID and the player ID of the participant. Furthermore, a card ID is associated with the mat ID.

For example, in a case where a plurality of users plays the card game using one play mat 1 by Center Mat Method in B of FIG. 5, the player ID of the participating user is associated with the mat ID of the play mat 1.

Figure 10:
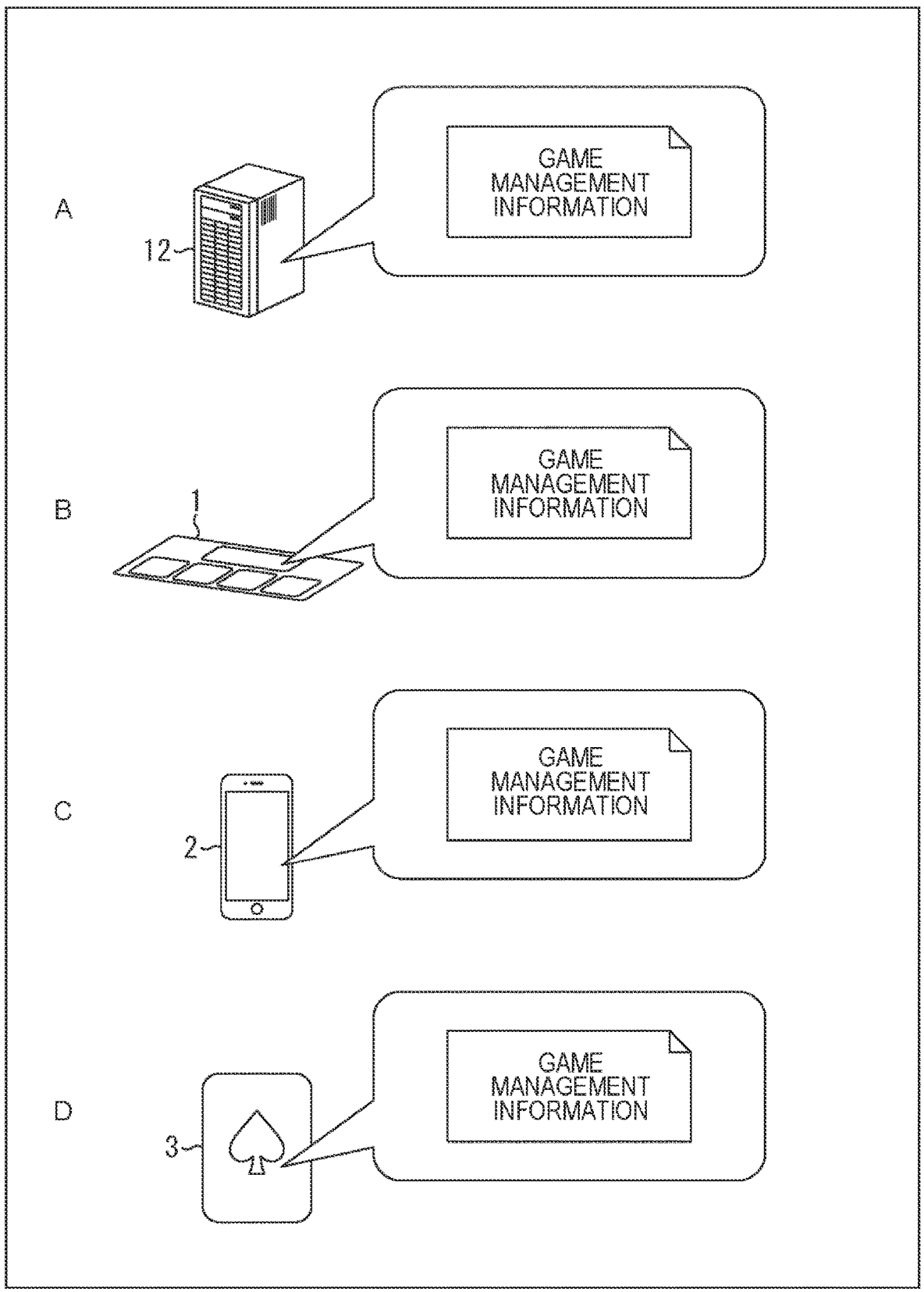
FIG. 10 is a view showing an example of a storage space of game management information.

FIG. 10 is a view showing an example of the storage space of game management information.

As shown in FIG. 10, the game management information having the data structure as described above is managed in any of the game management server 12, the play mat 1, the smartphone 2, and the card 3.

In the play mat 1, the game management information is stored in the IC chip of the play mat 1. Writing of the game management information into the IC chip of the play mat 1 is performed according to a command transmitted from the NFC reader/writer 21 of the smartphone 2. The information to be stored in the IC chip as the game management information is appropriately generated by the game management server 12.

In the smartphone 2, the game management information is stored in a built-in memory of the smartphone 2 or an external memory attached to the smartphone 2.

In the card 3, the game management information is stored in the IC chip of the card 3. Writing of the game management information into the IC chip of the card 3 is also performed according to the command transmitted from the NFC reader/writer 21 of the smartphone 2.

All pieces of information constituting the game management information may be stored in a dispersing manner in a plurality of apparatuses instead of being stored in one place.

<<Play Mat Configuration>>

Figure 11:
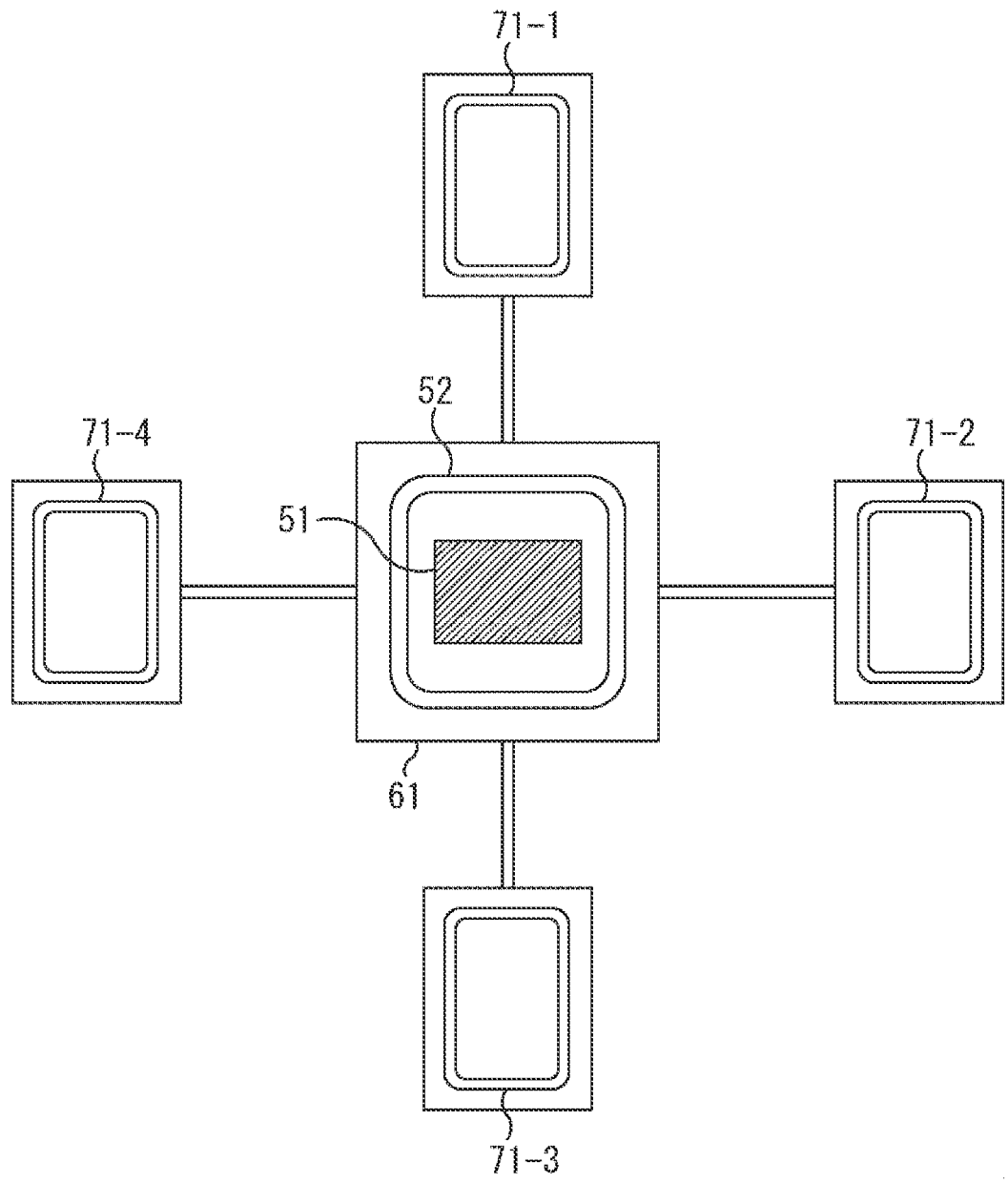
FIG. 11 is a view showing an electric configuration example of a play mat.

FIG. 11 is a view showing an electric configuration example of the play mat 1.

As shown in FIG. 11, the play mat 1 includes IC card antennas 71-1 to 71-4 connected to a substrate 61 on which a control circuit 51 and a smartphone antenna 52 are formed.

The substrate 61 is provided at a position corresponding to the section A0. Members such as sheets on which the IC card antennas 71-1 to 71-4 are disposed are provided at positions corresponding to the sections A1-1 to A1-4, respectively.

Figure 12:
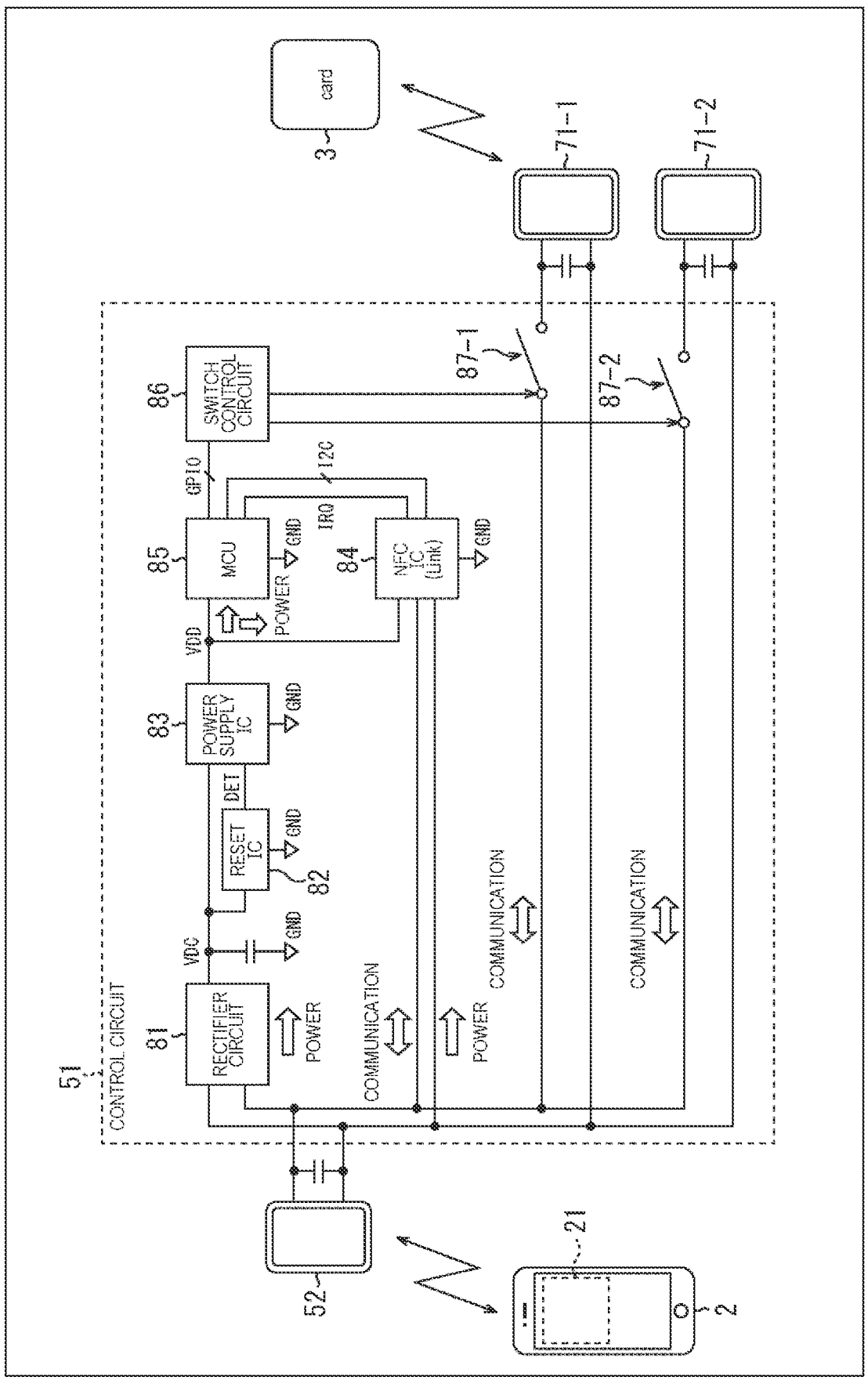
FIG. 12 is a view showing a configuration example of a control circuit.

FIG. 12 is a view showing a configuration example of the control circuit 51.

As shown in FIG. 12, the smartphone antenna 52 and the IC card antennas 71-1 and 71-2 are connected to the control circuit 51.

In the example of FIG. 12, only the IC card antenna 71-1 and the IC card antenna 71-2 are shown as antennas for the card 3, but the IC card antenna 71-3 and the IC card antenna 71-4 are similarly connected to the control circuit 51. As the IC card antenna, five or more antennas may be provided.

In the example of FIG. 12, the card 3 is held over the IC card antenna 71-1. The card 3 may be held over the IC card antenna 71-2, or two of the cards 3 may be held over each of the IC card antenna 71-1 and the IC card antenna 71-2.

The control circuit 51 includes a rectifier circuit 81, a reset IC 82, a power supply IC 83, an NFC IC 84, a micro controller unit (MCU) 85, a switch control circuit 86, and switches 87-1 and 87-2. The smartphone antenna 52 is connected to the rectifier circuit 81 and the NFC IC 84. Furthermore, the smartphone antenna 52 is connected to the IC card antenna 71-1 via the switch 87-1, and is connected to the IC card antenna 71-2 via the switch 87-2.

The rectifier circuit 81 generates direct-current voltage (VDC) in response to the smartphone antenna 52 receiving a radio wave output from the NFC reader/writer 21 equipped on the smartphone 2. The VDC generated by the rectifier circuit 81 is supplied to the reset IC 82 and the power supply IC 83.

The reset IC 82 monitors the VDC. The reset IC 82 starts the power supply IC 83 in a case where the VDC reaches a predetermined reset release voltage.

The power supply IC 83 supplies VDD generated on the basis of VDC to the NFC IC 84 and supplies the VDD to the MCU 85.

The NFC IC 84 is an IC chip provided inside the play mat 1. At the same time when the VDD is supplied from the power supply IC 83 to the NFC IC 84, power and a command signal corresponding to a carrier wave of 13.56 MHz, for example, are supplied from the smartphone antenna 52 to the NFC IC 84. The NFC IC 84 is started in response to the supply of VDD, and performs an operation according to the command supplied from the smartphone antenna 52.

For example, a Write command, which is a command representing enabling or disabling of the IC card antenna, is transmitted from the NFC reader/writer 21 of the smartphone 2. In a case where the Write command is received by the smartphone antenna 52, the NFC IC 84 writes the Write command into the memory in the NFC IC 84, and supplies the Write command to the MCU 85 via a bus of I2C. The NFC IC 84 functions as an internal IC chip of the play mat 1 that controls the operation of the MCU 85 on the basis of the Write command.

Note that the enabling of the IC card antenna means that a switch provided between the smartphone antenna 52 and the IC card antenna is turned on and the smartphone antenna 52 and the IC card antenna are short-circuited (electrically connected state). In a state where the IC card antenna is enabled, a signal transmitted from the NFC reader/writer 21 of the smartphone 2 and received by the smartphone antenna 52 is supplied to the IC card antenna. Conversely, a signal transmitted from the card 3 and received by the IC card antenna is supplied to the smartphone antenna 52.

Furthermore, the disabling of the IC card antenna means that a switch provided between the smartphone antenna 52 and the IC card antenna is turned off, and the smartphone antenna 52 and the IC card antenna are brought into an opened state (electrically disconnected state).

The MCU 85 controls a general-purpose input/output (GPIO) according to the content of the Write command supplied from the NFC IC 84. In FIG. 12, using two systems of GPIO, the MCU 85 causes the switch control circuit 86 to control each of the switches 87-1 and 87-2. The MCU 85 is a controller that switches on/off of each of the switches 87-1 and 87-2 according to the Write command and controls enabling or disabling of the IC card antenna. The Write command used here is a command used for switching the IC card antenna.

The switch control circuit 86 switches on/off of each of the switches 87-1 and 87-2 according to the control of the MCU 85. On/off of the switch can also be set for time. For example, it is possible to set the switch 87-1 to be turned on for 1 second and the switch 87-2 to be turned on for 5 seconds.

The switch 87-1 is provided between the smartphone antenna 52 and the IC card antenna 71-1. The switch 87-2 is provided between the smartphone antenna 52 and the IC card antenna 71-2.

Hereinafter, in a case where the switches 87-1 and 87-2 need not be distinguished, the switches are collectively referred to as a switch 87 appropriately. Other configurations provided in pairs will be similarly collectively described.

<<Flow of Basic Processing Using Play Mat>>

Here, a flow of basic processing using the play mat 1 having the above configuration will be described.

Figure 13:
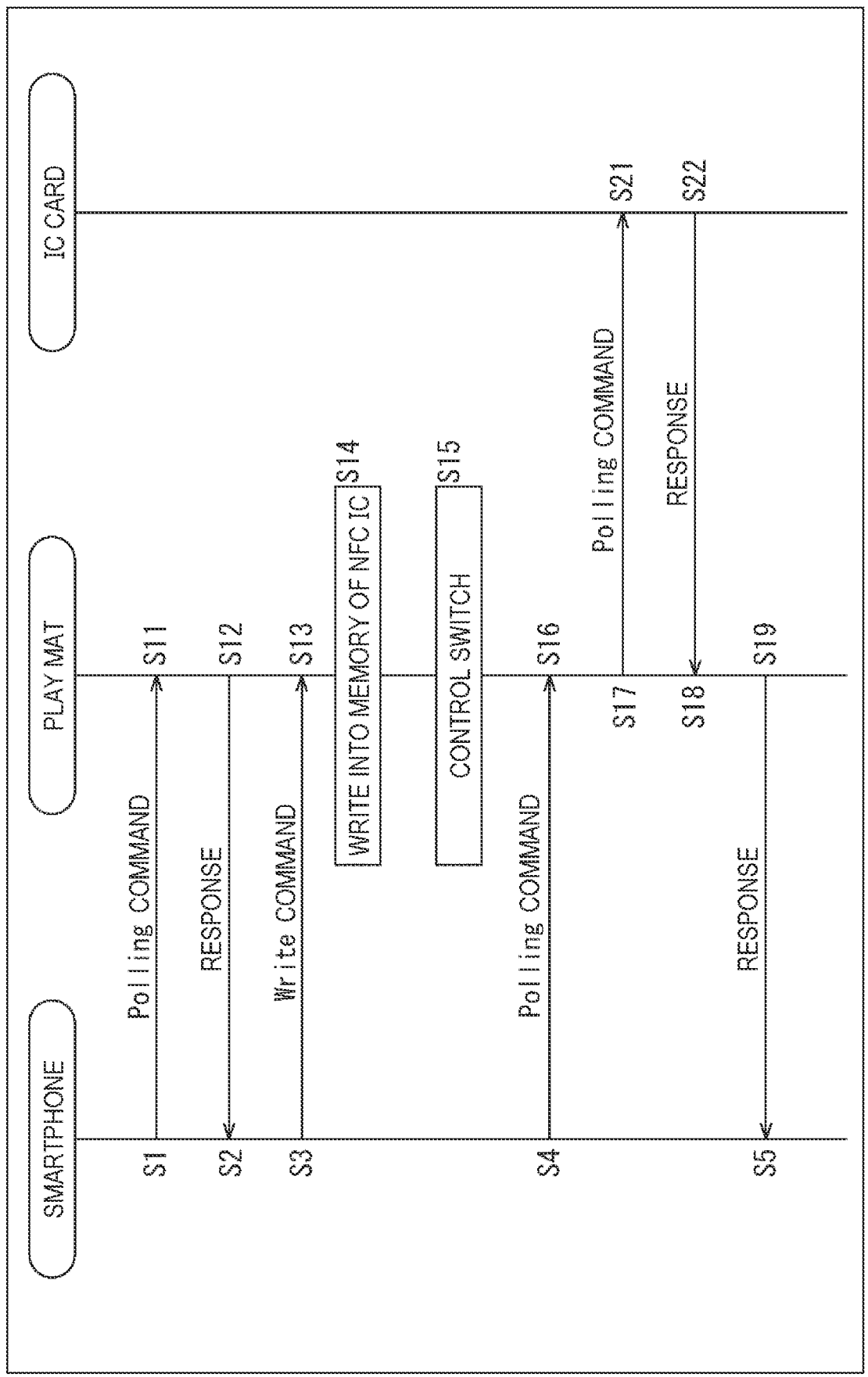
FIG. 13 is a sequence diagram showing a flow of basic processing.

FIG. 13 is a sequence diagram showing a flow of processing performed among the play mat 1, the smartphone 2, and the card 3.

The processing described with reference to FIG. 13 is started, for example, when the smartphone 2 is placed on the section A0 of the play mat 1 and the radio wave output from the NFC reader/writer 21 of the smartphone 2 is received by the smartphone antenna 52. Power generated in response to reception by the smartphone antenna 52 of the radio wave output from the NFC reader/writer 21 is supplied to each unit, whereby each unit of the play mat 1 is started.

In step S1, the NFC reader/writer 21 of the smartphone 2 transmits a Polling command, which is a command for making an inquiry.

In step S11, the smartphone antenna 52 of the play mat 1 receives the Polling command transmitted from the NFC reader/writer 21 of the smartphone 2. The Polling command received by the smartphone antenna 52 is supplied to the NFC IC 84. The NFC IC 84 generates a response including the identification information of the NFC IC 84, i.e., the mat ID.

In step S12, the smartphone antenna 52 of the play mat 1 transmits the response generated by the NFC IC 84 to the smartphone 2. In the smartphone 2, the mat ID is specified on the basis of the response transmitted from the play mat 1.

In step S3, the NFC reader/writer 21 of the smartphone 2 transmits the Write command (IC card antenna switching command). Here, a case where the IC card antenna 71-1 is enabled and the IC card antenna 71-2 is disabled will be described. The card 3 is placed on the section A1-1 and is held over the IC card antenna 71-1.

In step S13, the smartphone antenna 52 of the play mat 1 receives the Write command (IC card antenna switching command) transmitted from the NFC reader/writer 21 of the smartphone 2.

In step S14, the NFC IC 84 of the play mat 1 writes the Write command (IC card antenna switching command) into the memory in the NFC IC 84 and supplies the Write command into the MCU 85.

In step S15, the MCU 85 of the play mat 1 causes the switch control circuit 86 to control the switch 87 in response to the Write command (IC card antenna switching command). For example, the switch control circuit 86 that has received the Write command as described above turns on the switch 87-1 and turns off the switch 87-2.

In step S4, the NFC reader/writer 21 of the smartphone 2 transmits a Polling command, which is a command for making an inquiry.

In step S16, the smartphone antenna 52 of the play mat 1 receives the Polling command transmitted from the NFC reader/writer 21 of the smartphone 2. The Polling command received by the smartphone antenna 52 is supplied to the IC card antenna 71-1 via the switch 87-1.

In step S17, the IC card antenna 71-1 of the play mat 1 transmits a Polling command to the card 3 held over the IC card antenna 71-1.

In step S21, the card 3 receives the Polling command transmitted from the play mat 1. The IC chip of the card 3 generates a response including the card ID.

In step S22, the card 3 transmits the response including the card ID to the play mat 1.

In step S18, the IC card antenna 71-1 of the play mat 1 receives the response from the card 3. The response received by the IC card antenna 71-1 is supplied to the smartphone antenna 52 via the switch 87-1.

In step S19, the smartphone antenna 52 of the play mat 1 transmits the response from the card 3 to the smartphone 2.

In step S5, the NFC reader/writer 21 of the smartphone 2 receives, as a response to the Polling command, the response transmitted from the play mat 1.

Since the smartphone 2 grasps that only the IC card antenna 71-1 is enabled, the smartphone 2 can specify that the card 3 is held over the section A1-1 provided with the IC card antenna 71-1 and the card ID of the card 3 held over the section A1-1.

As described above, the play mat 1 can extend the antenna of the NFC reader/writer 21 equipped on the smartphone 2 to a plurality of antennas. Furthermore, the play mat 1 can perform an operation related to switching of enabling or disabling of the plurality of IC card antennas without receiving power supply from the outside.

Using a command corresponding to the IC chip provided in the card 3 or the NFC IC 84, which is an internal IC chip, the smartphone 2 can select enabling or disabling of the IC card antenna 71.

Various types of information stored in the IC chips of the play mat 1 or the card 3 are read by the smartphone 2 in a similar manner. Instead of the Polling command, information is appropriately read using a Read command. Furthermore, various types of information are written into the IC chips of the play mat 1 or the card 3 using the Write command.

Application Example

As described above, in the game system, various types of information regarding the card game are managed in association with the mat ID.

Here, functions implemented by managing various types of information in association with the mat ID will be described. For example, the following functions are implemented.

(1) Subscription function
(2) Point distribution function
(3) Attribute comparison function
(4) Tournament management function <Subscription Function>

Figure 14:
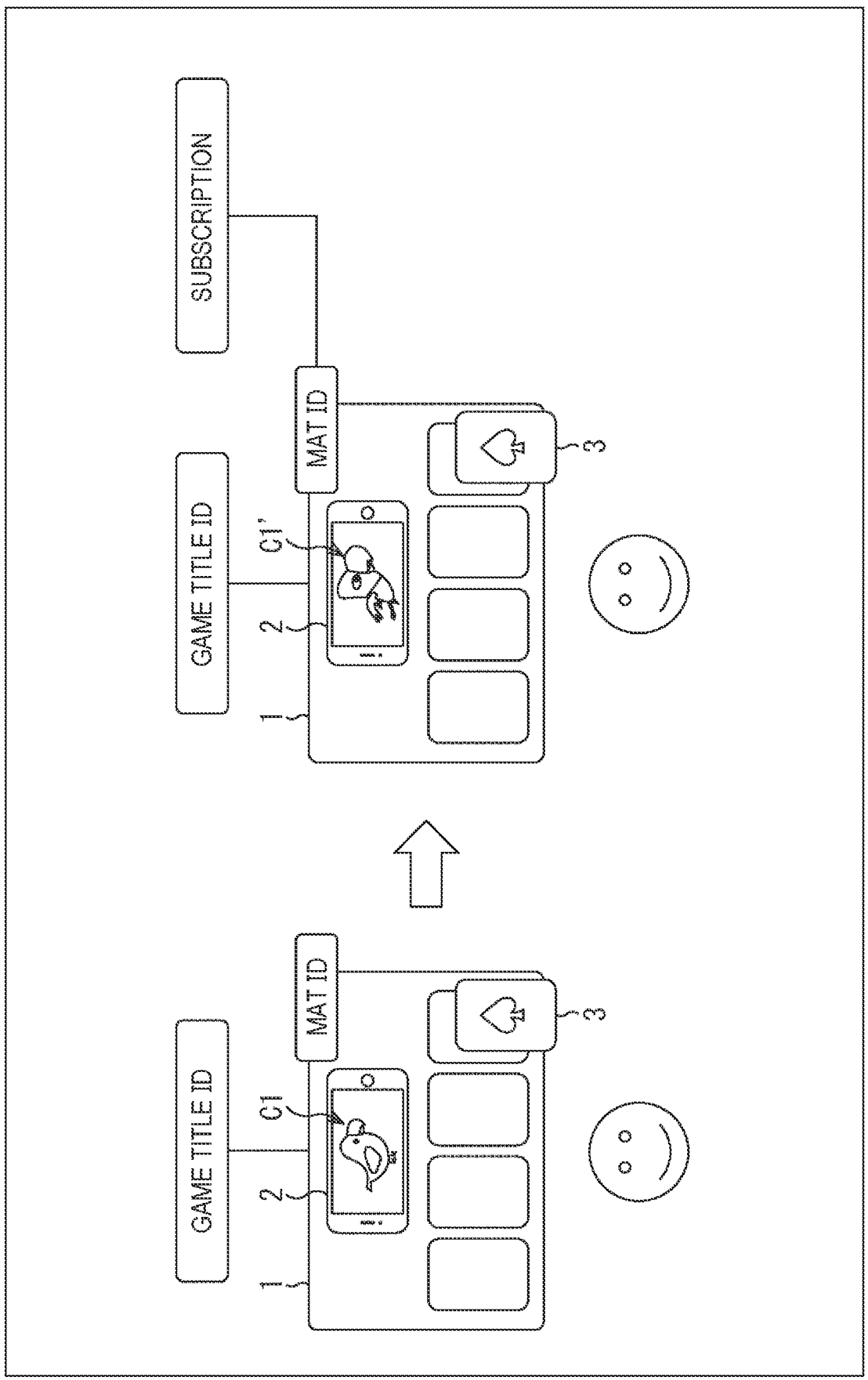
FIG. 14 is a view showing an example of subscription management.

FIG. 14 is a view showing an example of subscription management.

The subscription is that the user purchases a right to enable an optional function of the game, or right information purchased by the user. The user can advantageously play the game, for example, by purchasing a subscription.

The purchase of the subscription is completed when, for example, the user accesses a predetermined website during the game and operates the purchase screen to perform a purchase procedure.

As shown on the left side of FIG. 14, various types of information including the game title ID are associated with the mat ID. The state shown on the left side of FIG. 14 is a state where the subscription has not been purchased. The game management information is stored in the internal IC chip of the play mat 1, for example.

In the example on the left side of FIG. 14, the smartphone 2 that has started the game application and the card 3 are placed on the play mat 1. A character C1 is displayed on the display of the smartphone 2 in response to placing of the card 3. The user causes the character C1 to appear and battles with a character of another user.

In a case where the user purchases the subscription in such a state, the character C1 is strengthened to change to a character C1' as indicated by an arrow. In this example, the function added by the subscription purchased by the user is a function of strengthening the play mat 1. As the play mat 1 is strengthened, the character displayed on the smartphone 2 placed on the play mat 1 is strengthened.

As shown on the right side of FIG. 14, information on the subscription purchased by the user is associated with the mat ID. The subscription information is added to the game management information when the subscription has not been purchased.

Thus, in the game system, the subscription purchased by the user is not associated with the user using the user account or the like but is associated with the play mat 1.

With the information such as the subscription being associated with the play mat 1, the user can give the play mat 1 in combination with the subscription in a case of giving the play mat 1 to a third party by reselling or the like. In a case where the subscription is associated with the user, the play mat 1 cannot be given in combination with the subscription, and a subscription only enabled in a pair with the mat remains in the user.

Furthermore, in a case where a plurality of users plays a game using one play mat 1 associated with the subscription, not only the user who purchased the subscription but also all the members can use the additional function by the subscription.

In a case where the subscription is associated with the card 3, the additional function by the subscription can be used even in a case where the card 3 is used in another play mat, but such a situation can also be prevented.

<Point Distribution Function>

In the game system, a point is granted as a reward in accordance with achievement of a certain goal during the game. In a case where a plurality of users cooperatively achieves a certain goal, a function of distributing points serving as rewards among the plurality of users is prepared in the game system. For example, in a case where an enemy appearing in the game is defeated, a point corresponding to the strength of the enemy is granted.

FIGS. 15 to 18 are diagrams showing a series of flows of point distribution.

Figure 15:
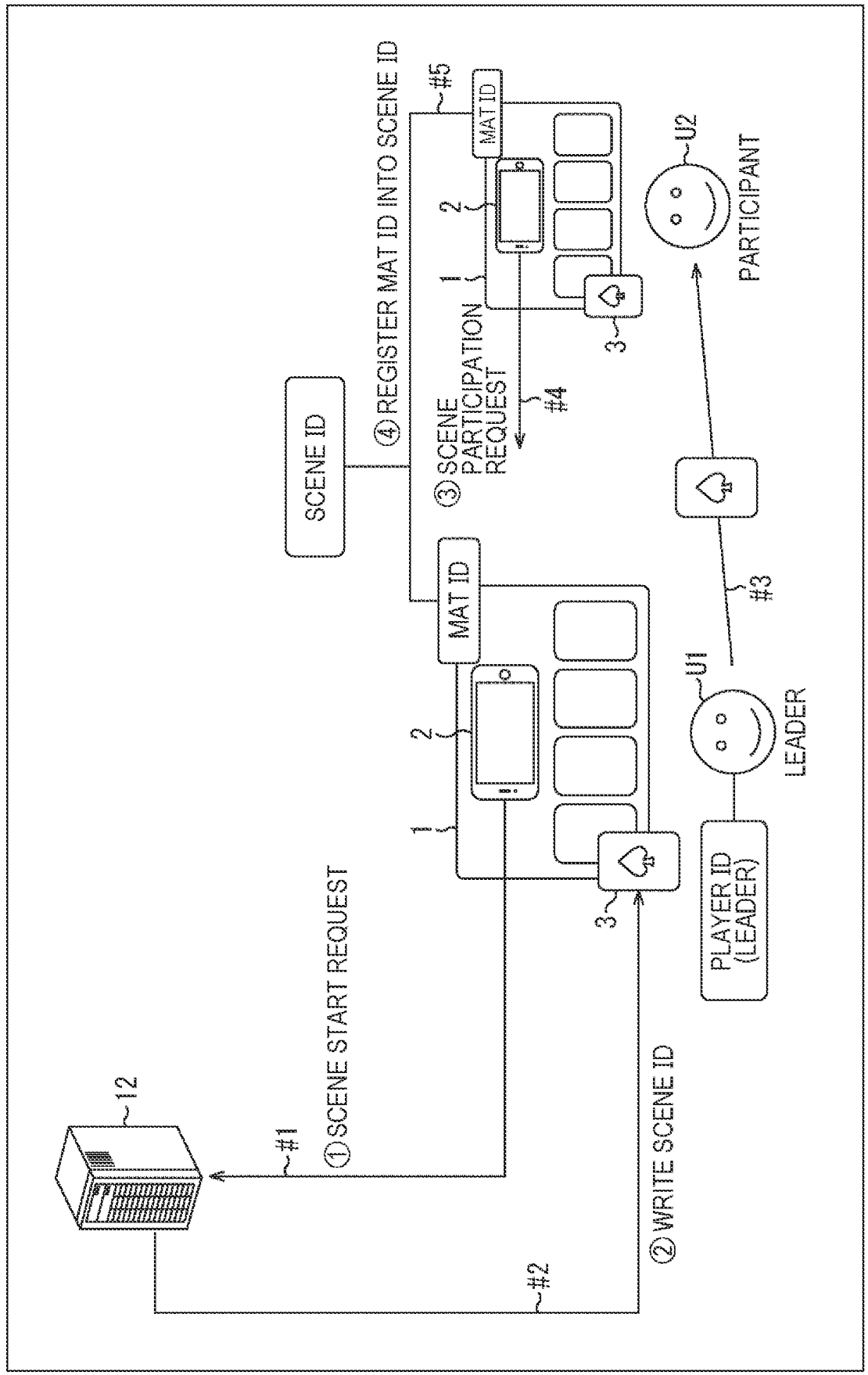
FIG. 15 is a view showing a series of flows of point distribution.

FIG. 15 is a view showing the flow of registration of a user who is a participant.

In the example of FIG. 15, the user U1, serving as a leader, places the smartphone 2 and the card 3 on his/her own play mat 1.

A scene ID of a predetermined scene of a certain game is associated with the mat ID of the play mat 1 of the leader. For example, a scene ID of a scene to be cleared cooperatively by the plurality of users is associated. The player ID of the leader is also associated with the mat ID. The game management information is stored in the internal IC chip of the play mat 1, for example.

In this state, for example, when the leader performs an operation for starting the game of a certain scene, the smartphone 2 transmits a scene start request to the game management server 12 as indicated by an arrow #1.

The game management server 12 generates a command (Write command) instructing writing of the scene ID of the scene requested by the leader, and transmits the command to the card 3 placed on the play mat 1. The command is transmitted to the card 3 via the smartphone 2 and the play mat 1.

That is, the command transmitted from the game management server 12 is received by the smartphone 2 and transmitted from the NFC reader/writer 21 to the play mat 1. The command transmitted from the NFC reader/writer 21 is received by the smartphone antenna 52 of the play mat 1 and transmitted from the IC card antenna 71 to the card 3.

The card 3 writes the scene ID into the memory of the IC chip by executing the command.

The leader passes the card 3 in which the scene ID is written to the user U2 who intends to participate in the game as indicated by an arrow #3. In this example, the leader and the user who intends to participate in the game are located close to each other, and each of them has the play mat 1 and the like.

The user U2 places the card 3 passed from the leader onto his/her own play mat 1, and performs an operation for participating in the game. In a case where the user U2 performs an operation for participating in the game, the smartphone 2 of the user U2 transmits a scene participation request to the game management server 12 as indicated by an arrow #4.

The participation request transmitted from the smartphone 2 of the user U2 includes the mat ID of the play mat 1 of the user U2 read from the play mat 1 by the smartphone 2, for example. Note that although no arrow is connected in FIG. 15, the participation request transmitted from the smartphone 2 of the user U2 is transmitted to the game management server 12.

At this time, the mat ID of the user U2 who has newly participated is associated with the scene ID as indicated by a solid line #5. Therefore, the mat ID of the play mat 1 of the user U1, who is the leader, and the mat ID of the play mat 1 of the user U2, who is the first participant, are associated with one scene ID.

Registration of the user participating in the game (registration of the play mat 1 of the user) is performed as described above. Note that details of processing including user registration will be described later with reference to a flowchart.

In a case where a plurality of users participates, the above operation is repeated. The user U2 passes the card 3 in which the scene ID is written to another user who intends to participate in the game.

Figure 16:
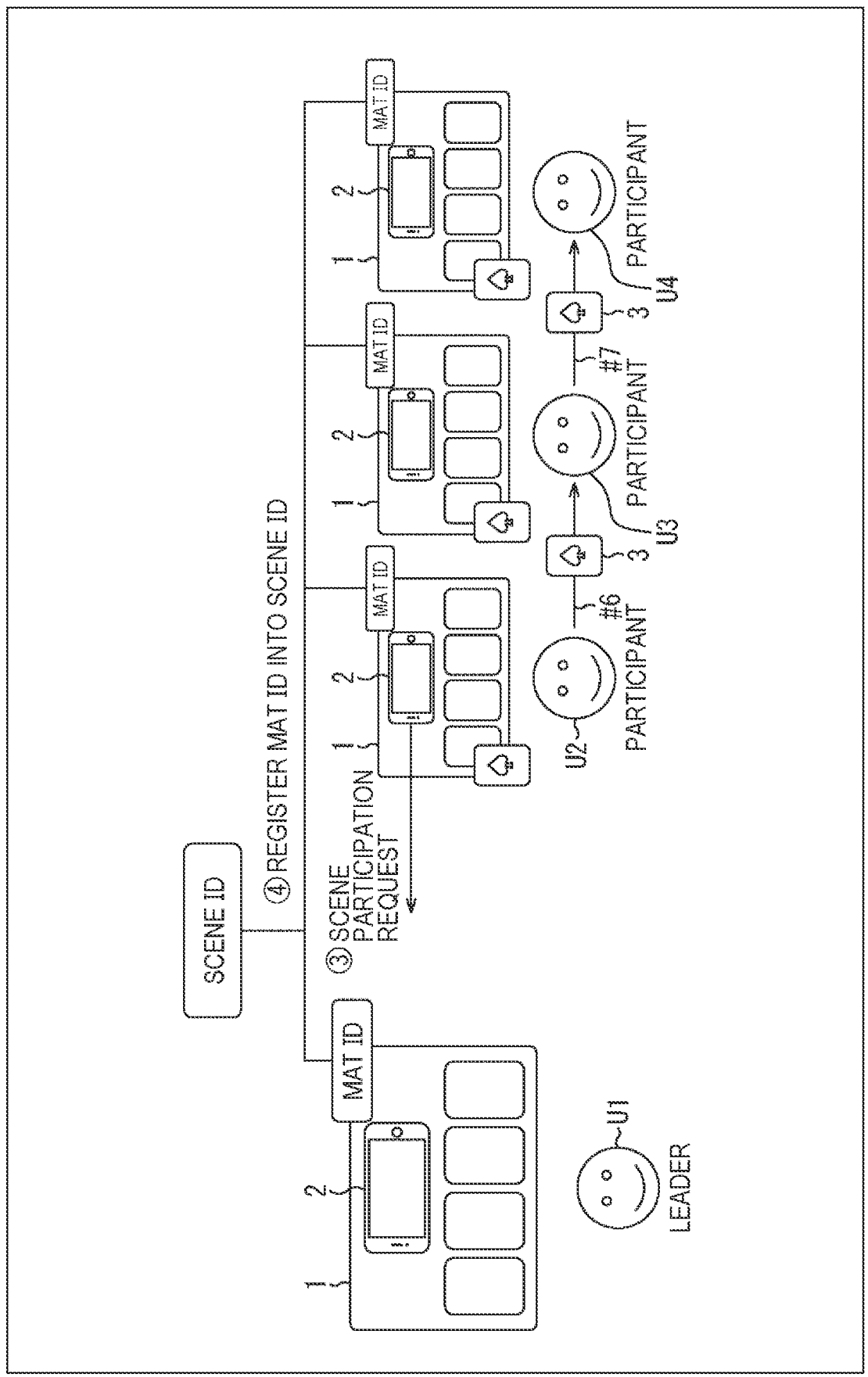
FIG. 16 is a view showing a series of flows of point distribution.

As indicated by the tip of an arrow #6 in FIG. 16, a user U3 places the card 3 passed from the user U2 onto his/her own play mat 1, and performs an operation for participating in the game. Processing similar to the processing performed by the smartphone 2 of the user U2 is performed between the smartphone 2 of the user U3 and the game management server 12, whereby the mat ID of the user U3, who has newly participated, is associated with the scene ID.

Furthermore, as indicated by the tip of an arrow #7, a user U4 places the card 3 passed from the user U3 onto his/her own play mat 1, and performs an operation for participating in the game. Processing similar to the processing performed by the smartphone 2 of the user U2 is performed between the smartphone 2 of the user U4 and the game management server 12, whereby the mat ID of the user U4, who has newly participated, is associated with the scene ID.

After the participant registration is performed by associating the mat ID of the play mat 1 of each of the users U1 to U4 with the scene ID as described above, the four users cooperatively play the game. The participant registration in a case where a plurality of users plays the game is performed as described above.

Figure 17:
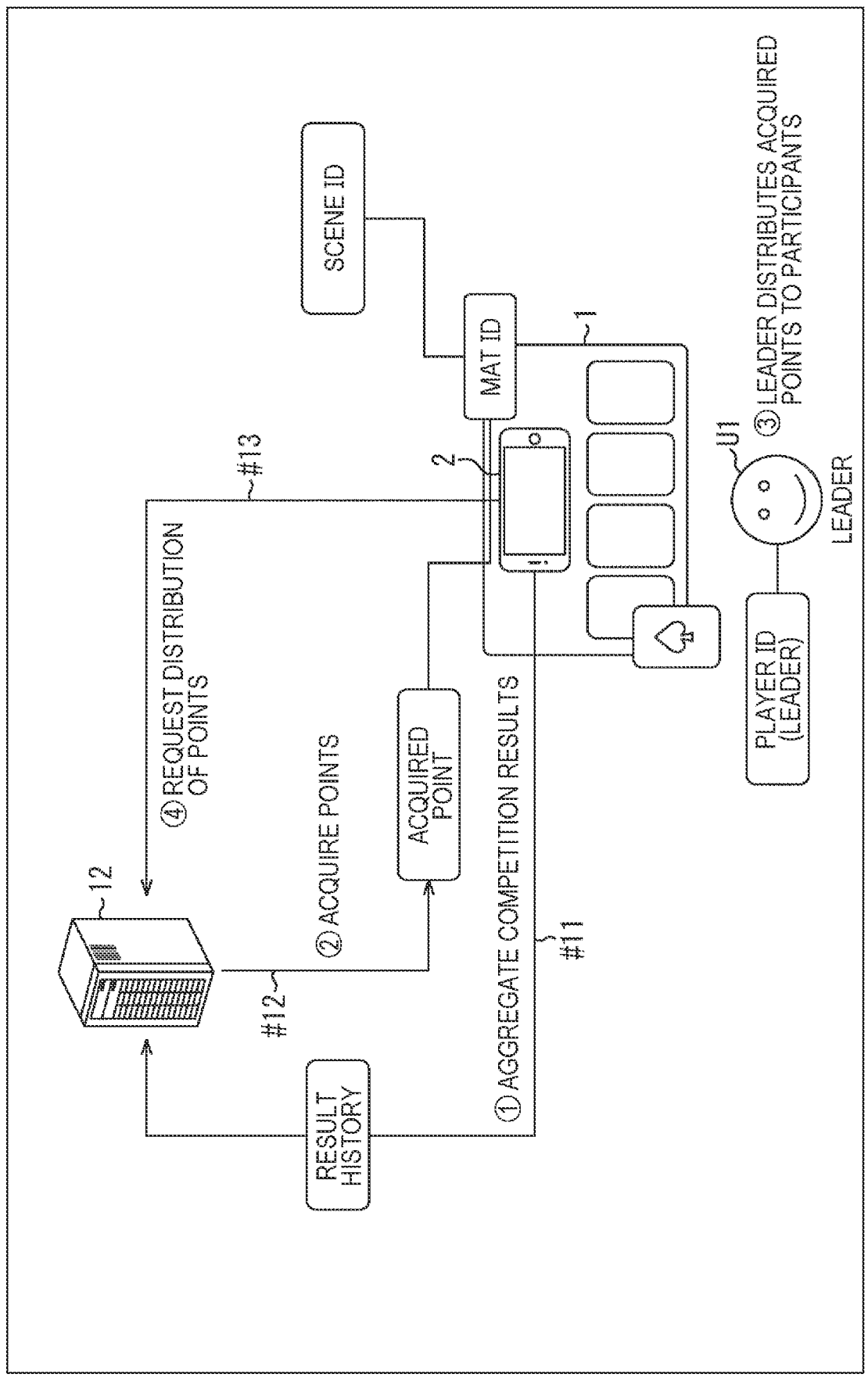
FIG. 17 is a view showing a series of flows of point distribution.

When the game ends, as indicated by an arrow #11 in FIG. 17, the smartphone 2 of the leader aggregates the results (competition results) of the game of each user, and transmits the results to the game management server 12 as a result history. The aggregation of the results of the game is performed on the basis of the game management information managed in association with the scene ID, for example.

The game management server 12 issues a point corresponding to the result of the game to the leader as indicated by an arrow #12. The information on the point acquired by the leader is associated with the mat ID of the play mat 1 of the leader.

In a case where the leader performs an operation for distributing points according to the degree of contribution of each user or the like, the smartphone 2 of the leader transmits a point distribution request to the game management server 12 as indicated by an arrow #13. The point distribution request includes information indicating the number of points to be distributed to each user.

Figure 18:
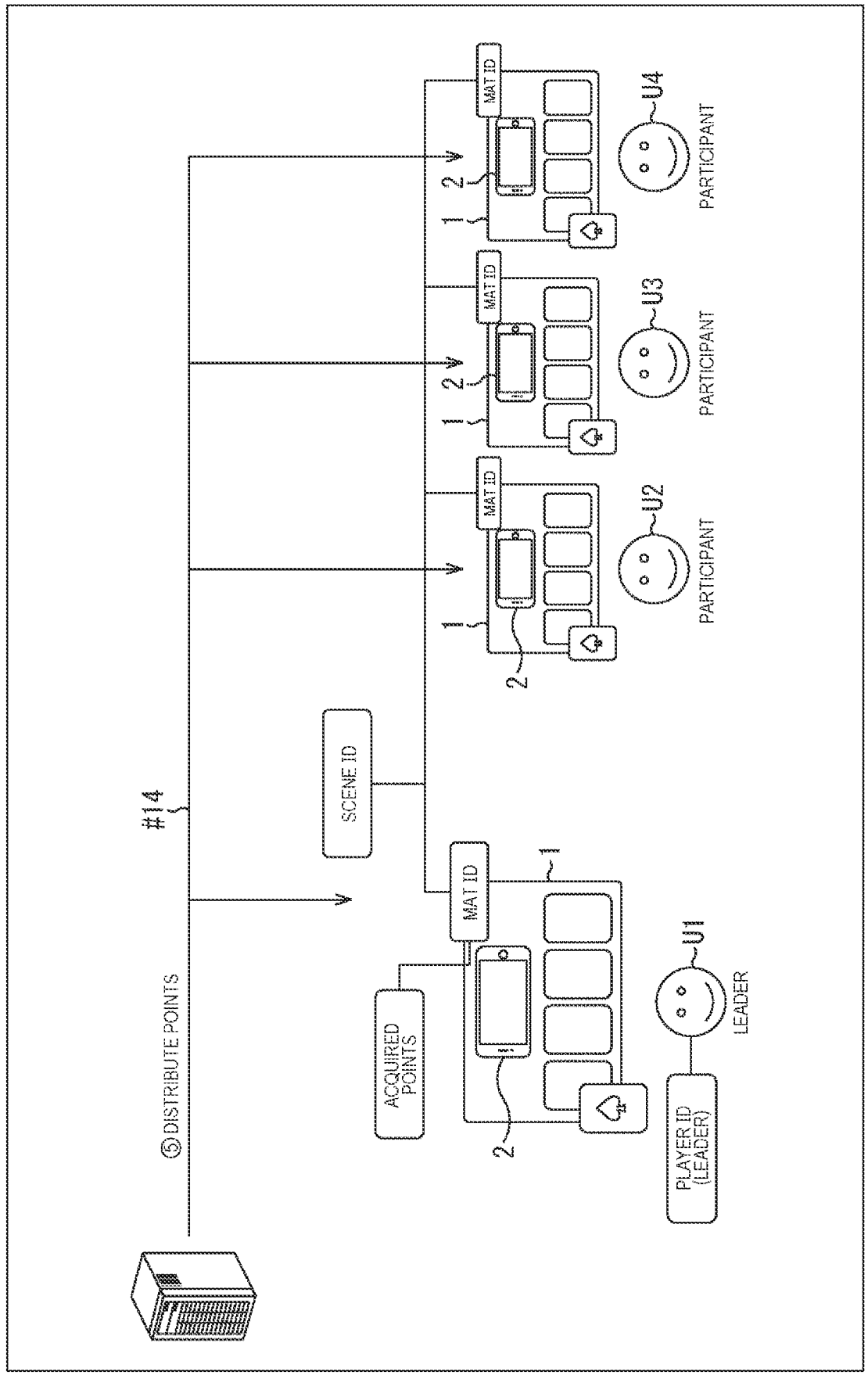
FIG. 18 is a view showing a series of flows of point distribution.

As indicated by an arrow #14 in FIG. 18, the game management server 12 distributes points to each of the users U1 to U4 in response to a distribution request from the smartphone 2 of the leader. The point distribution is performed by associating the number of points set by the leader with the mat ID of each play mat 1.

As described above, in the game system, it is possible to grant a reward to the user who has played the game using the play mat 1 associated with the scene. That is, the game management server 12 can grant a reward only to the participant who uses the play mat 1 associated with the scene.

Furthermore, the user serving as the leader can autonomously determine the point to be granted to the participant.

<Attribute Comparison Function>

Attributes are set for the play mat 1 used in the game and the scene of the game. For example, an advantage/disadvantage of the game is determined according to a combination of the attribute of the play mat 1 and the attribute of the scene.

Figure 19:
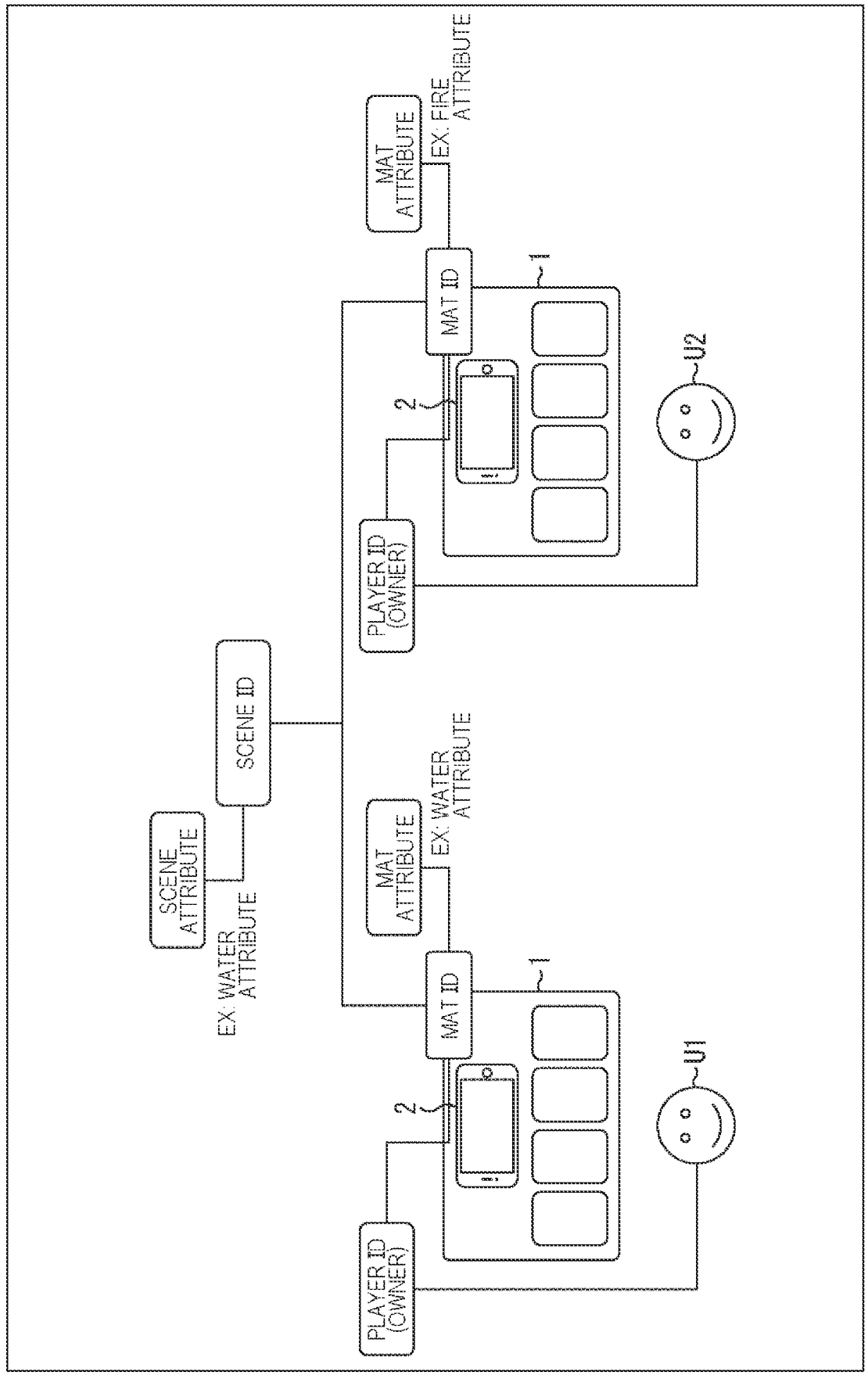
FIG. 19 is a view showing an example of attribute comparison.

FIG. 19 is a view showing an example of attribute comparison.

The state shown in FIG. 19 is a state in which the user U1 and the user U2 each prepare the play mat 1 and the like and battle with each other in a certain scene of the game. The mat ID of the play mat 1 of the user U1 and the mat ID of the play mat 1 of the user U2 are associated with the scene ID.

A scene attribute, which is information indicating an attribute of a scene, is set for the scene ID. In the example of FIG. 19, the scene attribute is a water attribute.

On the other hand, a mat attribute, which is information indicating the attribute of the play mat 1, is set to the mat ID. In the example of FIG. 19, the mat attribute of the play mat 1 of the user U1 is the water attribute, and the mat attribute of the play mat 1 of the user U2 is the fire attribute.

In a case where the user U1, who uses the play mat 1 with the water attribute, and the user U2, who uses the play mat 1 with the fire attribute, battle with each other in a scene with the water attribute, the user U1, who uses the play mat 1 with the same attribute as the scene attribute, is set to be more advantageous than the user U2 in the scene.

Thus, in the game system, it is possible to identify the play mat 1 for each scene of the game and set the development of the battle so as to be advantageous or disadvantageous. The difficulty level of the game may be set according to a combination of attributes.

<Tournament Management Function>

In a case where the ranking of the participants of the game is determined by the tournament method, the management of the winner and the like are performed using the mat ID.

Figure 20:
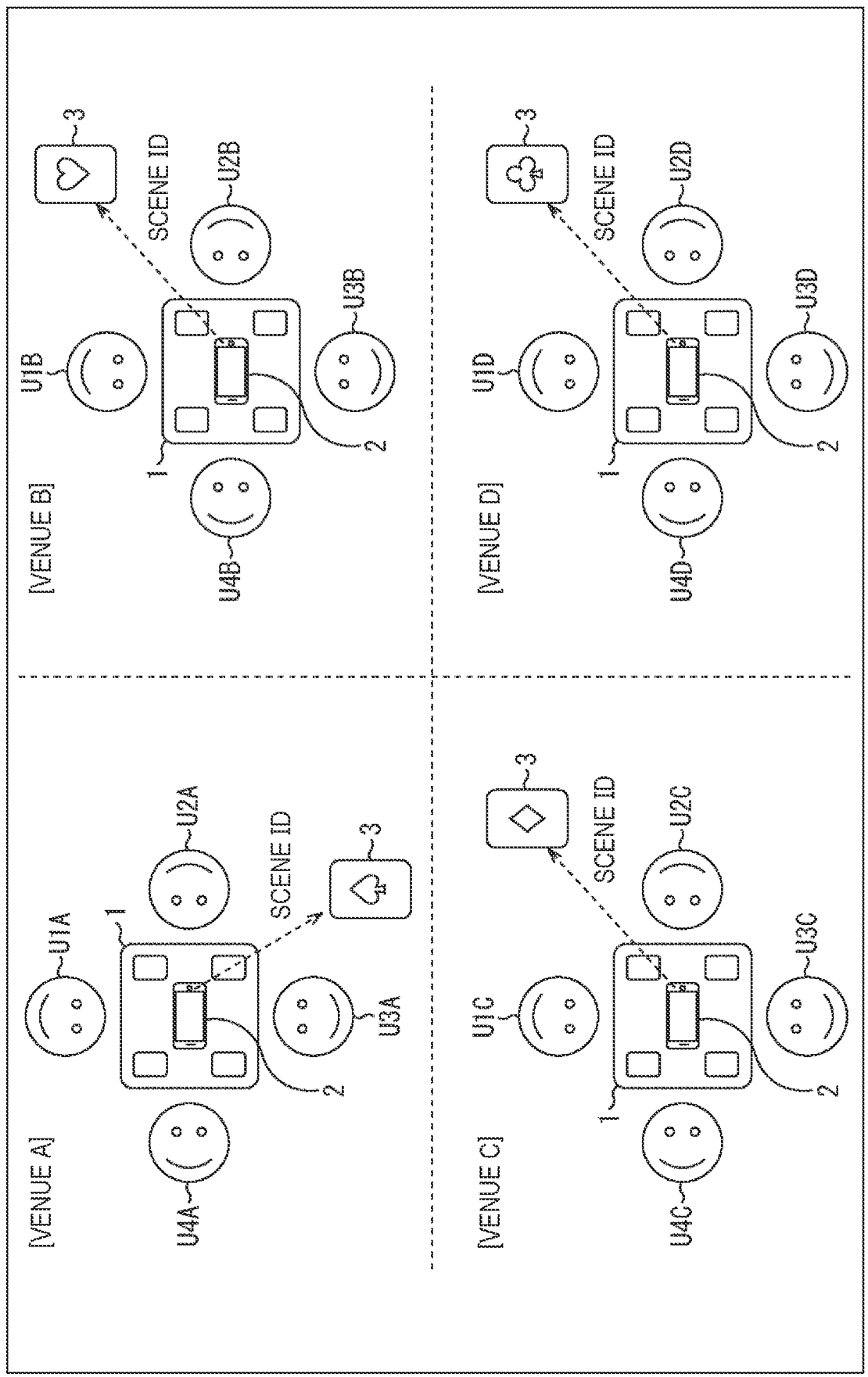
FIG. 20 is a view showing an example of a battle venue.

FIG. 20 is a view showing an example of a battle venue.

In the example of FIG. 20, four users battle with one another in each of a venue A, a venue B, a venue C, and a venue D. For example, in the venue A, users U1A to U4A battle with one another using one play mat 1 and one smartphone 2.

In each venue, the scene ID is written to the card 3 as indicated by the dashed arrow in FIG. 20, and then the participant registration is performed using the card 3 in which the scene ID is written. As described with reference to FIGS. 15 and 16, the participant registration in a case of Own Mat Method is performed by sequentially passing the card 3 in which the scene ID is written.

Writing of the scene ID and the player ID is performed under the control of the game management server 12 managed by the organizer of the tournament, for example. Writing of other information into the card 3 is also performed under the control of the game management server 12 similarly.

Figure 21:
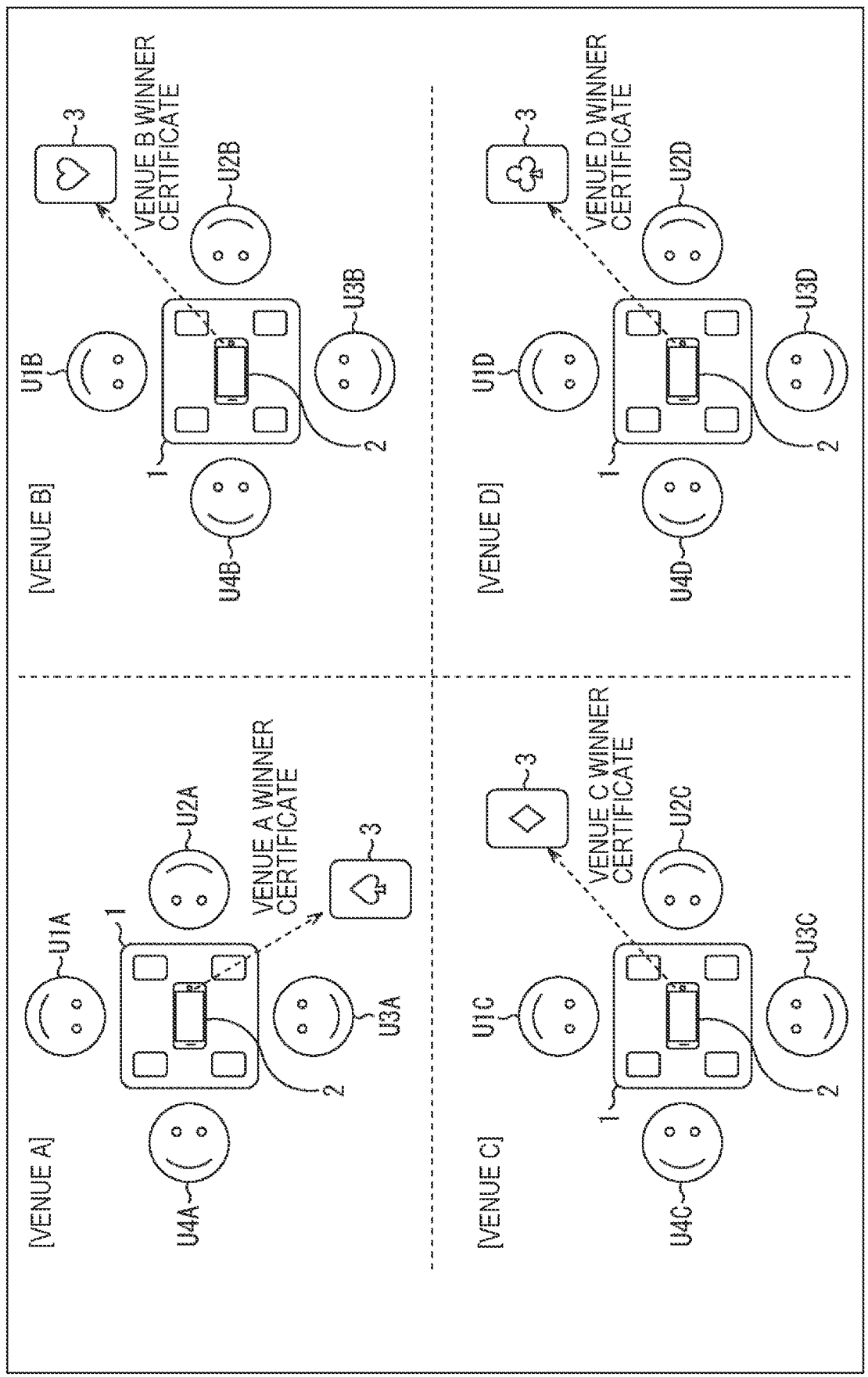
FIG. 21 is a view showing an example of winner registration.

After the participant registration, a game battle takes place at each venue. In a case where the win or lose is determined, information indicating the winner is written in the card 3 as shown in FIG. 21.

In the venue A, the player ID of the winner in the venue A is written in the card 3 used in the venue A. Similarly, in the venue B, the venue C, and the venue D, the player ID of the winner in each venue is written in the card 3.

Figure 22:
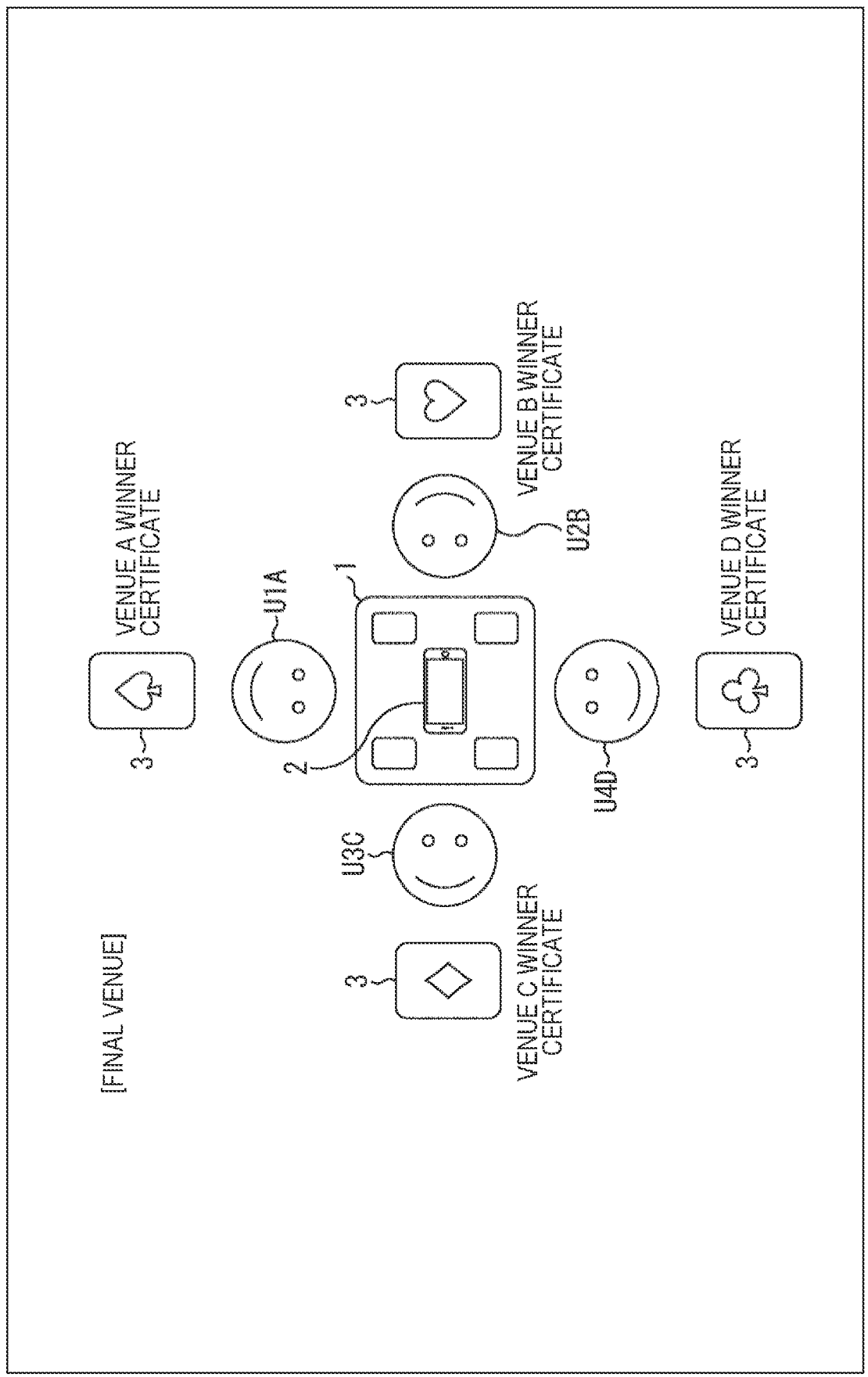
FIG. 22 is a view showing an example of a battle venue.

As shown in FIG. 22, the winning user in each venue gathers at, for example, the venue of the final that is the next venue, and battles with one another with the card 3. The example of FIG. 22 assumes that the final will be played by the user U1A, who is the winner of the venue A, the user U2B, who is the winner of the venue B, the user U3C, who is the winner of the venue C, and the user U4D, who is the winner of the venue D.

In this manner, it is also possible to manage the operation of the tournament using the game management information.

The progress of the game is performed by a game application by the smartphone 2 prepared in each venue. Since communication with the game management server 12 is unnecessary except when information is written to the card 3, it is not necessary that the connection between the smartphone 2 and the game management server 12 is always established.

As described above, in the game system, various functions are implemented using the information associated with the mat ID.

<<Flow of Card Game>>

Here, details of processing for implementing each function as described above will be described with reference to a flowchart.

<Subscription Function>

Figure 23:
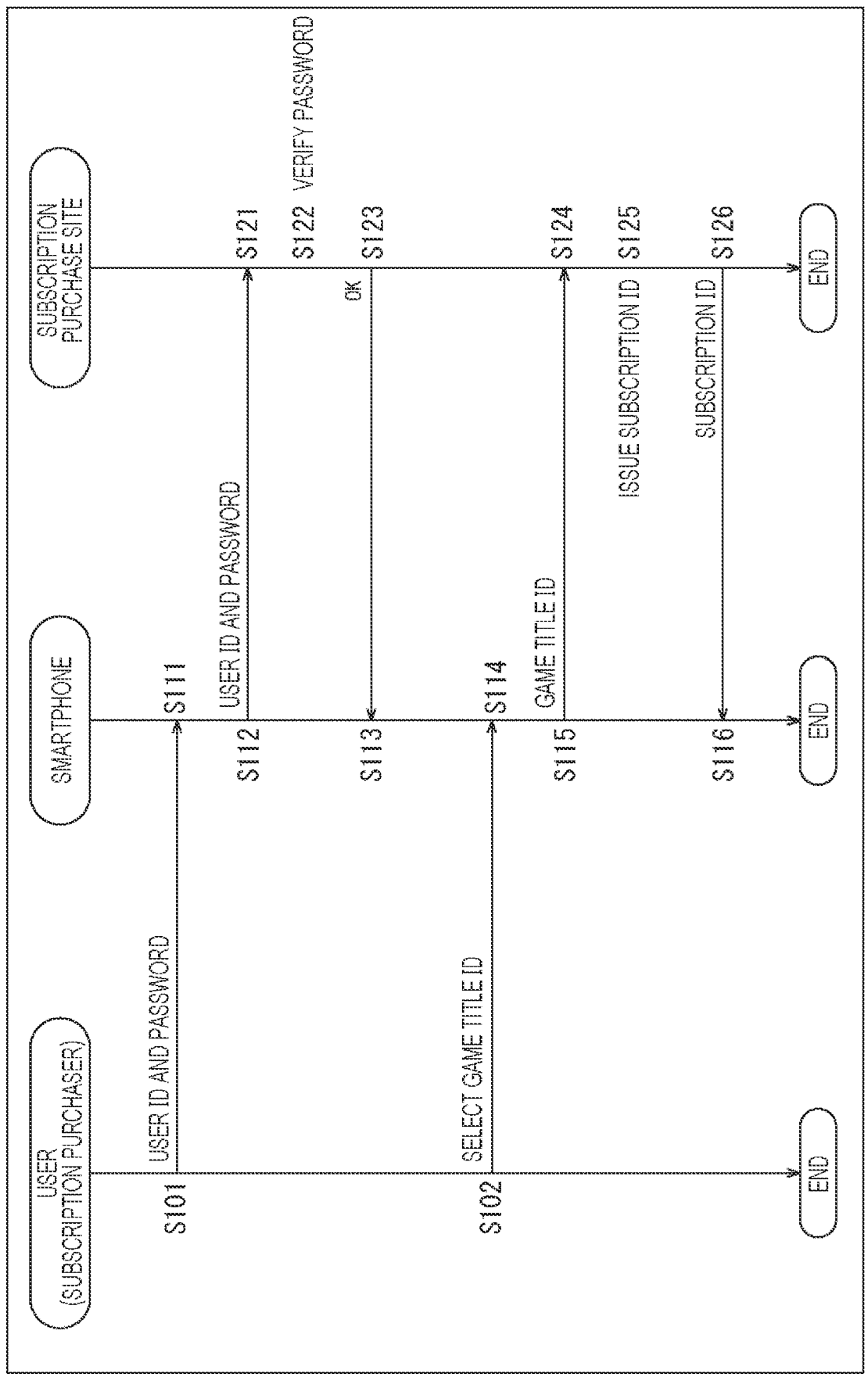
FIG. 23 is a flowchart explaining subscription purchase processing.

Subscription Purchase Processing FIG. 23 is a flowchart explaining the subscription purchase processing.

The processing shown in FIG. 23 is performed between the smartphone 2 and the game management server 12, which manages the subscription purchase site, in response to the operation by the user. The processing shown in FIG. 23 as the processing of the subscription purchase site is processing performed by the game management server 12.

In step S101, the user who is a purchaser of the subscription operates the smartphone 2 to input a user ID and a password. The user ID and the password are set in advance at the time of registration of the user account or the like.

In step S111, the smartphone 2 receives an input of the user ID and the password.

In step S112, the smartphone 2 transmits the user ID and the password to the subscription purchase site (game management server 12).

In step S121, the subscription purchase site receives the user ID and the password transmitted from the smartphone 2.

In step S122, the subscription purchase site verifies the password. In the subscription purchase site, information regarding the user's account is registered in advance.

In step S123, in a case where the subscription purchase site determines that the password input by the user is correct, the subscription purchase site transmits information indicating that the verification is successful to the smartphone 2.

In step S113, the smartphone 2 receives the information transmitted from the subscription purchase site.

In step S102, the user operates the smartphone 2 to select the game title ID. The game title ID selected here is identification information of the game using the subscription that the user intends to purchase.

In step S114, the smartphone 2 receives the selection of the game title ID.

In step S115, the smartphone 2 transmits the game title ID to the subscription purchase site.

In step S124, the subscription purchase site receives the game title ID transmitted from the smartphone 2.

In step S125, the subscription purchase site issues a subscription ID. Here, the subscription purchase procedure or the like is appropriately performed, and the subscription ID is issued in a case where the purchase procedure is completed.

In step S126, the subscription purchase site transmits the subscription ID to the smartphone 2.

In step S116, the smartphone 2 receives the subscription ID transmitted from the subscription purchase site.

Subscription Operation Processing

Figure 24:
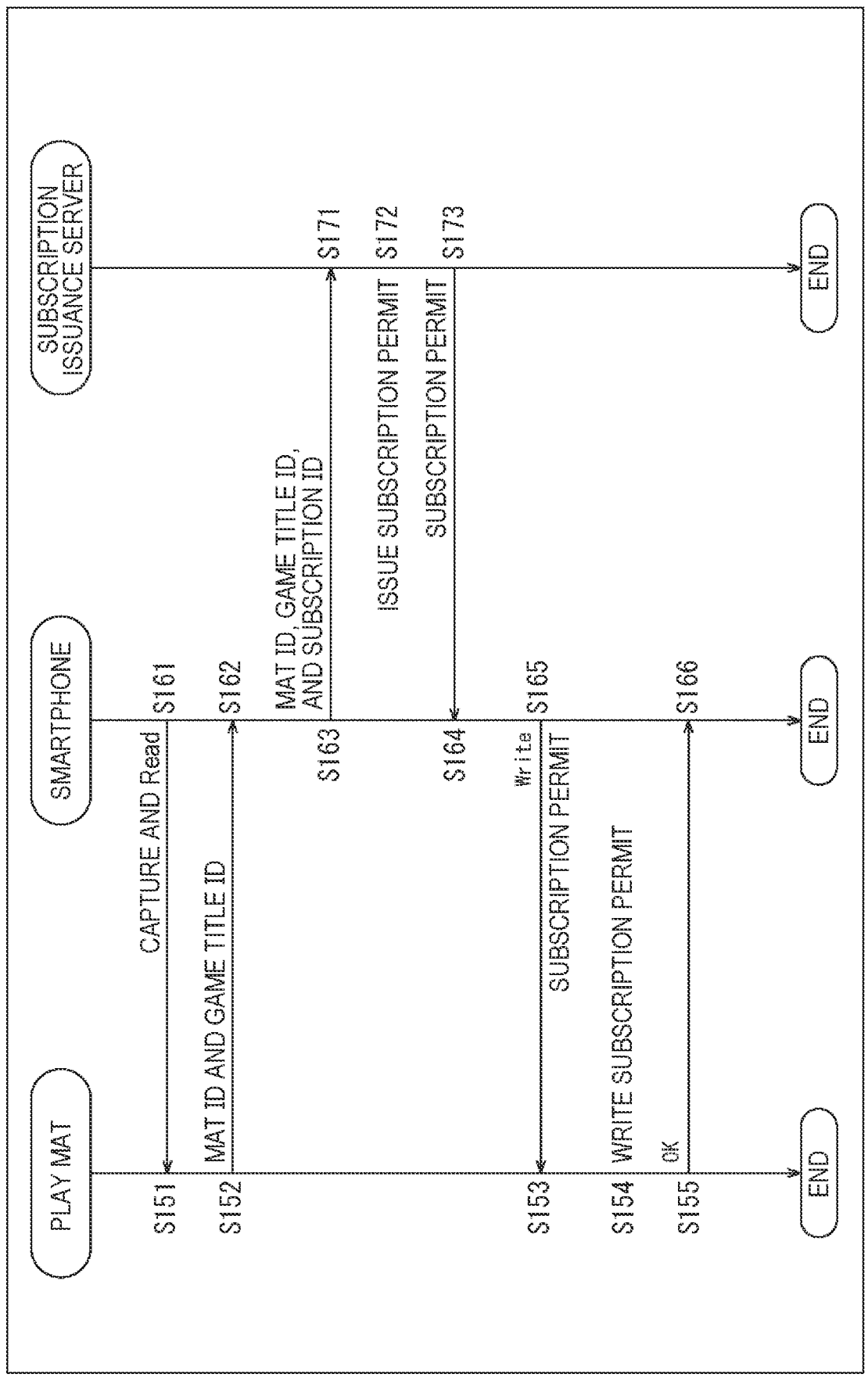
FIG. 24 is a flowchart explaining subscription operation processing.

FIG. 24 is a flowchart explaining subscription operation processing.

The subscription operation processing is processing of writing subscription information into the play mat 1. The processing shown in FIG. 24 is performed among the play mat 1, the smartphone 2, and a subscription issuance server, which manages the issuance of the subscription. As the processing of the subscription issuance server, the processing shown in FIG. 24 is performed by the game management server 12.

In step S161, the smartphone 2 captures the play mat 1 and transmits the Read command.

For example, when the smartphone 2 is placed on the play mat 1 and the radio wave output from the NFC reader/writer 21 is received by the smartphone antenna 52 of the play mat 1, the play mat 1 is captured.

Hereinafter, it is assumed that the smartphone 2 is placed on the play mat 1, for example.

In step S151, the play mat 1 receives the Read command transmitted from the smartphone 2.

In step S152, the play mat 1 transmits the mat ID and the game title ID to the smartphone 2 in response to the Read command. That is, the NFC IC 84 of the play mat 1 executes the Read command, and the mat ID and the game title ID stored in the NFC IC 84 are transmitted to the smartphone 2.

In step S162, the smartphone 2 receives the mat ID and the game title ID transmitted from the play mat 1.

In step S163, the smartphone 2 transmits the mat ID and the game title ID read from the play mat 1 to the subscription issuance server together with the subscription ID. The subscription ID transmitted to the subscription issuance server is an ID issued by the subscription purchase site by the processing of FIG. 23.

In step S171, the subscription issuance server receives the mat ID, the game title ID, and the subscription ID transmitted from the smartphone 2.

In step S172, the subscription issuance server issues (generates) a subscription permit including the mat ID, the game title ID, and the subscription ID transmitted from the smartphone 2.

In step S173, the subscription issuance server transmits the subscription permit to the smartphone 2.

In step S164, the smartphone 2 receives the subscription permit transmitted from the subscription issuance server.

In step S165, the smartphone 2 transmits the subscription permit to the play mat 1 together with the Write command. The Write command transmitted here is a command used for writing data into the play mat 1.

In step S153, the play mat 1 receives the Write command (data writing of the play mat 1) and the subscription permit transmitted from the smartphone 2.

In step S154, the play mat 1 executes the Write command and writes the subscription permit to the NFC IC 84.

In step S155, the play mat 1 transmits information indicating that the writing has been completed to the smartphone 2.

In step S166, the smartphone 2 receives the information transmitted from the play mat 1.

Subscription Confirmation Processing

Figure 25:
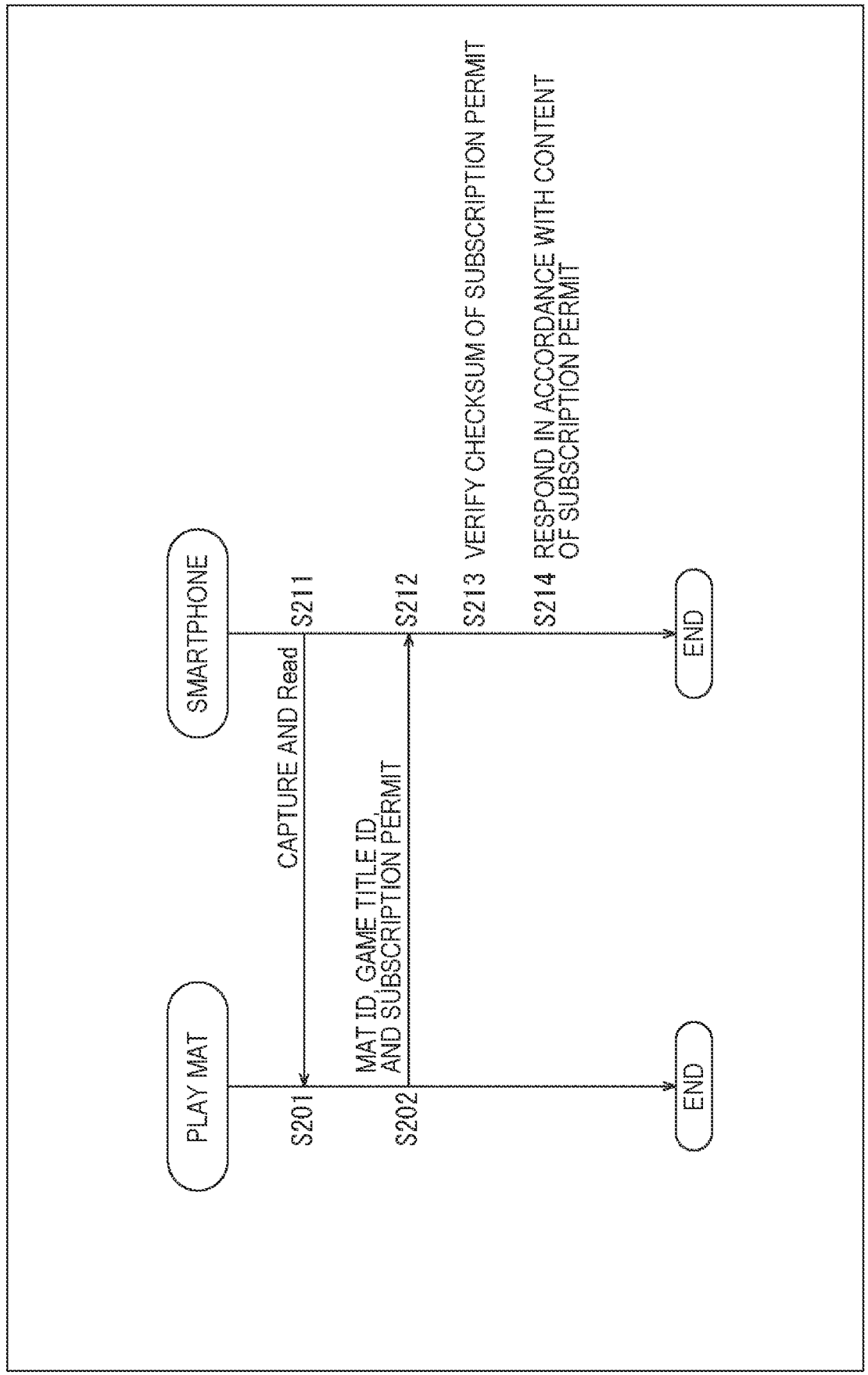
FIG. 25 is a flowchart explaining subscription confirmation processing.

FIG. 25 is a flowchart explaining the subscription confirmation processing.

The processing shown in FIG. 25 is performed between the play mat 1 and the smartphone 2.

In step S211, the smartphone 2 captures the play mat 1 and transmits the Read command.

In step S201, the play mat 1 receives the Read command transmitted from the smartphone 2.

In step S202, the play mat 1 transmits the mat ID, the game title ID, and the subscription permit to the smartphone 2 in response to the Read command.

In step S212, the smartphone 2 receives the mat ID, the game title ID, and the subscription permit transmitted from the play mat 1.

In step S213, the smartphone 2 performs checksum verification of the subscription permit transmitted from the play mat 1. The smartphone 2 has a verification key used for verification of the checksum added to the subscription permit.

Figure 26:
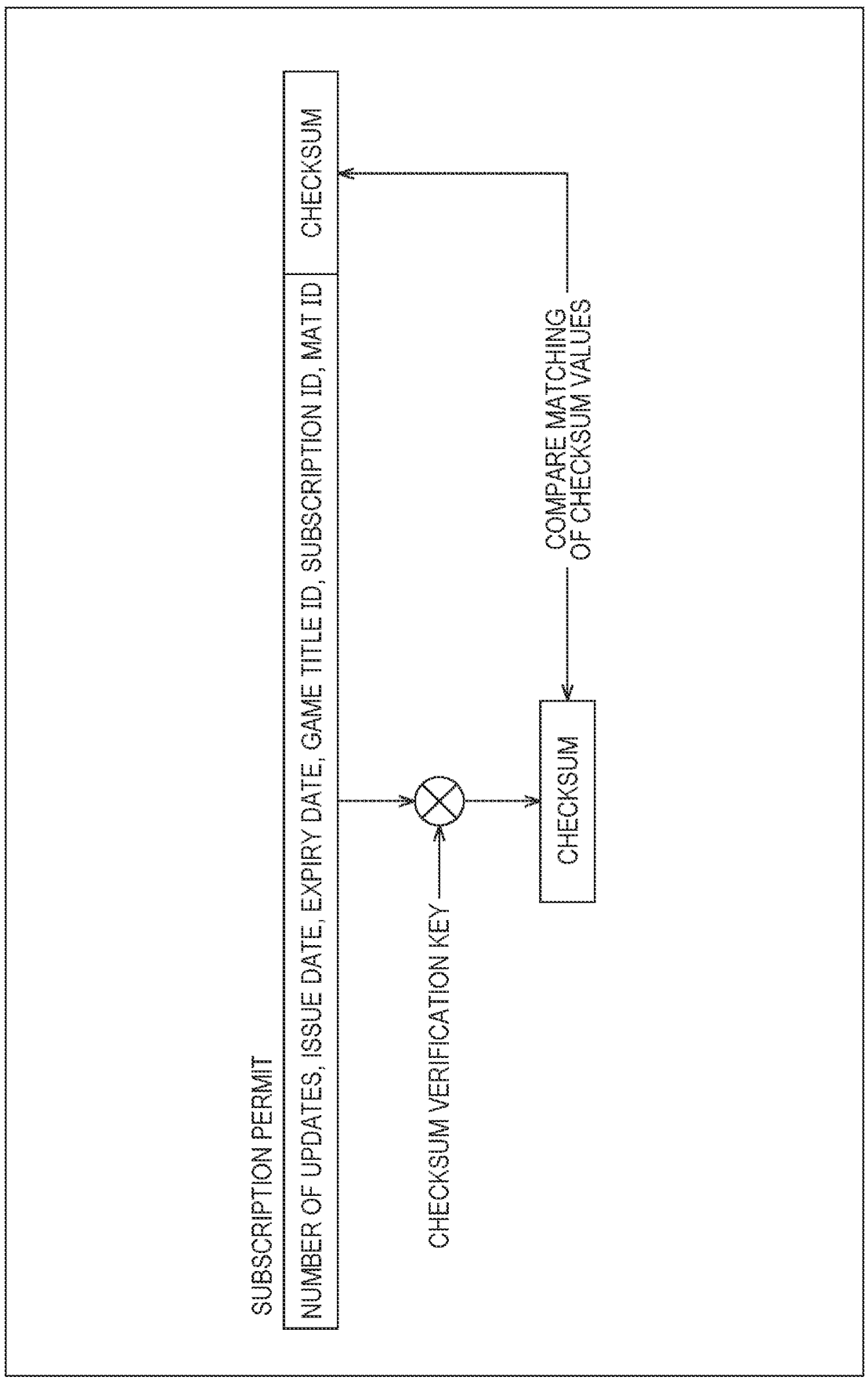
FIG. 26 is a view showing an example of checksum verification of a subscription permit.

FIG. 26 is a view showing an example of checksum verification of the subscription permit.

As shown in FIG. 26, the subscription permit includes information such as the number of updates, an issue date, and an expiry date, in addition to the mat ID, the game title ID, and the subscription ID. A checksum is added to the subscription permit.

As shown in FIG. 26, the smartphone 2 calculates the checksum by applying the checksum verification key to data constituting the subscription permit. The smartphone 2 compares the calculated checksum with the checksum added to the subscription permit, and checks whether or not these values match. In a case where the values of the checksum calculated using the checksum verification key and the checksum added to the subscription permit match together, it is determined that the subscription permit is valid information.

Returning to the description of FIG. 25, in a case where it is determined that the subscription permit is valid information, the smartphone 2 makes a response according to the content of the subscription permit in step S214.

For example, the smartphone 2 enables the subscription during the game and performs processing such as strengthening the character. Here, various types of processing for reflecting the content of the subscription purchased by the user in the game are performed.

Subscription Update Processing

Figure 27:
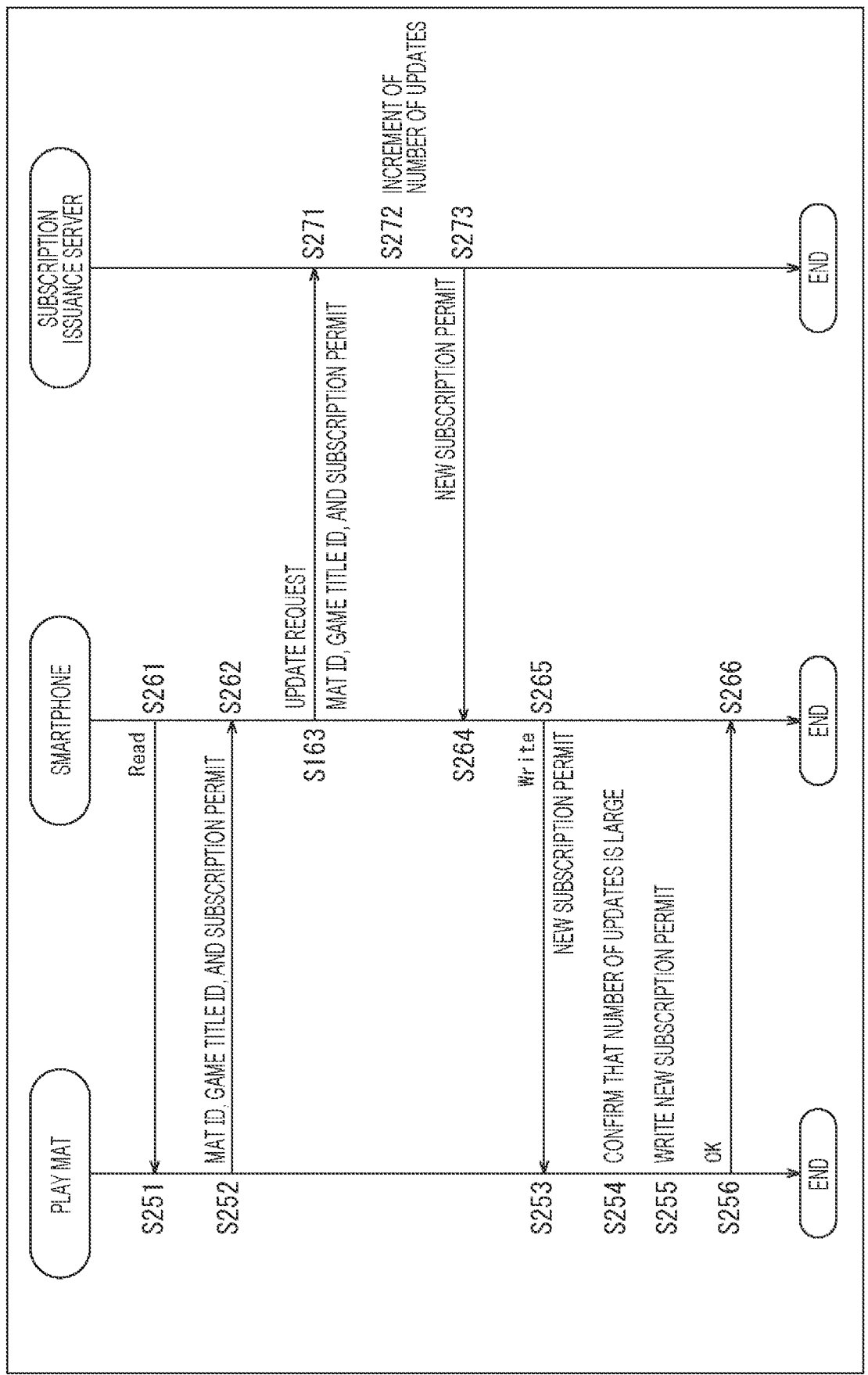
FIG. 27 is a flowchart explaining subscription update processing.

FIG. 27 is a flowchart explaining subscription update processing.

The processing shown in FIG. 27 is performed among the play mat 1, the smartphone 2, and the subscription issuance server.

In step S261, the smartphone 2 transmits the Read command to the play mat 1.

In step S251, the play mat 1 receives the Read command transmitted from the smartphone 2.

In step S252, the play mat 1 transmits the mat ID, the game title ID, and the subscription permit to the smartphone 2 in response to the Read command.

In step S262, the smartphone 2 receives the mat ID, the game title ID, and the subscription permit transmitted from the play mat 1.

In step S263, the smartphone 2 transmits the mat ID, the game title ID, and the subscription permit to the subscription issuance server, and requests update of the subscription permit.

In step S271, the subscription issuance server receives an update request transmitted from the smartphone 2.

In step S272, the subscription issuance server increments the number of updates included in the subscription permit in response to the request transmitted from the smartphone 2.

In step S273, the subscription issuance server transmits a new subscription permit, which is a subscription permit in which the number of updates is incremented, to the smartphone 2.

In step S264, the smartphone 2 receives a new subscription permit transmitted from the subscription issuance server.

In step S265, the smartphone 2 transmits the new subscription permit to the play mat 1 together with the Write command (data writing of the play mat 1).

In step S253, the play mat 1 receives the Write command (data writing of the play mat 1) and the new subscription permit transmitted from the smartphone 2.

In step S254, the play mat 1 confirms that the number of updates described in the new subscription permit is larger than the number of updates before updating.

In step S255, the play mat 1 executes the Write command and writes a new subscription permit into the NFC IC 84.

In step S256, the play mat 1 transmits information indicating that the writing has been completed to the smartphone 2.

In step S266, the smartphone 2 receives the information transmitted from the play mat 1.

The subscription function based on the game management information is implemented by the above processing.

<Point Distribution Function>

Scene Start Processing

Figure 28:
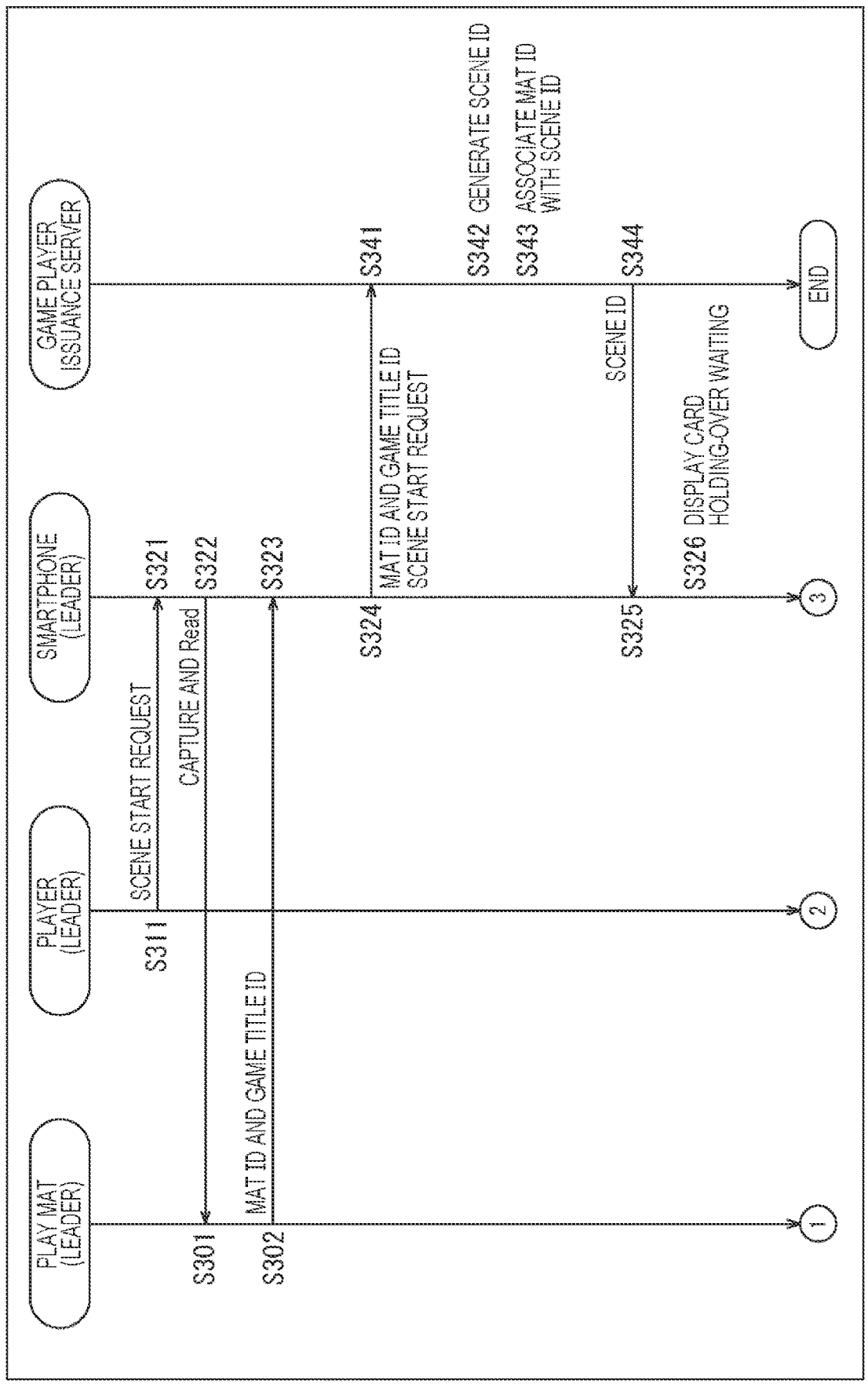
FIG. 28 is a flowchart explaining scene start processing.
Figure 29:
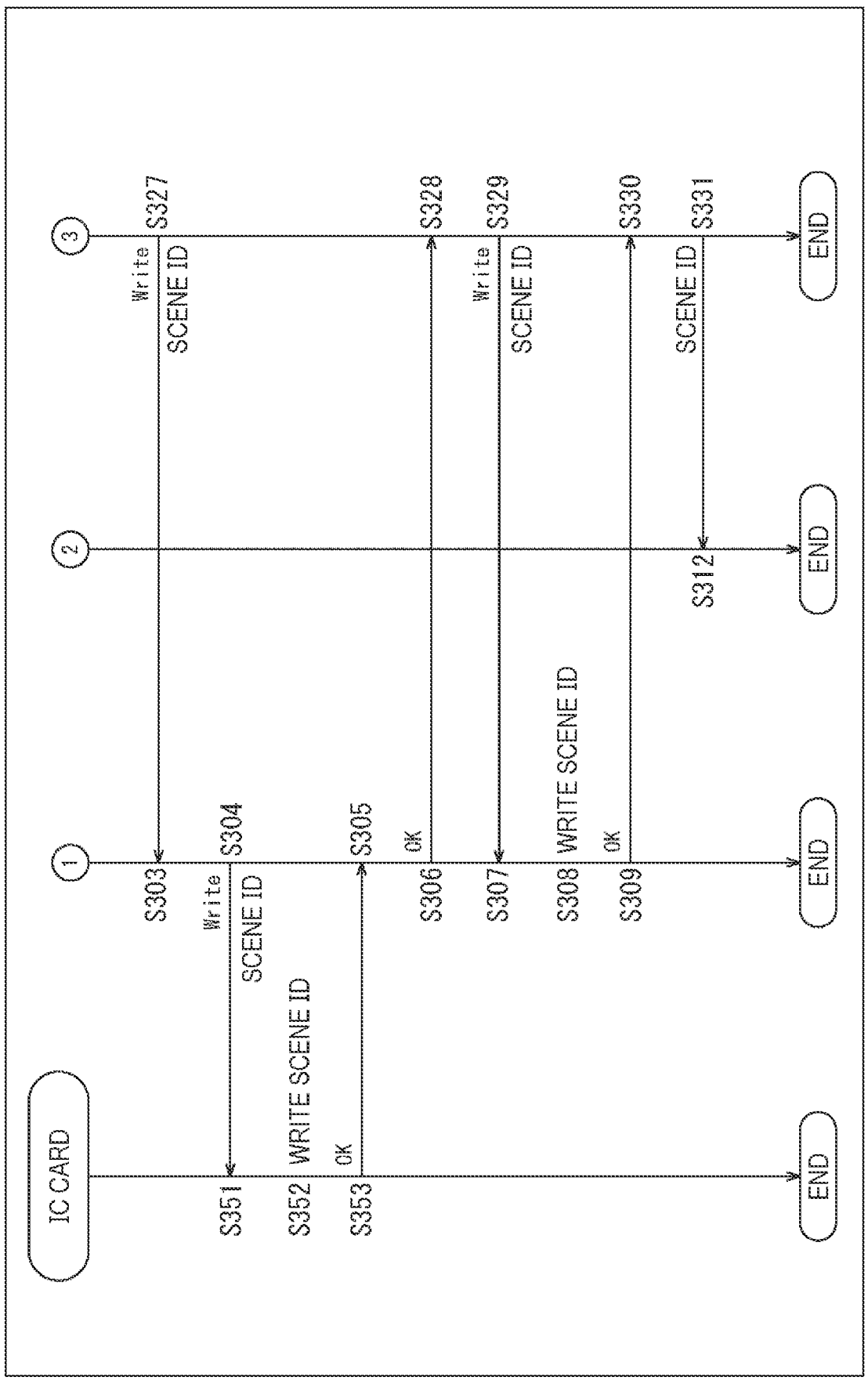
FIG. 29 is a flowchart explaining scene start processing.

FIGS. 28 and 29 are flowcharts explaining the scene start processing.

As described with reference to FIG. 15, in a case where a plurality of users participates and plays in a certain scene of the game, the processing of writing the scene ID of the scene into the card 3 is performed.

In response to the operation of the player (user) serving as the leader, the processing shown in FIGS. 28 and 29 is performed among the play mat 1 of the leader, the smartphone 2 of the leader, the card 3 of the leader, and the game management server 12 operating as a game player issuance server. The processing shown in FIG. 28 as the processing of the game player issuance server is processing performed by the game management server 12.

In step S311, the player serving as the leader performs an operation for requesting start of the scene using his/her own smartphone 2.

In step S321, the smartphone 2 receives an operation by the leader.

In step S322, the smartphone 2 captures the play mat 1 and transmits the Read command.

In step S301, the play mat 1 receives the Read command transmitted from the smartphone 2.

In step S302, the play mat 1 transmits the mat ID and the game title ID to the smartphone 2 in response to the Read command.

In step S323, the smartphone 2 receives the mat ID and the game title ID transmitted from the play mat 1.

In step S324, the smartphone 2 transmits the mat ID and the game title ID read from the play mat 1 to the game player issuance server and requests the start of the scene.

In step S341, the game player issuance server receives the scene start request transmitted from the smartphone 2. The mat ID and the game title ID are added to the scene start request.

In step S342, the game player issuance server specifies the scene that the user intends to start on the basis of the game title ID and the like transmitted from the smartphone 2, and generates a scene ID.

In step S343, the game player issuance server associates the mat ID with the generated scene ID. For example, in the game management information managed by the game player issuance server, the mat ID is associated with the scene ID.

In step S344, the game player issuance server transmits the scene ID associated with the mat ID to the smartphone 2.

In step S325, the smartphone 2 receives the scene ID transmitted from the game player issuance server.

In step S326, the smartphone 2 displays a card holding-over waiting screen. The card holding-over waiting screen is a screen for guiding the user to hold the card 3 over the play mat 1.

When the card 3 is held over, the smartphone 2 transmits the scene ID to the play mat 1 together with the Write command in step S327 of FIG. 29. The Write command transmitted here is a command used for data writing to the card 3.

In step S303, the play mat 1 receives the Write command (data writing of the card 3) and the scene ID transmitted from the smartphone 2.

In step S304, the play mat 1 transmits the scene ID to the card 3 together with the Write command (data writing of the card 3).

In step S351, the card 3 receives the Write command and the scene ID transmitted from the play mat 1.

In step S352, the card 3 executes the Write command and writes the scene ID into the IC chip.

In step S353, the card 3 transmits information indicating that the writing has been completed to the play mat 1.

In step S305, the play mat 1 receives the information transmitted from the card 3.

In step S306, the play mat 1 transmits, to the smartphone 2, information indicating that the writing of the scene ID has been completed in the card 3.

In step S328, the smartphone 2 receives the information transmitted from the play mat 1.

In step S329, the smartphone 2 transmits the scene ID to the play mat 1 together with the Write command (data writing of the play mat 1).

In step S307, the play mat 1 receives the Write command and the scene ID transmitted from the smartphone 2.

In step S308, the play mat 1 executes the Write command and writes the scene ID into the NFC IC 84.

In step S309, the play mat 1 transmits information indicating that the writing has been completed to the smartphone 2.

In step S330, the smartphone 2 receives the information transmitted from the play mat 1.

In step S331, the smartphone 2 presents the scene ID to the leader.

In step S312, the leader confirms the scene ID displayed on the display of the smartphone 2.

Scene Participant Registration Processing

Figure 30:
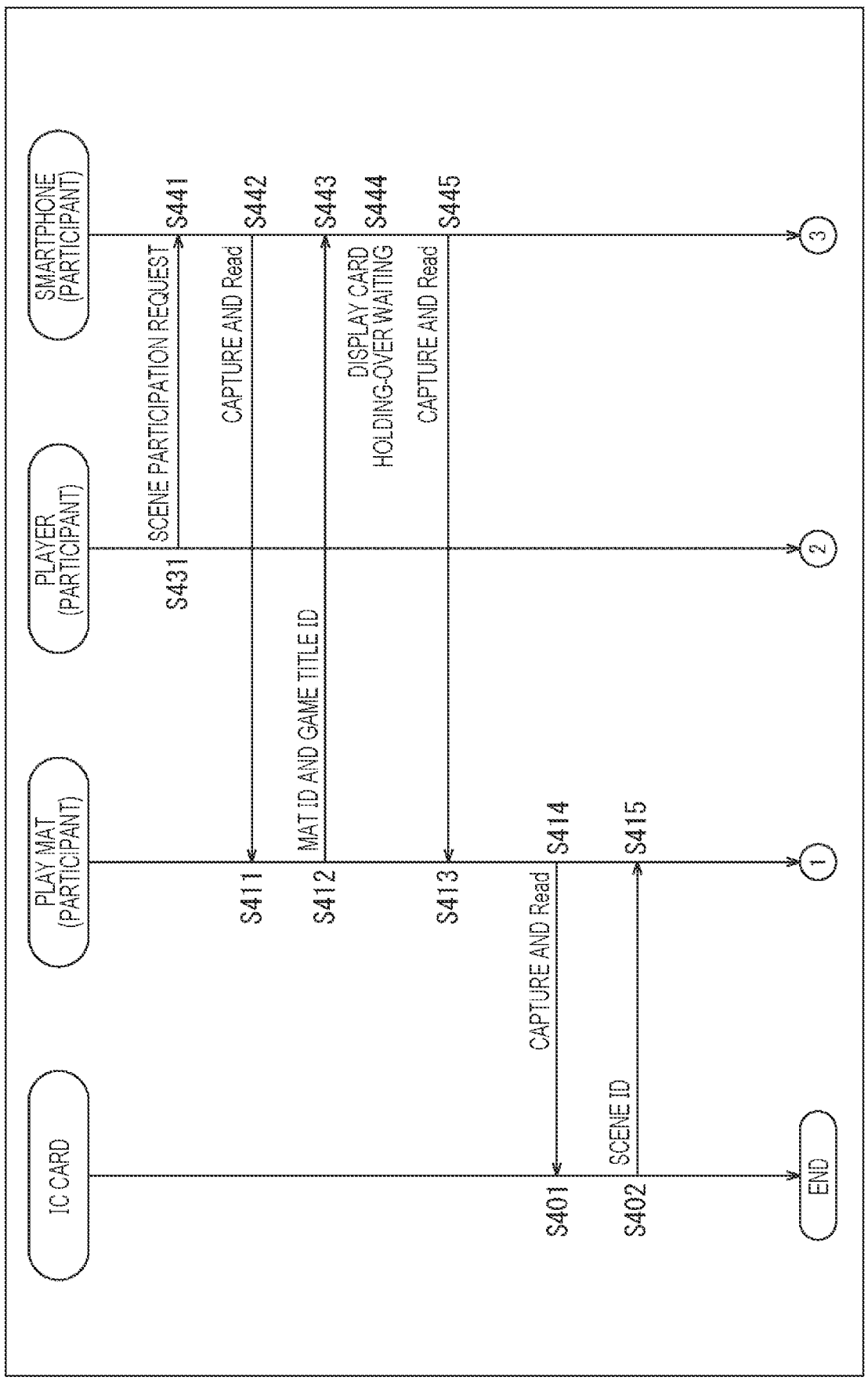
FIG. 30 is a flowchart explaining scene participant registration processing.
Figure 31:
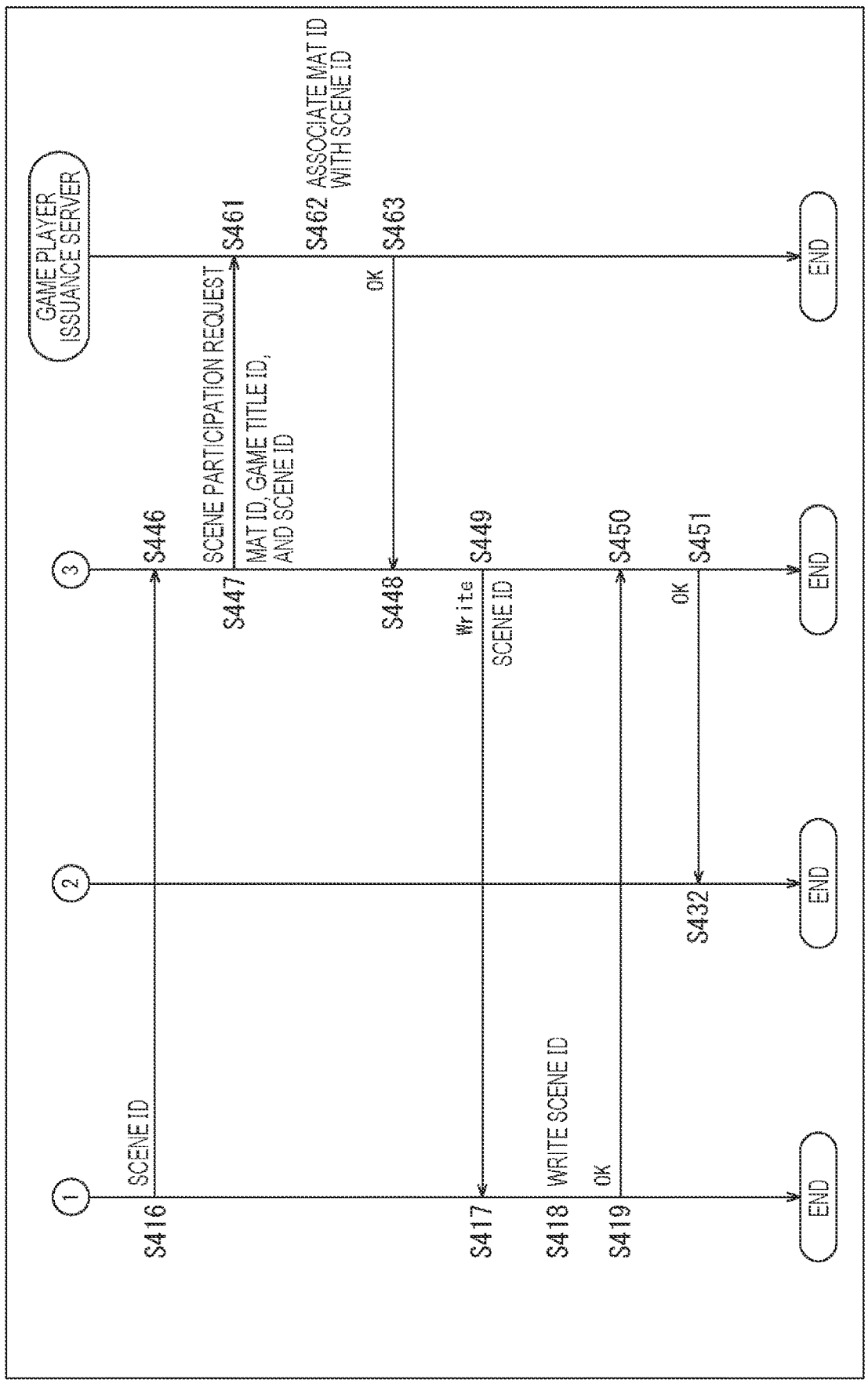
FIG. 31 is a flowchart explaining scene participant registration processing.

FIGS. 30 and 31 are flowcharts explaining the scene participant registration processing.

As described with reference to FIGS. 15 and 16, a player who intends to participate in the game of a certain scene needs to perform participant registration by holding the card 3 in which the scene ID is written by the leader over his/her own play mat 1.

In response to the operation of the player who becomes a participant, the processing shown in FIGS. 30 and 31 is performed among the play mat 1 of the participant, the smartphone 2 of the participant, the card 3 received by the participant from the leader, and the game management server 12 operating as the game player issuance server.

In step S431, the player who becomes a participant performs an operation for requesting participation to the scene using his/her own smartphone 2.

In step S441, the smartphone 2 receives an operation by the participant.

In step S442, the smartphone 2 captures the play mat 1 and transmits the Read command.

In step S411, the play mat 1 receives the Read command transmitted from the smartphone 2.

In step S412, the play mat 1 transmits the mat ID and the game title ID to the smartphone 2 in response to the Read command.

In step S443, the smartphone 2 receives the mat ID and the game title ID transmitted from the play mat 1.

In step S444, the smartphone 2 displays the card holding-over waiting screen. The card holding-over waiting screen displayed here is a screen for guiding the participant to hold the card 3 received from the leader over the play mat 1. The participant receives, from the leader, the card 3 in which the scene ID is written, and holds the card 3 over his/her own play mat 1.

When the card 3 is held over, in step S445, the smartphone 2 captures the play mat 1 and transmits the Read command.

In step S413, the play mat 1 receives the Read command transmitted from the smartphone 2.

In step S414, the play mat 1 captures the card 3 and transmits the Read command.

In step S401, the card 3 receives the Read command transmitted from the play mat 1.

In step S402, the card 3 transmits the scene ID to the play mat 1 in response to the Read command.

In step S416 of FIG. 31, the play mat 1 transmits the scene ID transmitted from the card 3 to the smartphone 2.

In step S446, the smartphone 2 receives the scene ID transmitted from the play mat 1.

In step S447, the smartphone 2 transmits the mat ID and the game title ID read from the play mat 1 of the participant, together with the scene ID transmitted from the play mat 1, to the game player issuance server, and requests participation to the scene.

In step S461, the game player issuance server receives the scene participation request transmitted from the smartphone 2. The mat ID, the game title ID, and the scene ID are added to the scene participation request.

In step S462, the game player issuance server associates the mat ID with the scene ID. Therefore, the mat ID of the play mat 1 of the participant is associated with the scene ID.

In step S463, the game player issuance server transmits, to the smartphone 2, information indicating that the association between the scene ID and the mat ID has been completed.

In step S448, the smartphone 2 receives the information transmitted from the game player issuance server.

In step S449, the smartphone 2 transmits the scene ID to the play mat 1 together with the Write command (data writing of the play mat 1).

In step S417, the play mat 1 receives the Write command and the scene ID transmitted from the smartphone 2.

In step S418, the play mat 1 executes the Write command and writes the scene ID into the NFC IC 84.

In step S419, the play mat 1 transmits information indicating that the writing has been completed to the smartphone 2.

In step S450, the smartphone 2 receives the information transmitted from the play mat 1.

In step S451, the smartphone presents the player that the participant registration has been completed.

In step S432, the player registered as a participant confirms the information displayed on the display of the smartphone 2.

Point Distribution Processing 1

Figure 32:
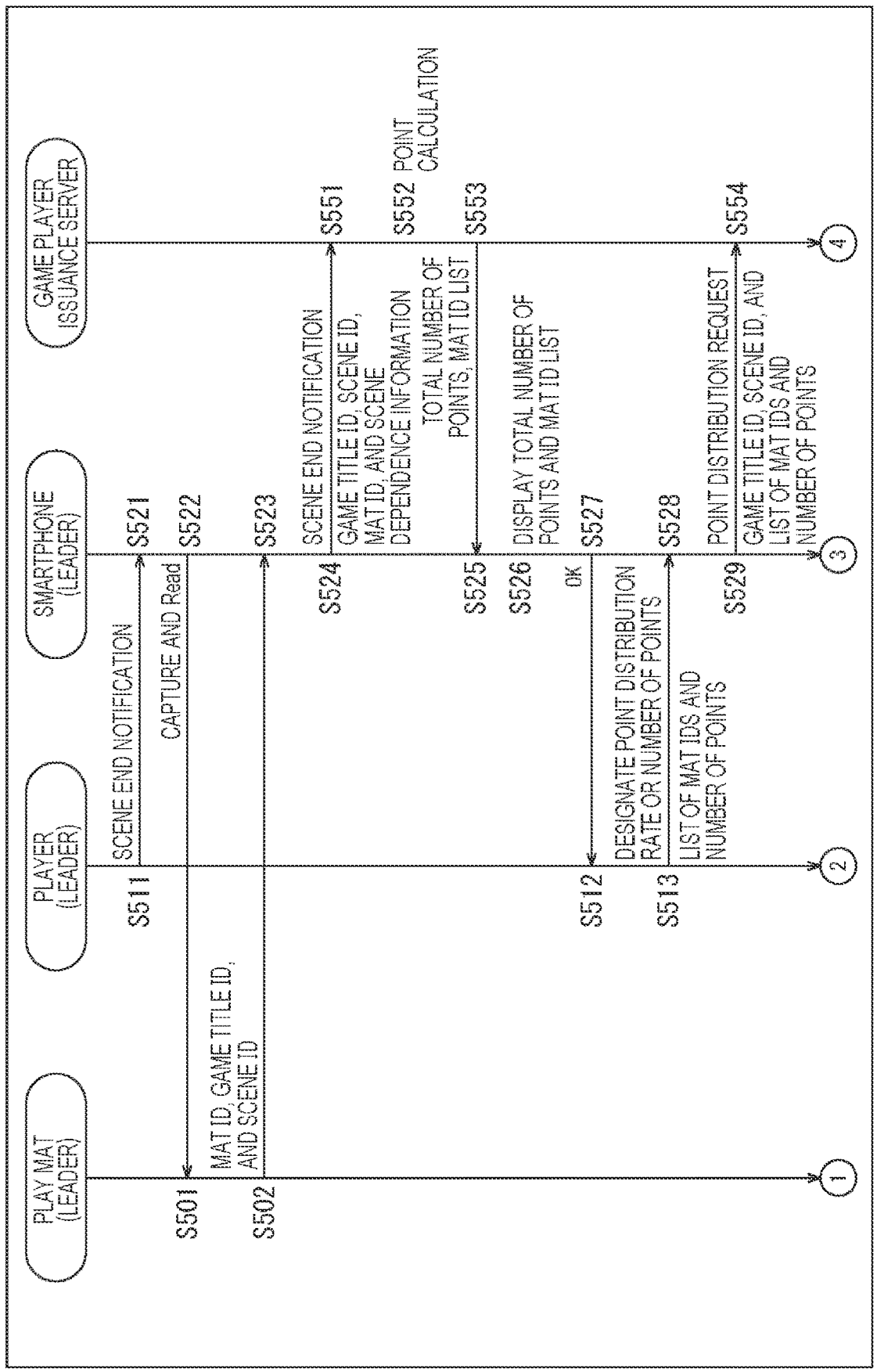
FIG. 32 is a flowchart explaining point distribution processing.
Figure 33:
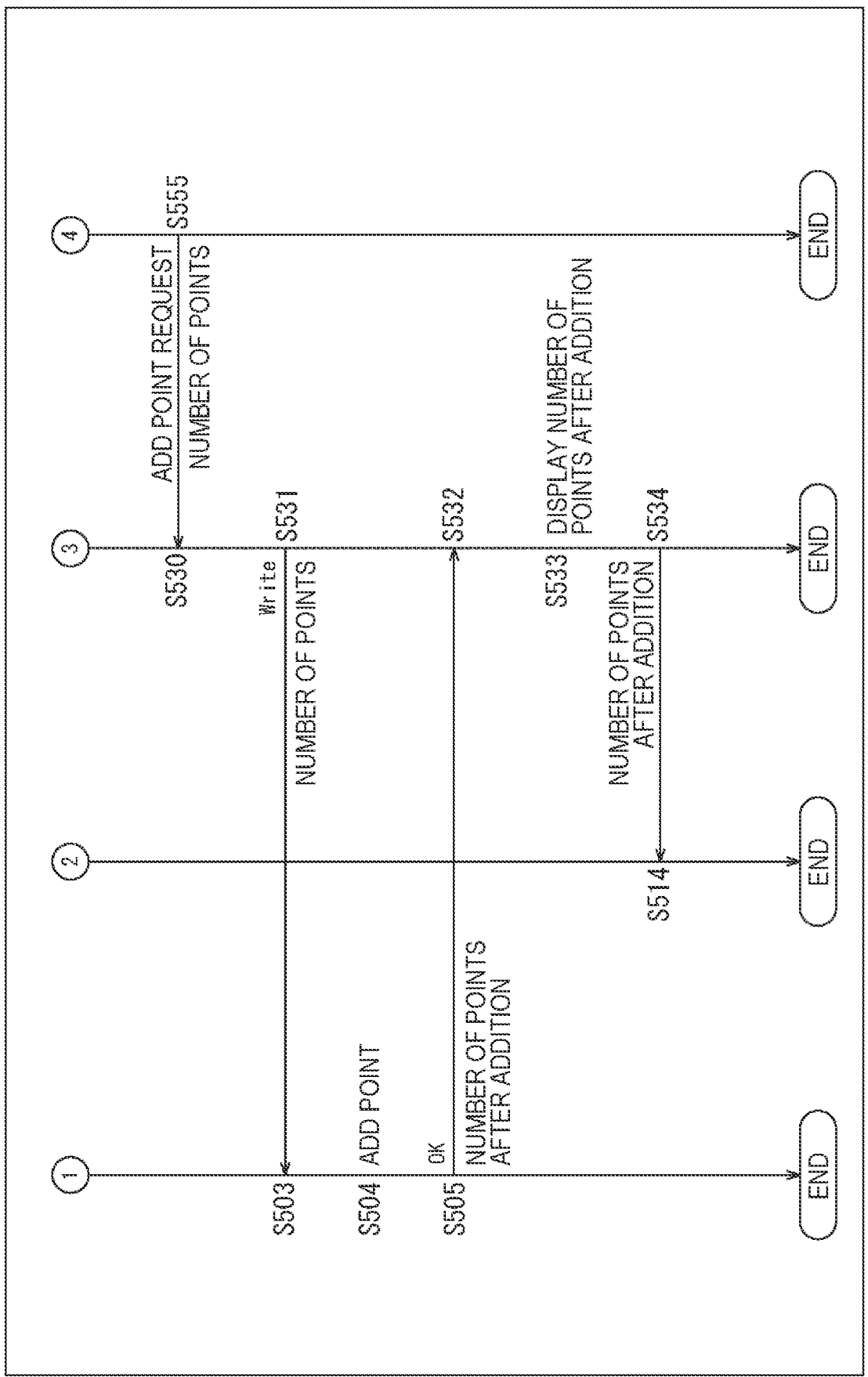
FIG. 33 is a flowchart explaining point distribution processing.

FIGS. 32 and 33 are flowcharts for explaining the point distribution processing.

As described with reference to FIG. 17, the points serving as the reward of the game are collectively issued to the leader. Information such as a distribution rate among the members is set by the leader.

In response to the operation of the leader, the processing shown in FIGS. 32 and 33 is performed among the play mat 1 of the leader, the smartphone 2 of the leader, and the game management server 12 operating as a game player issuance server.

In step S511, the leader performs an operation for notifying the end of the scene using his/her own smartphone 2.

In step S521, the smartphone 2 receives an operation by the user.

In step S522, the smartphone 2 captures the play mat 1 and transmits the Read command.

In step S501, the play mat 1 receives the Read command transmitted from the smartphone 2.

In step S502, the play mat 1 transmits the mat ID, the game title ID, and the scene ID to the smartphone 2 in response to the Read command.

In step S523, the smartphone 2 receives the mat ID, the game title ID, and the scene ID transmitted from the play mat 1.

In step S524, the smartphone 2 transmits a scene end notification to the game player issuance server. The scene end notification transmitted to the game player issuance server includes scene dependence information together with the mat ID, the game title ID, and the scene ID.

The scene dependence information is information indicating the content of the scene that the leader has finished. The scene dependence information includes information on, for example, a competition result aggregated by the leader and the like.

In step S551, the game player issuance server receives the scene end notification transmitted from the smartphone 2.

In step S552, the game player issuance server calculates the point on the basis of the information transmitted from the smartphone 2 together with the scene end notification.

In step S553, the game player issuance server transmits the total number of points and a mat ID list to the smartphone 2.

The total number of points is the number of points collectively issued to the leader. The mat ID list is a list of mat IDs of the play mats 1 of each of the leader and the participants who played the game of the same scene.

In step S525, the smartphone 2 receives the total number of points and the mat ID list transmitted from the game player issuance server.

In step S526, the smartphone 2 displays the total number of points and the mat ID list.

In step S527, the smartphone 2 guides the leader to confirm the total number of points and the mat ID list.

In step S512, the leader confirms the information displayed on the display of the smartphone 2.

In step S513, the leader designates the point distribution rate or the number of points using the smartphone 2. Here, the ratio of the points to be distributed to each of the leader and the participants or the number of points is designated by the leader.

In step S528, the smartphone 2 receives designation by the leader.

In step S529, the smartphone 2 transmits the game title ID, the scene ID, the mat ID, and the list of the number of points to the game player issuance server. The list of the number of points describes, for example, the number of points to be distributed to each of the leader and the participants.

In step S554, the game player issuance server receives the game title ID, the scene ID, the mat ID, and the list of the number of points transmitted from the smartphone 2.

In step S555 of FIG. 33, the game player issuance server transmits the number of points to the smartphone 2 and requests addition of points.

In step S530, the smartphone 2 receives the point addition request transmitted from the game player issuance server. Information indicating the number of points to be added is added to the point addition request.

In step S531, the smartphone 2 transmits the Write command (data writing of the play mat 1) to the play mat 1 together with the number of points.

In step S503, the play mat 1 receives the Write command and the number of points transmitted from the smartphone 2.

In step S504, the play mat 1 executes the Write command and adds a point. Points corresponding to the number of points transmitted together with the Write command are added to the points stored in the NFC IC 84 of the play mat 1.

In step S505, the play mat 1 transmits information indicating that the addition has been completed to the smartphone 2 together with the number of points after the addition.

In step S532, the smartphone 2 receives the information transmitted from the play mat 1.

In step S533, the smartphone 2 displays the number of points after the addition.

In step S534, the smartphone 2 presents the leader the number of points after the addition.

In step S514, the leader confirms the number of points after the addition displayed on the display of the smartphone 2.

In this manner, the points serving as the reward for the game are stored in the NFC IC 84 of the play mat 1 and managed in association with the mat ID.

Point Distribution Processing 2

Figure 34:
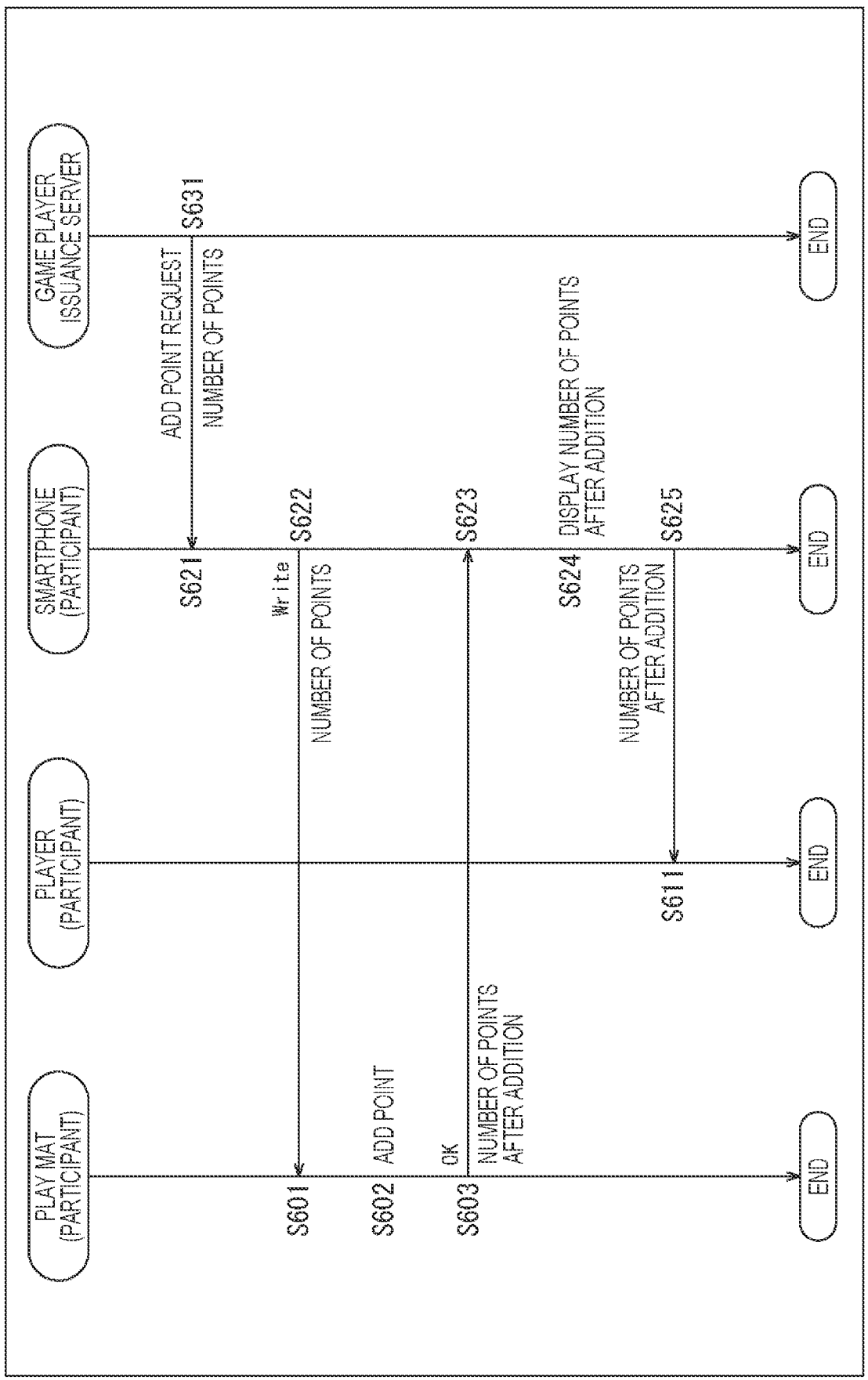
FIG. 34 is a flowchart following FIGS. 32 and 33 explaining point distribution processing.

FIG. 34 is a flowchart following FIGS. 32 and 33 explaining the point distribution processing.

The processing shown in FIG. 34 is basically the same as the processing in and after step S555 in FIG. 33 except that the point distribution destination is not the play mat 1 of the leader but the play mat 1 of the participant. Redundant descriptions will be omitted as appropriate. The processing shown in FIG. 34 is performed among the play mat 1 of the participant, the smartphone 2 of the participant, and the game management server 12 operating as the game player issuance server.

In step S631, the game player issuance server transmits the number of points to the smartphone 2 and requests addition of points.

In step S621, the smartphone 2 receives the point addition request transmitted from the game player issuance server.

In step S622, the smartphone 2 transmits the Write command (data writing of the play mat 1) to the play mat 1 together with the number of points.

In step S601, the play mat 1 receives the Write command and the number of points transmitted from the smartphone 2.

In step S602, the play mat 1 executes the Write command and adds a point.

In step S603, the play mat 1 transmits information indicating that the addition has been completed to the smartphone 2 together with the number of points after the addition.

In step S623, the smartphone 2 receives the information transmitted from the play mat 1.

In step S624, the smartphone 2 displays the number of points after the addition.

In step S625, the smartphone 2 presents the participant the number of points after the addition.

In step S611, the participant confirms the number of points after the addition displayed on the display of the smartphone 2.

The point distribution function based on the game management information is implemented by the above processing.

<Attribute Comparison Function>
Scene Start Processing

Figure 35:
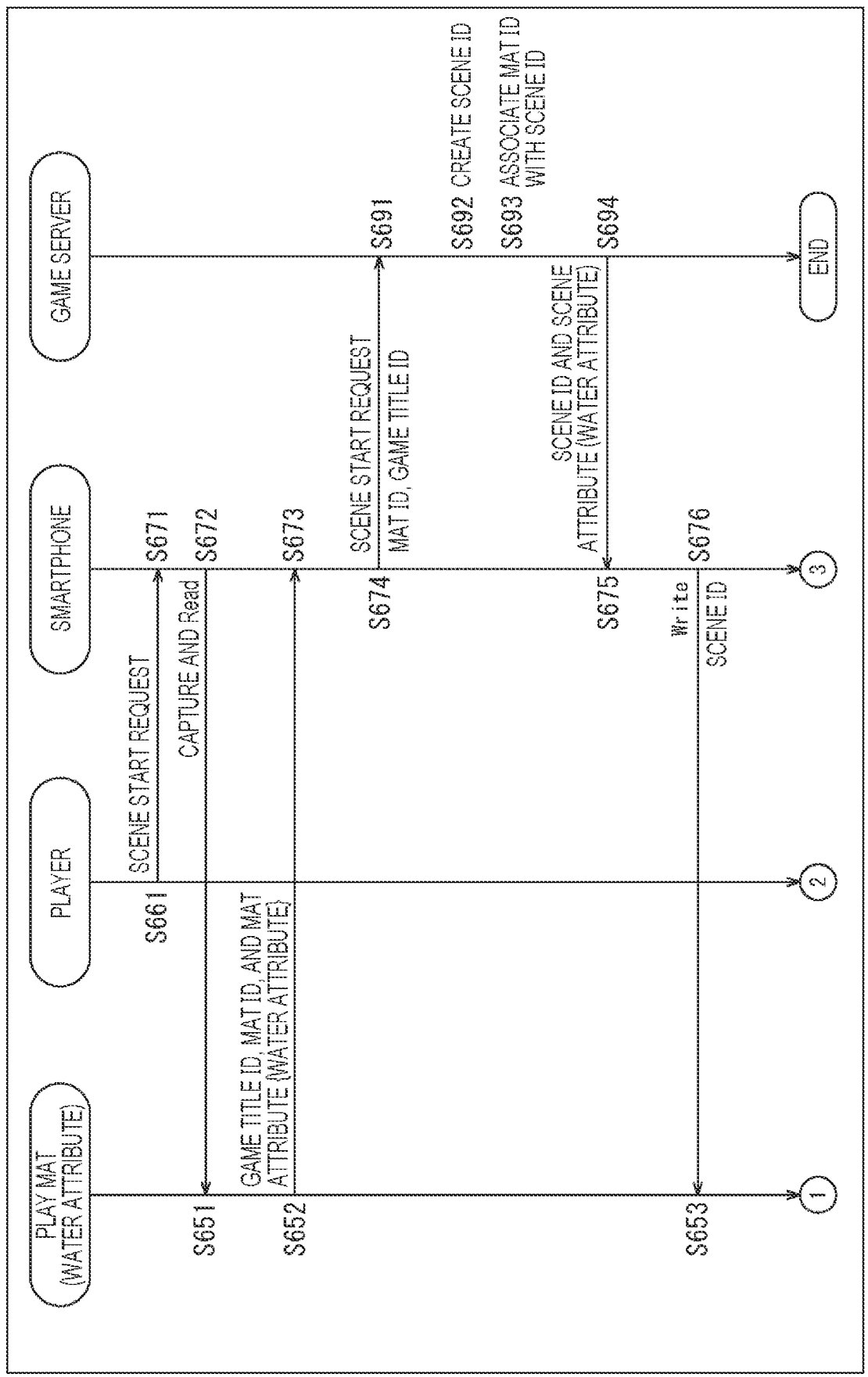
FIG. 35 is a flowchart explaining scene start processing.
Figure 36:
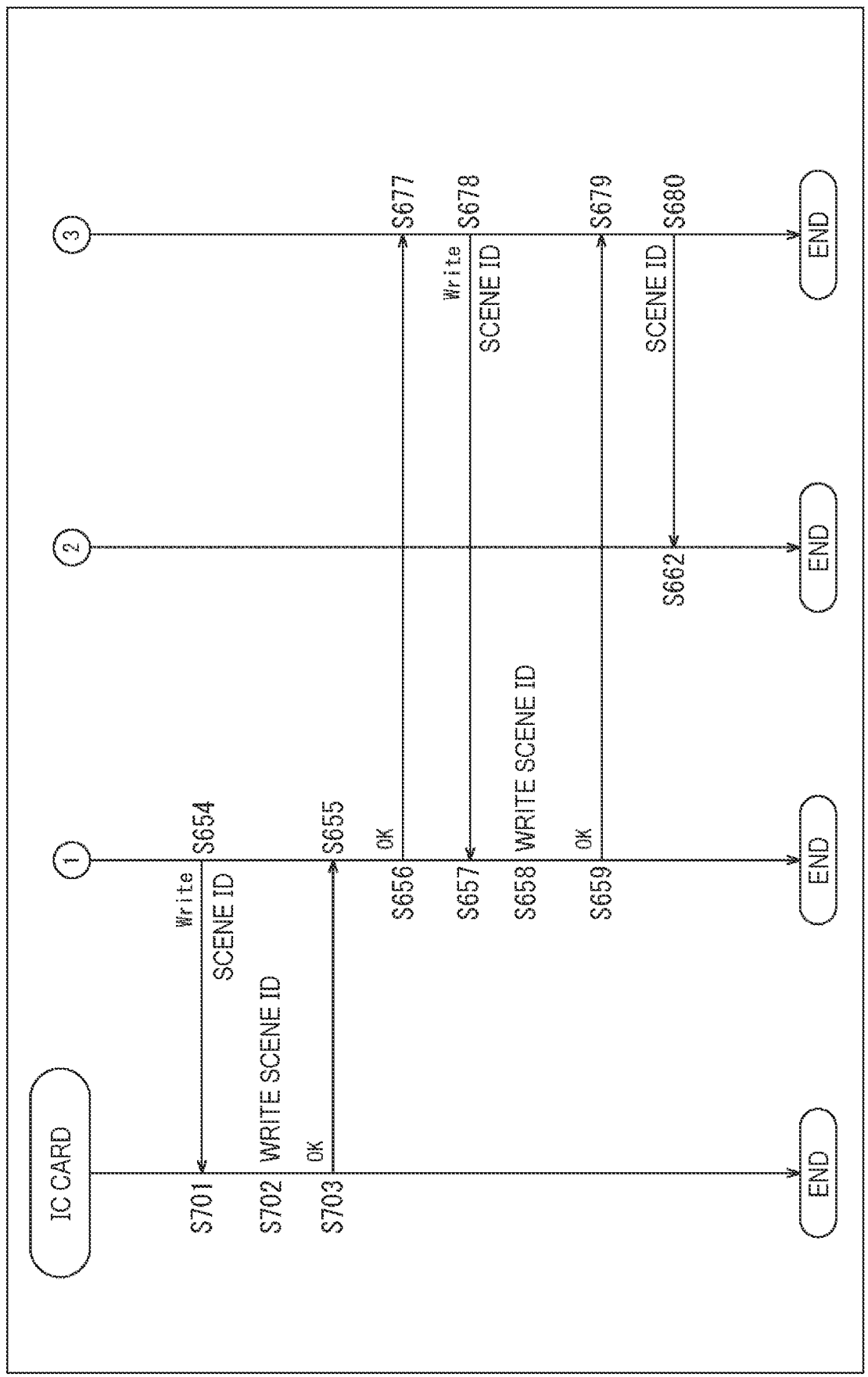
FIG. 36 is a flowchart explaining scene start processing.

FIGS. 35 and 36 are flowcharts explaining the scene start processing.

As described with reference to FIG. 19, in a case where the setting of the game changes according to the combination of the attribute of the play mat 1 and the attribute of the scene, the processing of associating the mat ID of the play mat 1 of each player who battles with the scene ID is performed.

In response to the operation of the player, the processing shown in FIGS. 35 and 36 is performed among the play mat 1 of the player, the smartphone 2 of the player, and the game management server 12 operating as a game server. The processing shown in FIG. 35 as the processing of the game server is processing performed by the game management server 12.

In step S661, the player serving as the leader performs an operation for requesting start of the scene using his/her own smartphone 2.

In step S671, the smartphone 2 receives an operation by the player.

In step S672, the smartphone 2 captures the play mat 1 and transmits the Read command.

In step S651, the play mat 1 receives the Read command transmitted from the smartphone 2.

In step S652, the play mat 1 transmits the game title ID, the mat ID, and the mat attribute to the smartphone 2 in response to the Read command. For example, information indicating that the mat attribute is the water attribute is read from the NFC IC 84 of the play mat 1.

In step S673, the smartphone 2 receives the game title ID, the mat ID, and the mat attribute transmitted from the play mat 1.

In step S674, the smartphone 2 transmits the mat ID and the game title ID read from the play mat 1 to the game server, and requests the start of the scene.

In step S691, the game server receives the scene start request transmitted from the smartphone 2. The mat ID and the game title ID are added to the scene start request.

In step S692, the game server generates a scene ID on the basis of the game title ID and the like transmitted from the smartphone 2.

In step S693, the game server associates the mat ID with the generated scene ID.

In step S694, the game server transmits the scene ID associated with the mat ID and the scene attribute to the smartphone 2. In this example, the attribute of the scene identified by the scene ID associated with the mat ID is the water attribute. The game server has information regarding the attribute of each scene.

In step S675, the smartphone 2 receives the scene ID and the scene attribute transmitted from the game server. In the smartphone 2, it is specified that the scene attribute of the game that the player intends to start is the water attribute.

In step S676, the smartphone 2 transmits the scene ID to the play mat 1 together with the Write command (data writing of the card 3).

In step S653, the play mat 1 receives the Write command (data writing of the card 3) and the scene ID transmitted from the smartphone 2.

In step S654 of FIG. 36, the play mat 1 transmits the scene ID to the card 3 together with the Write command (data writing of the card 3).

In step S701, the card 3 receives the Write command and the scene ID transmitted from the play mat 1.

In step S702, the card 3 executes the Write command and writes the scene ID into the IC chip.

In step S703, the card 3 transmits information indicating that the writing has been completed to the play mat 1.

In step S655, the play mat 1 receives the information transmitted from the card 3.

In step S656, the play mat 1 transmits, to the smartphone 2, information indicating that the writing of the scene ID has been completed in the card 3.

In step S677, the smartphone 2 receives the information transmitted from the play mat 1.

In step S678, the smartphone 2 transmits the scene ID to the play mat 1 together with the Write command (data writing of the play mat 1).

In step S657, the play mat 1 receives the Write command and the scene ID transmitted from the smartphone 2.

In step S658, the play mat 1 executes the Write command and writes the scene ID into the NFC IC 84.

In step S659, the play mat 1 transmits information indicating that the writing has been completed to the smartphone 2.

In step S679, the smartphone 2 receives the information transmitted from the play mat 1.

In step S680, the smartphone 2 presents the player the scene ID.

In step S662, the player checks the scene ID displayed on the display of the smartphone 2.

Scene Participant Registration Processing 1

Figure 37:
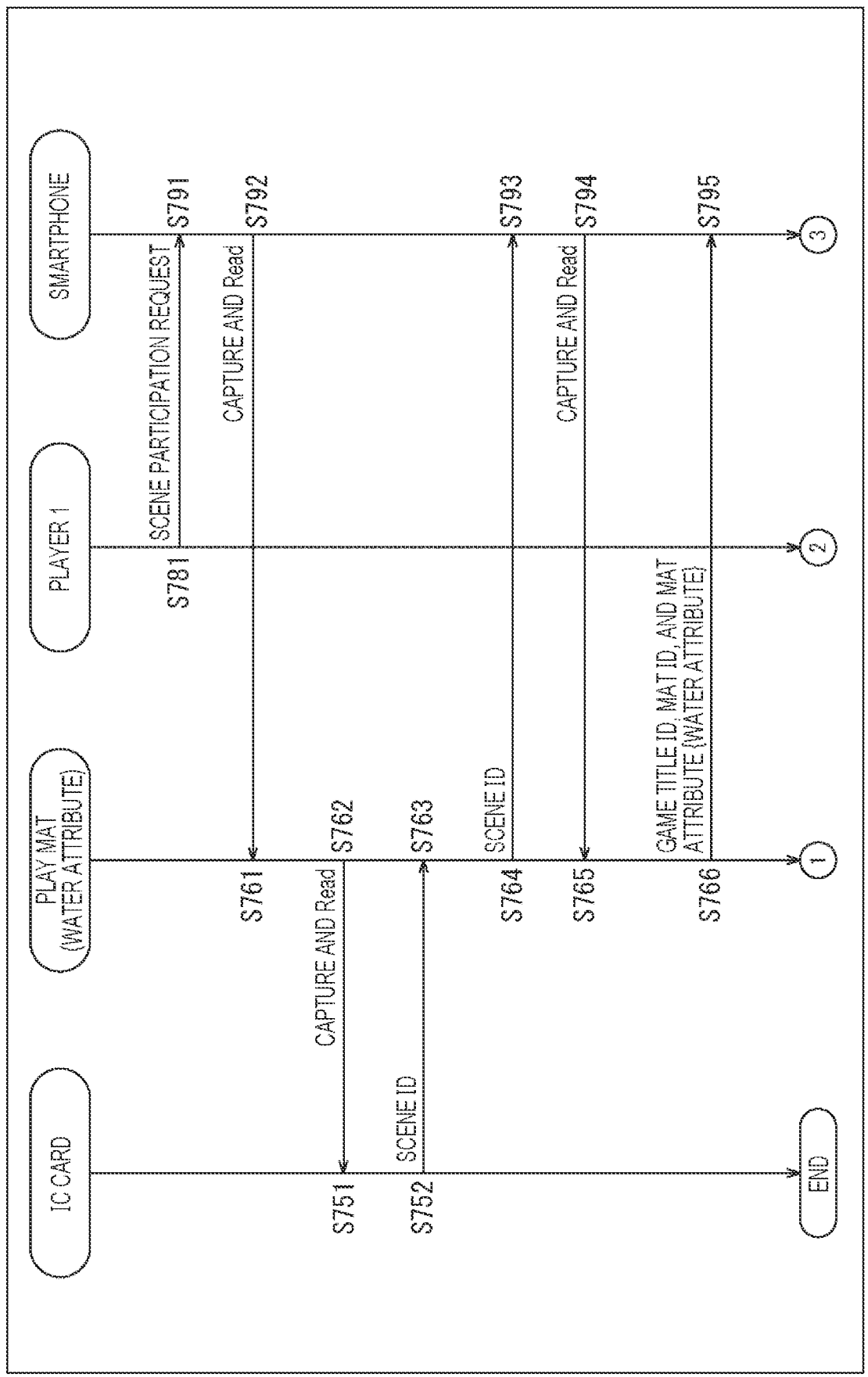
FIG. 37 is a flowchart explaining scene participant registration processing.
Figure 38:
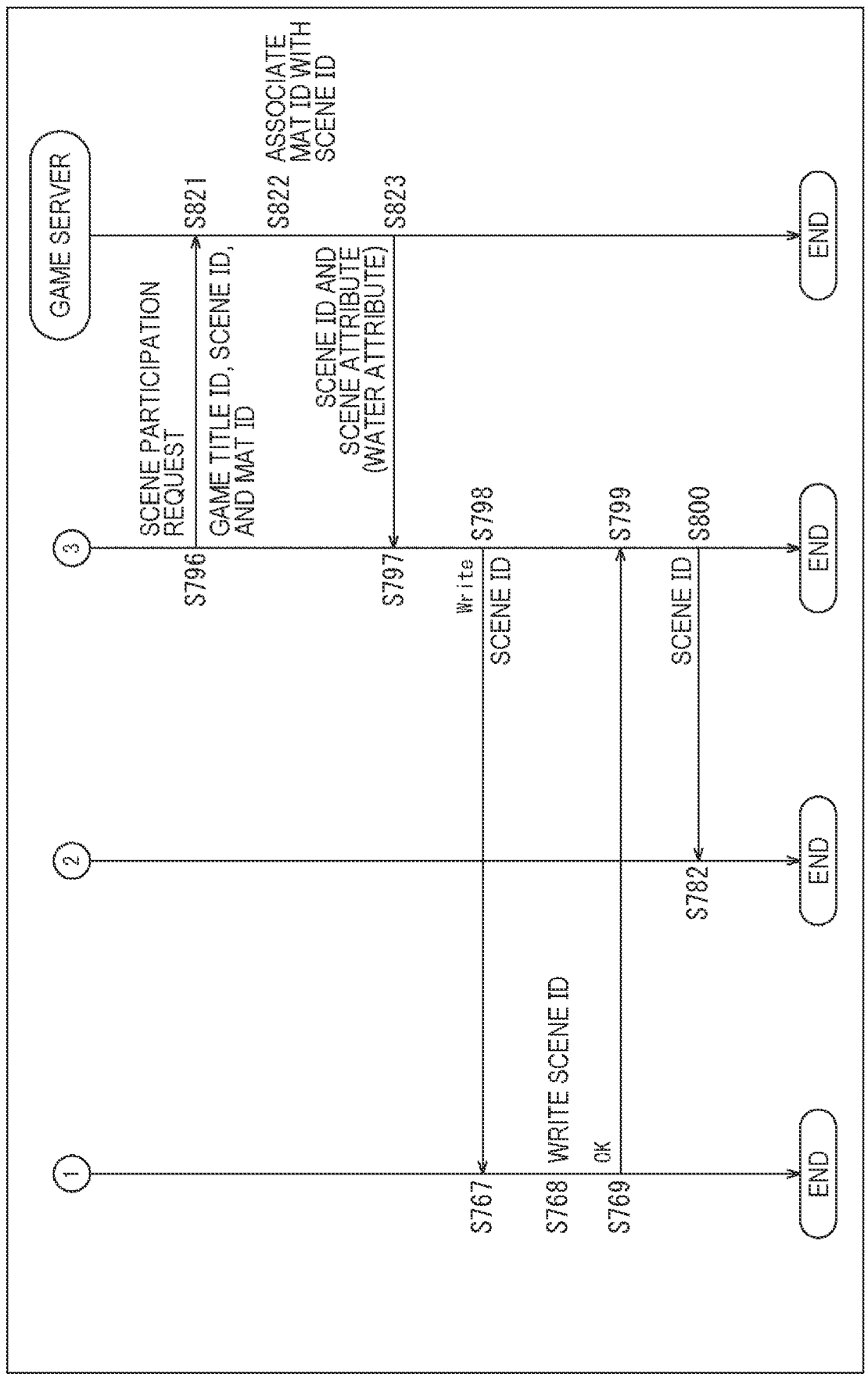
FIG. 38 is a flowchart explaining scene participant registration processing.

FIGS. 37 and 38 are flowcharts explaining the scene participant registration processing.

A user who intends to participate in the game of a certain scene needs to perform participant registration by holding the card 3 in which the scene ID is written over his/her own play mat 1. Here, it is assumed that the player 1 performs participant registration.

In response to the operation of the player 1 who becomes a participant, the processing shown in FIGS. 37 and 38 is performed among the play mat 1 of the player 1, the smartphone 2 of the player 1, the card 3 in which the scene ID is written, and the game management server 12 operating as a game server.

In step S781, the player 1 uses his/her own smartphone 2 to perform an operation for requesting participation in the scene.

In step S791, the smartphone 2 receives the operation by the player 1.

In step S792, the smartphone 2 captures the play mat 1 and transmits the Read command.

In step S761, the play mat 1 receives the Read command transmitted from the smartphone 2.

In step S762, the play mat 1 captures the card 3 and transmits the Read command.

In step S751, the card 3 receives the Read command transmitted from the play mat 1.

In step S752, the card 3 transmits the scene ID to the play mat 1 in response to the Read command.

In step S763, the play mat 1 receives the scene ID transmitted from the card 3.

In step S764, the play mat 1 transmits the scene ID read from the card 3 to the smartphone 2.

In step S793, the smartphone 2 receives the scene ID transmitted from the play mat 1.

In step S794, the smartphone 2 captures the play mat 1 and transmits the Read command.

In step S765, the play mat 1 receives the Read command transmitted from the smartphone 2.

In step S766, the play mat 1 transmits the game title ID, the mat ID, and the mat attribute to the smartphone 2 in response to the Read command. In this example, the mat attribute of the play mat 1 of the player 1 is the water attribute.

In step S795, the smartphone 2 receives the game title ID, the mat ID, and the mat attribute transmitted from the play mat 1.

In step S796 of FIG. 38, the smartphone 2 transmits the game title ID, the scene ID, and the mat ID read from the play mat 1 to the game server, and requests participation in the scene.

In step S821, the game server receives the scene participation request transmitted from the smartphone 2. The mat ID, the game title ID, and the scene I are added to the scene participation request.

In step S822, the game server associates the mat ID with the scene ID.

In step S823, the game server transmits the scene ID and the scene attribute (water attribute) to the smartphone 2.

In step S797, the smartphone 2 receives the scene ID and the scene attribute (water attribute) transmitted from the game server.

In step S798, the smartphone 2 transmits the scene ID to the play mat 1 together with the Write command (data writing of the play mat 1).

In step S767, the play mat 1 receives the Write command and the scene ID transmitted from the smartphone 2.

In step S768, the play mat 1 executes the Write command and writes the scene ID into the NFC IC 84.

In step S769, the play mat 1 transmits information indicating that the writing has been completed to the smartphone 2.

In step S799, the smartphone 2 receives the information transmitted from the play mat 1.

In step S800, the smartphone presents the player the scene ID. The presentation of the scene ID is a presentation for notifying that the participant registration of the player 1 has been completed.

In step S782, the player checks the scene ID displayed on the display of the smartphone 2.

Scene Participant Registration Processing 2

Figure 39:
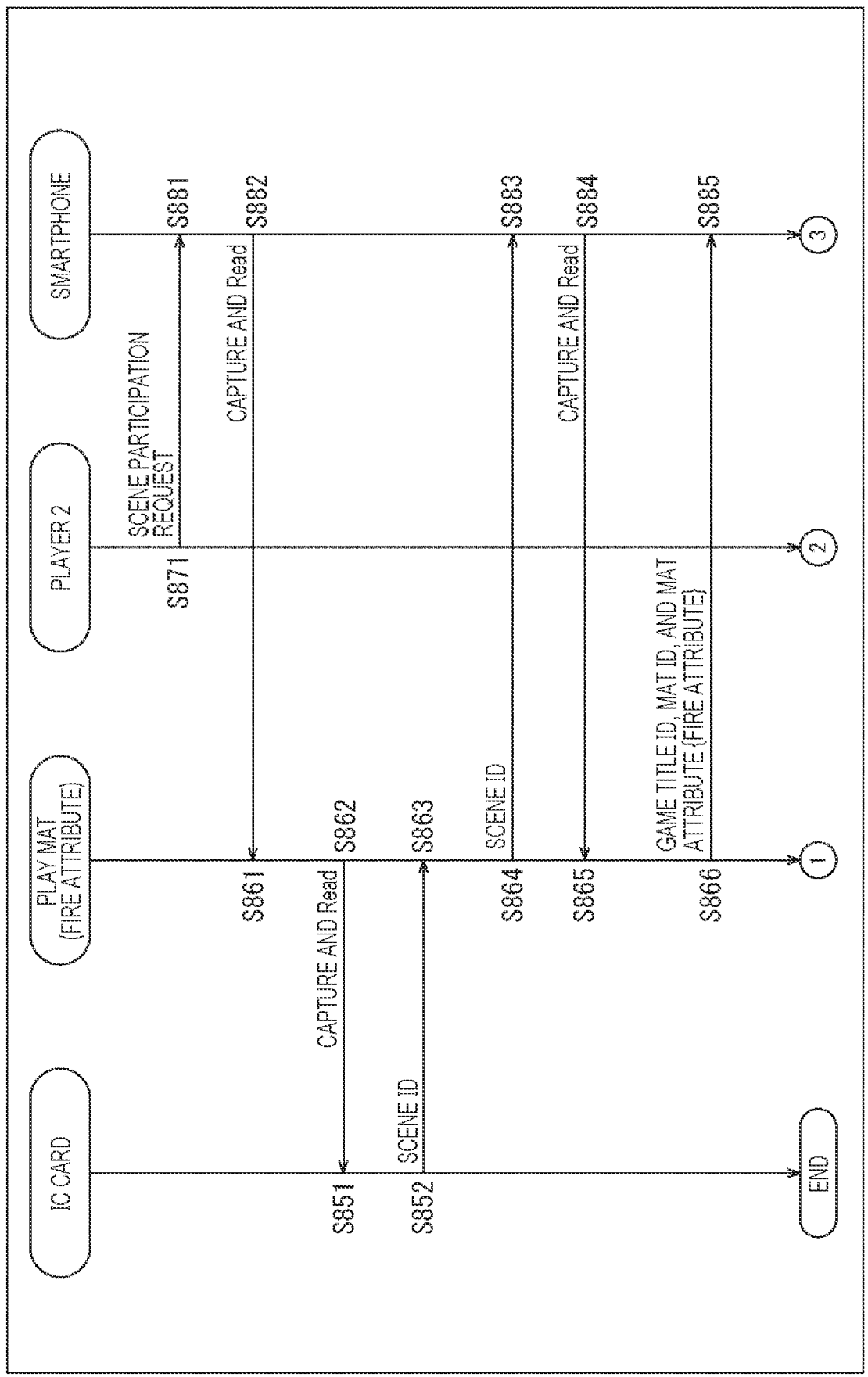
FIG. 39 is a flowchart explaining scene participant registration processing.
Figure 40:
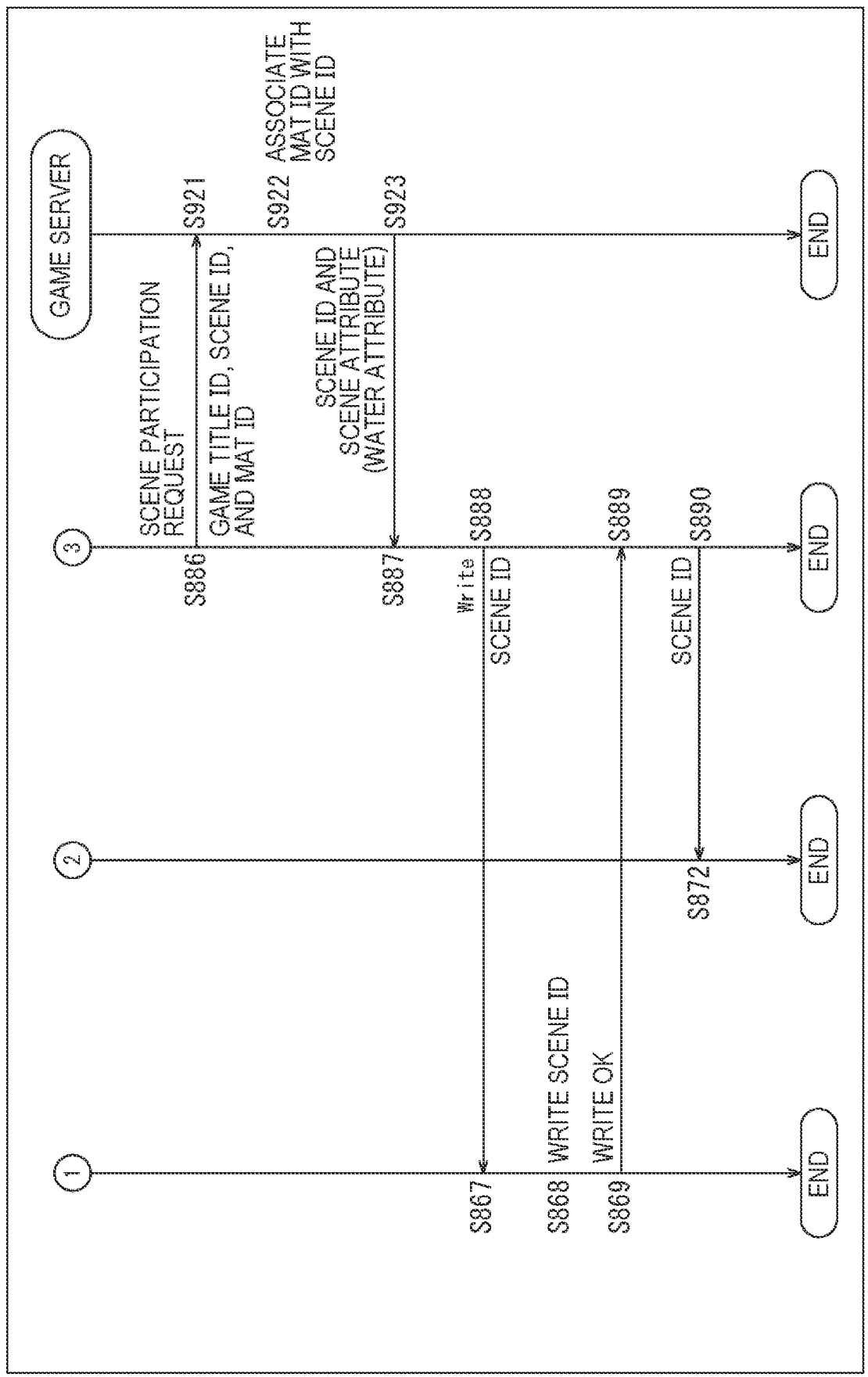
FIG. 40 is a flowchart explaining scene participant registration processing.

FIGS. 39 and 40 are flowcharts explaining the scene participant registration processing.

Here, it is assumed that the player 2 performs participant registration. The mat attribute of the play mat 1 of the player 2 is the fire attribute. The processing shown in FIGS. 39 and 40 is similar to the processing described with reference to FIGS. 37 and 38 except that the player serving as the participant is different.

That is, in step S866, the play mat 1 transmits the game title ID, the mat ID, and the mat attribute to the smartphone 2 in response to the Read command transmitted from the smartphone 2. In this example, the mat attribute of the play mat 1 of the player 2 is the fire attribute.

The mat attribute of the play mat 1 of the player 1 for which the participant registration has been performed by the processing of FIGS. 37 and 38 is the water attribute same as the scene attribute. On the other hand, the mat attribute of the play mat 1 of the player 2 for which the participant registration has been performed by the processing of FIGS. 39 and 40 is the fire attribute unlike the scene attribute.

With the smartphone 2 in which the combination of the mat attribute and the scene attribute is specified, the game is played so that the player 1 becomes advantageous.

<Tournament Management Function>
Scene Start Processing

Figure 41:
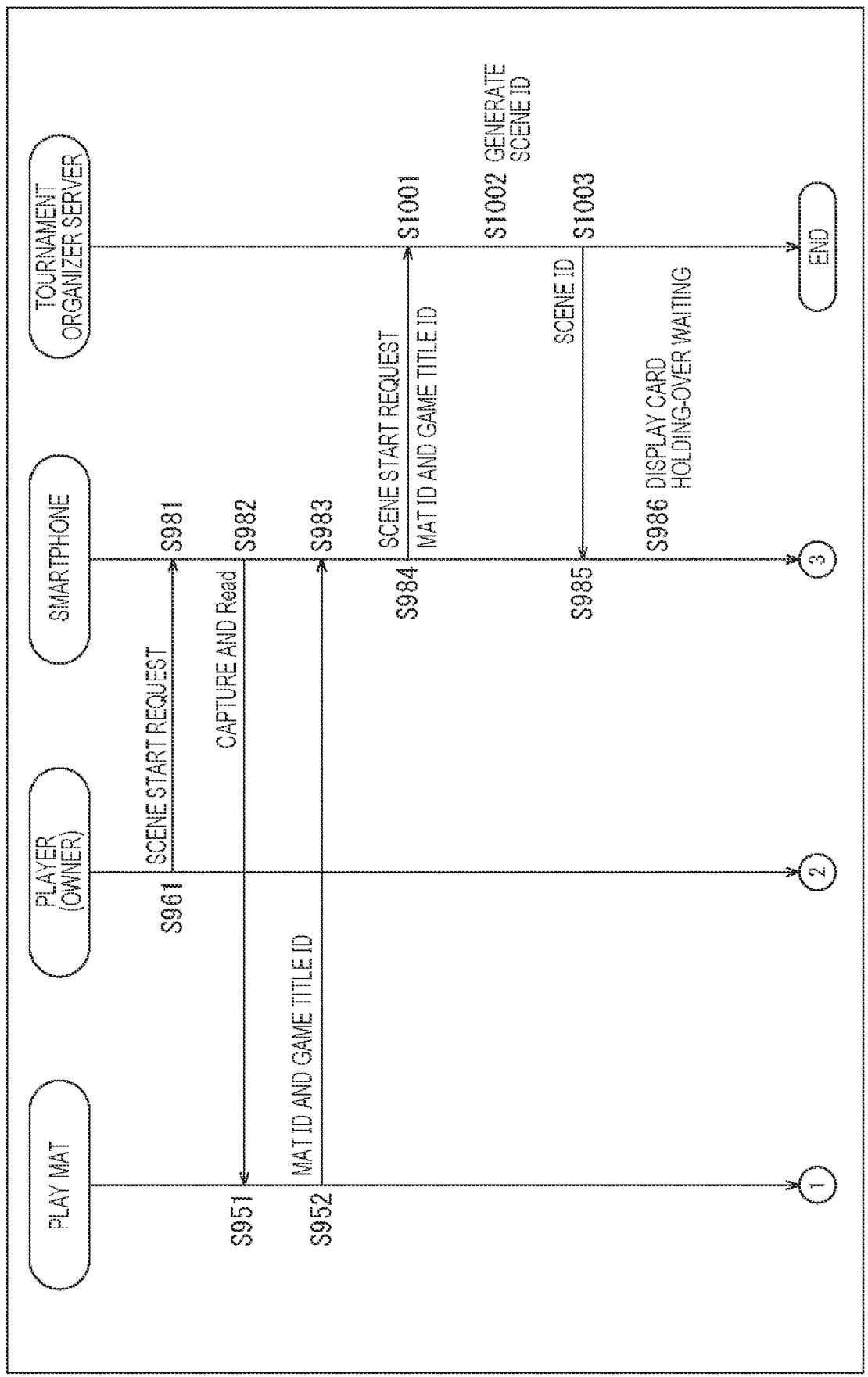
FIG. 41 is a flowchart explaining scene start processing.
Figure 42:
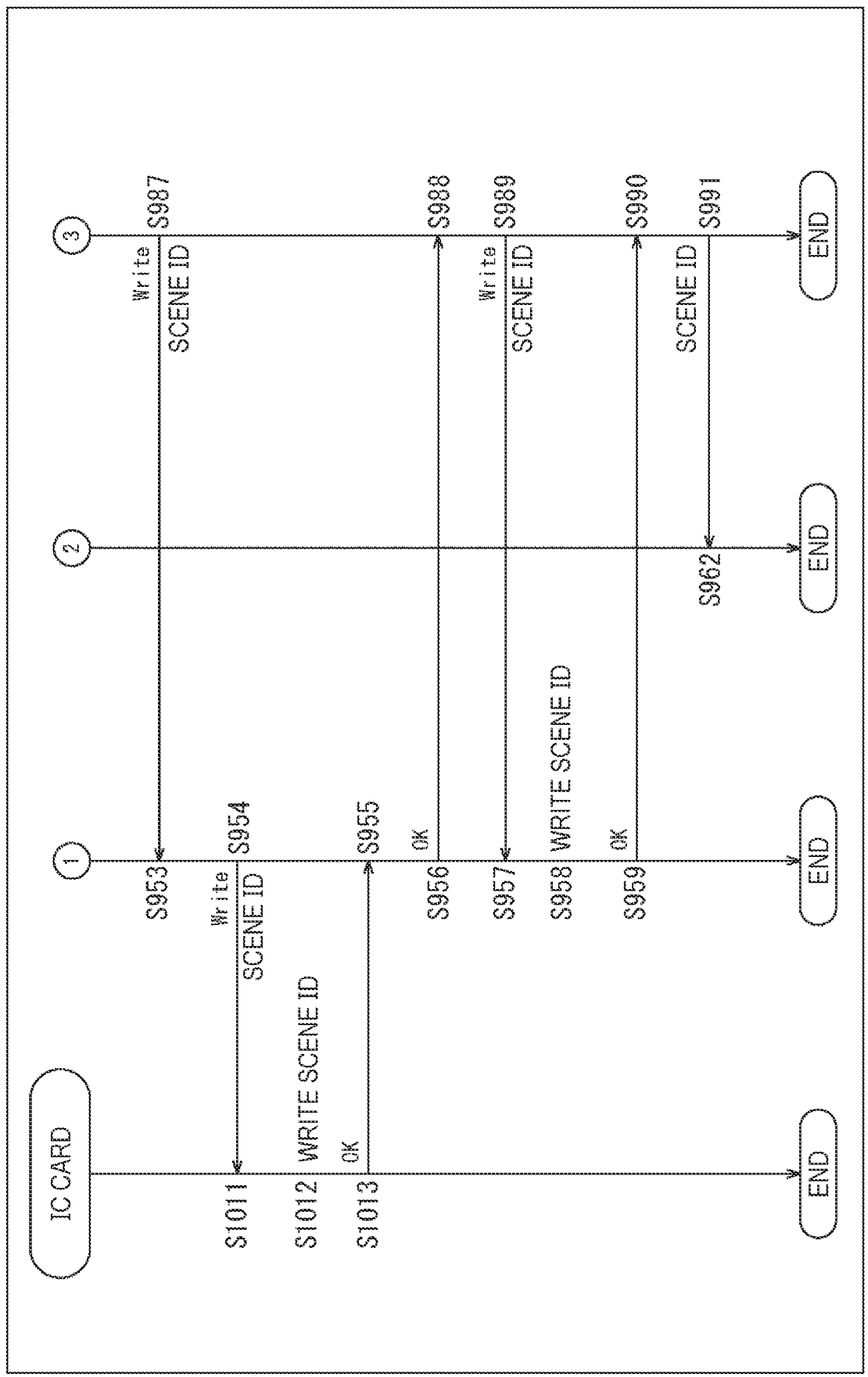
FIG. 42 is a flowchart explaining scene start processing.

FIGS. 41 and 42 are flowcharts explaining the scene start processing.

As described with reference to FIG. 20, the participants are registered using the card 3 in which the scene ID is written, similarly to, before the start of a battle by the tournament method, at the time of point distribution, and the like.

In response to the operation of the player who becomes the owner of a certain venue, the processing shown in FIGS. 41 and 42 is performed among the play mat 1 prepared in the venue, the smartphone 2, and the game management server 12 operating as a tournament organizer server. The processing shown in FIG. 41 as the processing of the tournament organizer server is processing performed by the game management server 12.

In step S961, the owner uses his/her own smartphone 2 to perform an operation for requesting the start of the scene.

In step S981, the smartphone 2 receives the operation by the owner.

In step S982, the smartphone 2 captures the play mat 1 and transmits the Read command.

In step S951, the play mat 1 receives the Read command transmitted from the smartphone 2.

In step S952, the play mat 1 transmits the mat ID and the game title ID to the smartphone 2 in response to the Read command.

In step S983, the smartphone 2 receives the mat ID and the game title ID transmitted from the play mat 1.

In step S984, the smartphone 2 transmits, to the tournament organizer server, the mat ID and the game title ID transmitted from the play mat 1, and requests the start of the scene.

In step S1001, the tournament organizer server receives the scene start request transmitted from the smartphone 2. The mat ID and the game title ID are added to the scene start request.

In step S1002, the tournament organizer server generates a scene ID on the basis of the game title ID and the like transmitted from the smartphone 2.

In step S1003, the tournament organizer server transmits the generated scene ID to the smartphone 2.

In step S985, the smartphone 2 receives the scene ID transmitted from the tournament organizer server.

In step S986, the smartphone 2 displays the card holding-over waiting screen. The card holding-over waiting screen displayed here is a screen for guiding the owner to hold the card 3 over the play mat 1.

When the card 3 is held over, in step S987 of FIG. 42, the smartphone 2 transmits the scene ID to the play mat 1 together with the Write command (data writing of the card 3).

In step S953, the play mat 1 receives the Write command (data writing of the card 3) and the scene ID transmitted from the smartphone 2.

In step S954, the play mat 1 transmits the scene ID to the card 3 together with the Write command (data writing of the card 3).

In step S1011, the card 3 receives the Write command and the scene ID transmitted from the play mat 1.

In step S1012, the card 3 executes the Write command and writes the scene ID into the IC chip.

In step S1013, the card 3 transmits information indicating that the writing has been completed to the play mat 1.

In step S955, the play mat 1 receives the information transmitted from the card 3.

In step S965, the play mat 1 transmits, to the smartphone 2, information indicating that the writing of the scene ID has been completed in the card 3.

In step S988, the smartphone 2 receives the information transmitted from the play mat 1.

In step S989, the smartphone 2 transmits the scene ID to the play mat 1 together with the Write command (data writing of the play mat 1).

In step S957, the play mat 1 receives the Write command and the scene ID transmitted from the smartphone 2.

In step S958, the play mat 1 executes the Write command and writes the scene ID into the NFC IC 84.

In step S959, the play mat 1 transmits information indicating that the writing has been completed to the smartphone 2.

In step S990, the smartphone 2 receives the information transmitted from the play mat 1.

In step S991, the smartphone 2 presents the owner the scene ID.

In step S962, the owner confirms the scene ID displayed on the display of the smartphone 2.

The participant registration is performed when each user who becomes the participant receives, from the owner, the card 3 in which the scene ID is written, and holding the card 3 over his/her own play mat 1. After the participant registration is performed, a battle takes place.

Winner Input Processing

Figure 43:
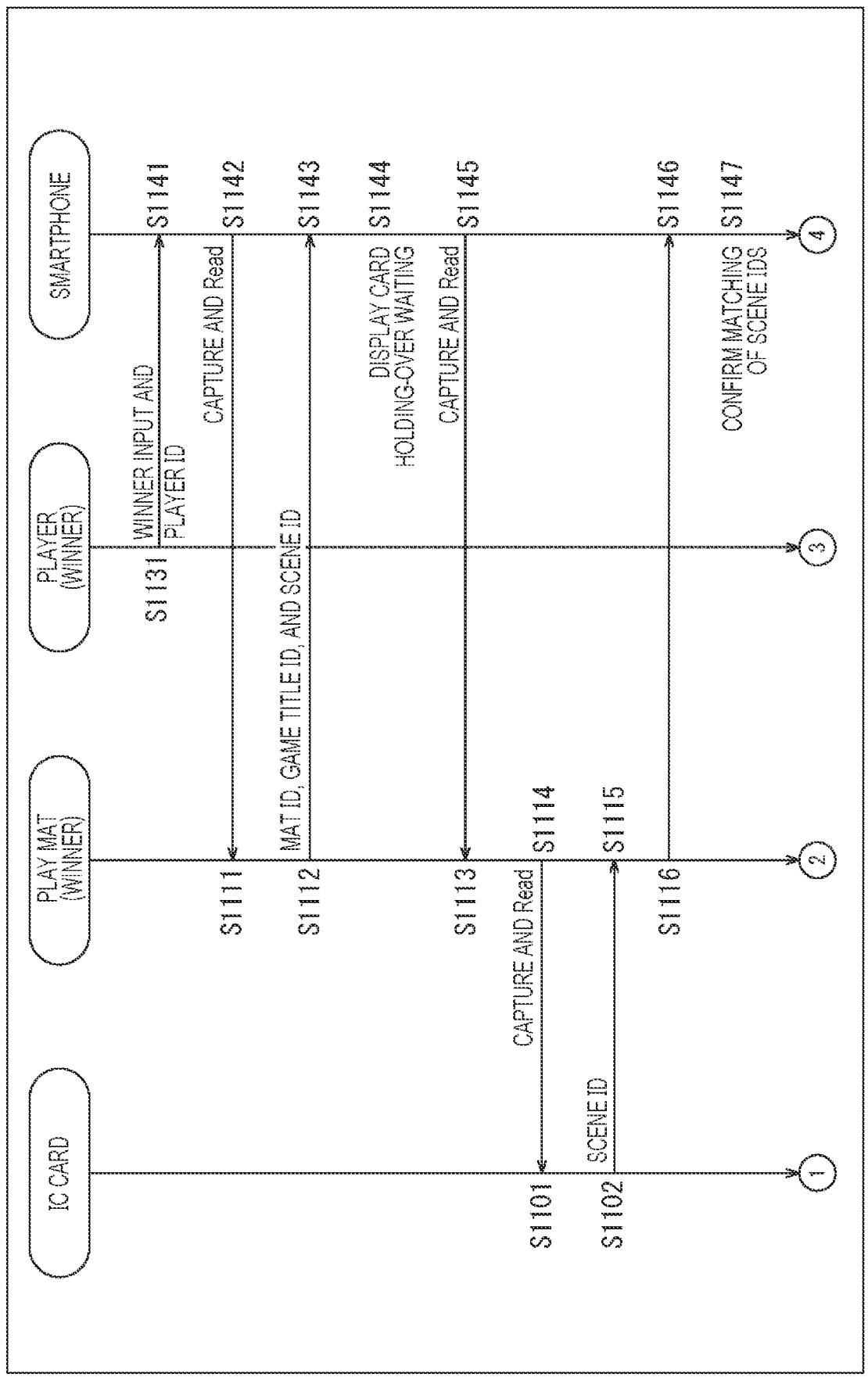
FIG. 43 is a flowchart explaining winner input processing.
Figure 44:
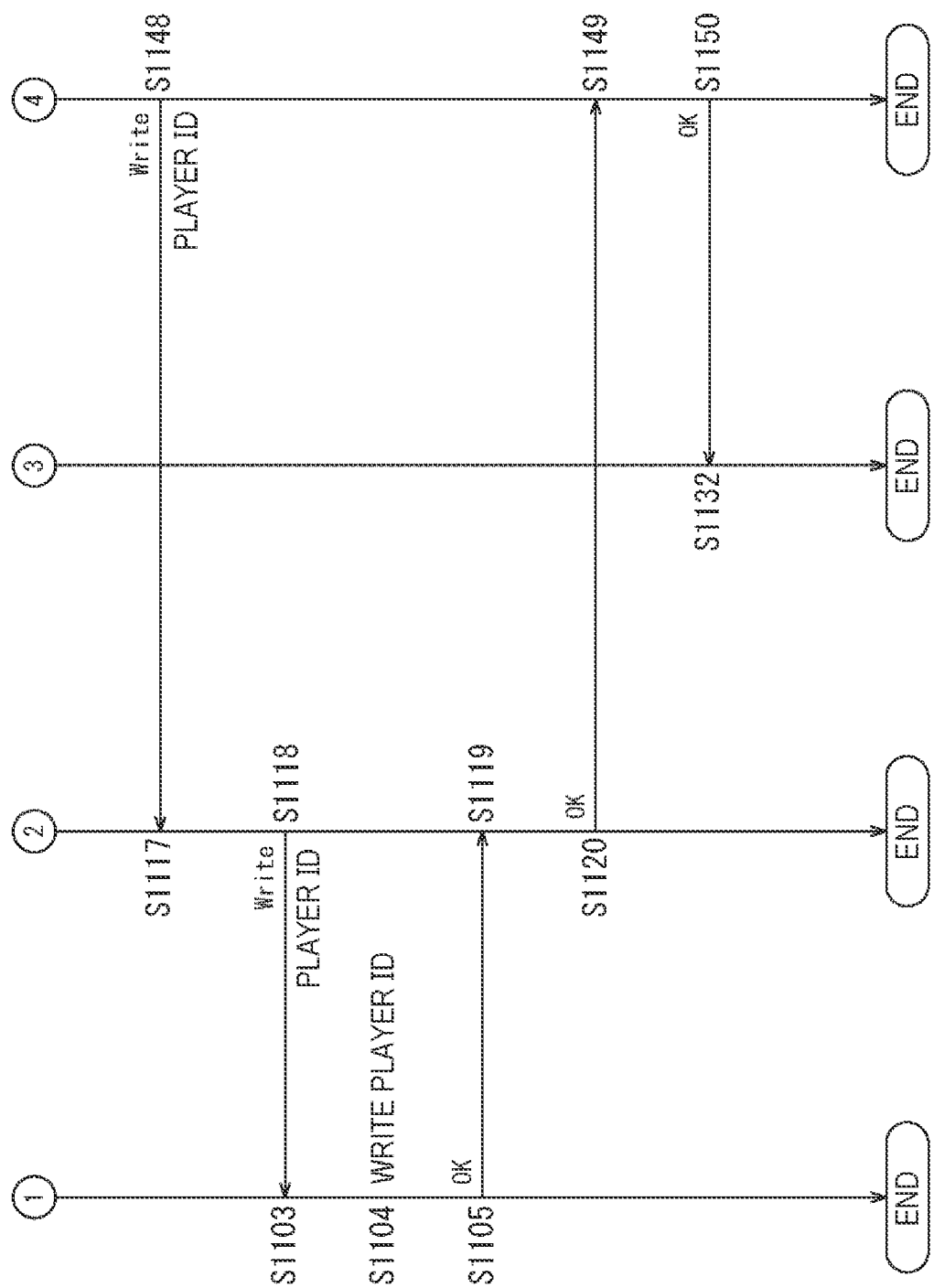
FIG. 44 is a flowchart explaining winner input processing.

FIGS. 43 and 44 are flowcharts explaining the winner input processing.

As described with reference to FIG. 21, in a case where the win or lose of the game is determined, information indicating the winner is written in the cards 3 by the winner.

In response to the operation of the player who is the winner, the processing shown in FIGS. 43 and 44 is performed among the play mat 1, the smartphone 2, and the card 3 of the winner.

In step S1131, the winner uses the smartphone 2 to perform an operation for inputting his/her player ID as information of the winner.

In step S1141, the smartphone 2 receives the operation by the winner.

In step S1142, the smartphone 2 captures the play mat 1 and transmits the Read command.

In step S1111, the play mat 1 receives the Read command transmitted from the smartphone 2.

In step S1112, the play mat 1 transmits the mat ID, the game title ID, and the scene ID to the smartphone 2 in response to the Read command.

In step S1143, the smartphone 2 receives the mat ID, the game title ID, and the scene ID transmitted from the play mat 1.

In step S1144, the smartphone 2 displays the card holding-over waiting screen. The card holding-over waiting screen displayed here is a screen for guiding the winner to hold the card 3 over the play mat 1.

When the card 3 is held over, in step S1145, the smartphone 2 captures the play mat 1 and transmits the Read command.

In step S1113, the play mat 1 receives the Read command transmitted from the smartphone 2.

In step S1114, the play mat 1 captures the card 3 and transmits the Read command.

In step S1101, the card 3 receives the Read command transmitted from the play mat 1.

In step S1102, the card 3 transmits the scene ID to the play mat 1 in response to the Read command.

In step S1115, the play mat 1 receives the scene ID transmitted from the card 3.

In step S1116, the play mat 1 transmits the scene ID read from the card 3 to the smartphone 2.

In step S1146, the smartphone 2 receives the scene ID transmitted from the play mat 1.

In step S1147, the smartphone 2 confirms whether or not the scene ID read from the play mat 1 (step S1143) matches the scene ID read from the card 3.

In a case where it is confirmed that the both scene IDs match, in step S1148 of FIG. 44, the smartphone 2 transmits, to the play mat 1, the player ID input by the winner, together with the Write command (data writing of the card 3).

In step S1117, the play mat 1 receives the Write command (data writing of the card 3) and the player ID transmitted from the smartphone 2.

In step S1118, the play mat 1 transmits the player ID to the card 3 together with the Write command (data writing of the card 3).

In step S1103, the card 3 receives the Write command and the player ID transmitted from the play mat 1.

In step S1104, the card 3 executes the Write command and writes the player ID into the IC chip.

In step S1105, the card 3 transmits information indicating that the writing has been completed to the play mat 1.

In step S1119, the play mat 1 receives the information transmitted from the card 3.

In step S1120, the play mat 1 transmits, to the smartphone 2, information indicating that the writing of the player ID has been completed in the card 3.

In step S1149, the smartphone 2 receives the information transmitted from the play mat 1.

In step S1150, the smartphone presents the winner that the writing has been completed.

In step S1132, the winner confirms the information displayed on the display of the smartphone 2.

The battle is continuously played by the winner of each venue who gathered at the next venue holding the card 3 on which the player ID is written by the above processing.

Winner Confirmation Processing

Figure 45:
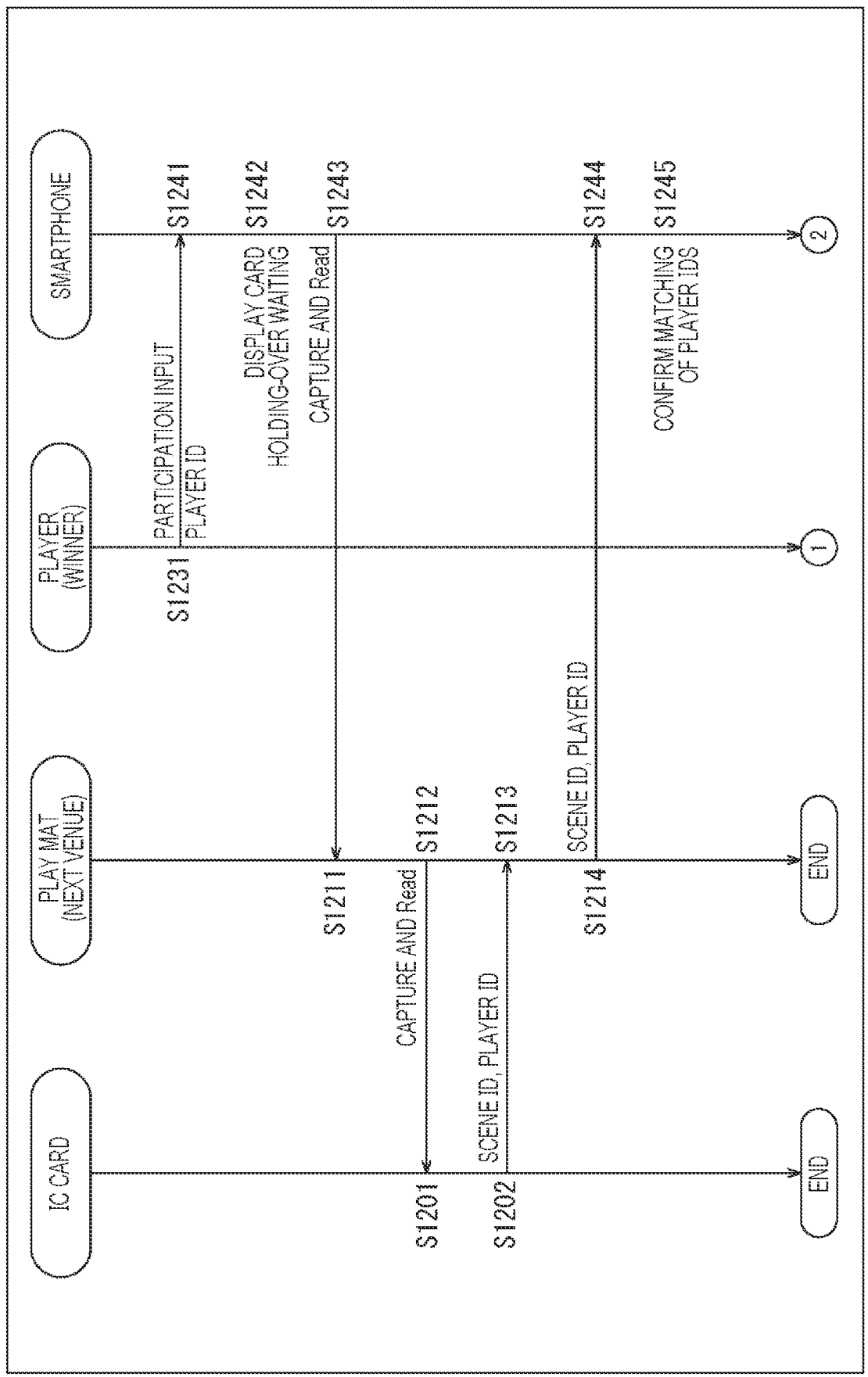
FIG. 45 is a flowchart explaining winner confirmation processing.
Figure 46:
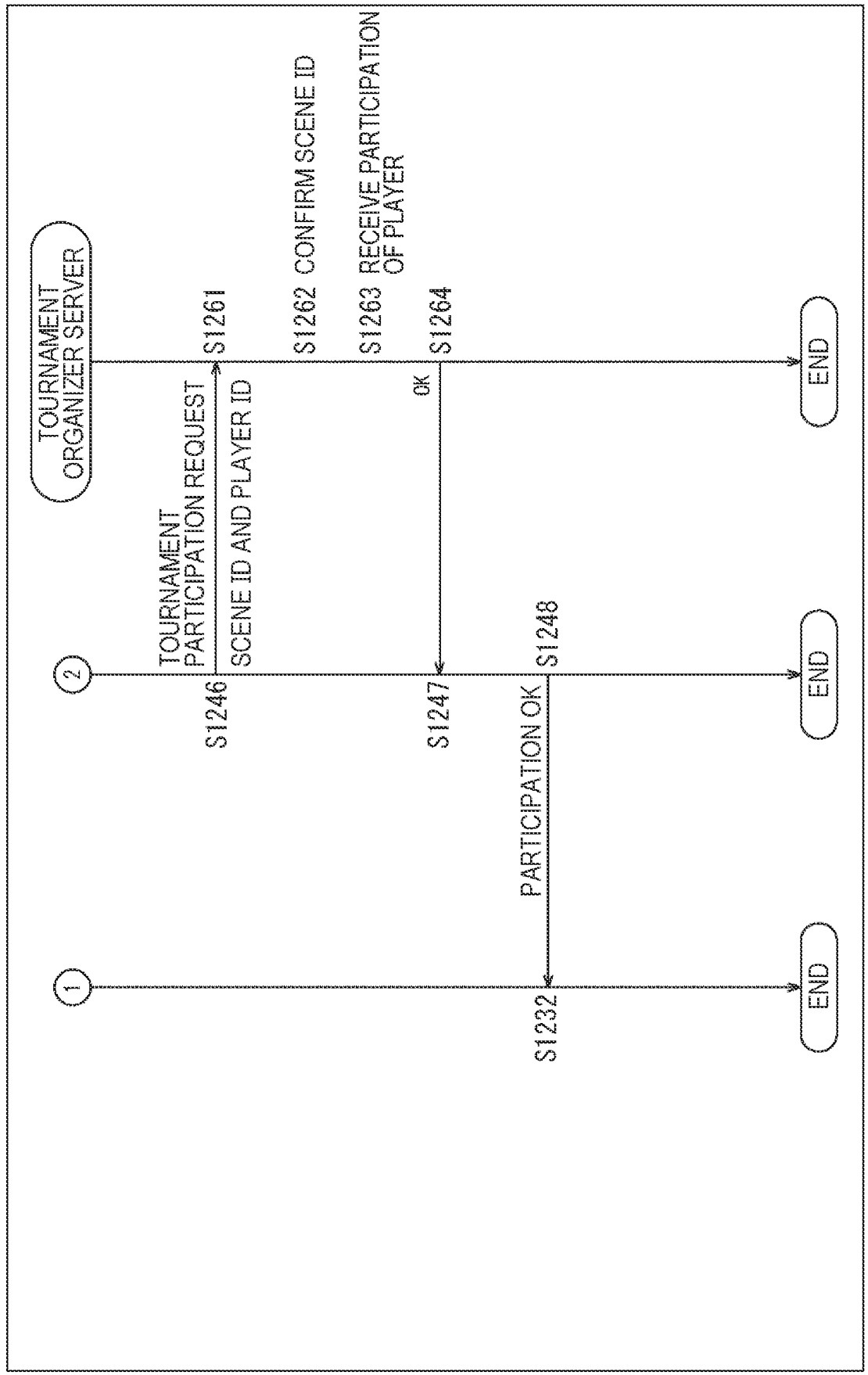
FIG. 46 is a flowchart explaining winner confirmation processing.

FIGS. 45 and 46 are flowcharts explaining the winner confirmation processing.

Before the start of the battle at the next venue such as the venue of the final, it is confirmed whether or not the user gathered at the venue is the winner in a previous venue. The battle is played by the users who are confirmed to be the winners at the previous venues.

In response to the operation of the player gathered at the next venue as the winner, the processing shown in FIGS. 45 and 46 is performed among the play mat 1 prepared at the next venue, the smartphone 2, the card 3, and the game management server 12 operating as the tournament organizer server.

In step S1231, the player gathered as the winner performs an operation for inputting his/her player ID using the smartphone 2.

In step S1241, the smartphone 2 receives an operation by the player.

In step S1242, the smartphone 2 displays the card holding-over waiting screen. The card holding-over waiting screen displayed here is a screen for guiding the player to hold the card 3 on which the player ID of the winner of the previous venue is written over the play mat 1.

When the card 3 is held over, in step S1243, the smartphone 2 captures the play mat 1 and transmits the Read command.

In step S1211, the play mat 1 receives the Read command transmitted from the smartphone 2.

In step S1212, the play mat 1 transmits the Read command to the card 3.

In step S1201, the card 3 receives the Read command transmitted from the play mat 1.

In step S1202, the card 3 transmits the scene ID and the player ID to the smartphone 2 in response to the Read command.

In step S1213, the play mat 1 receives the scene ID and the player ID transmitted from the card 3.

In step S1214, the play mat 1 transmits, to the smartphone 2, the scene ID and the player ID read from the card 3.

In step S1244, the smartphone 2 receives the scene ID and the player ID transmitted from the play mat 1.

In step S1245, the smartphone 2 confirms whether or not the player ID input by the player gathered as the winner matches the player ID read from the card 3.

In a case where it is confirmed that the both player IDs match, in step S1246 of FIG. 46, the smartphone 2 transmits the scene ID and the player ID, and requests participation in the tournament to the tournament organizer server.

In step S1261, the tournament organizer server receives the tournament participation request transmitted from the smartphone 2. A scene ID and a player ID are added to the tournament participation request.

In step S1262, the tournament organizer server confirms the scene ID transmitted from the smartphone 2.

In step S1263, the tournament organizer server receives the participation of the player.

In step S1264, the tournament organizer server transmits, to the smartphone 2, information indicating that the participation reception has been completed.

In step S1247, the smartphone 2 receives the information transmitted from the tournament organizer server.

In step S1248, the smartphone 2 presents the player the information indicating that the participation reception has been completed.

In step S1232, the player confirms the information displayed on the display of the smartphone 2.

The tournament management function based on the game management information is implemented by the above processing.

<<Configuration of Each Apparatus>>
<Smartphone Configuration>

Figure 47:
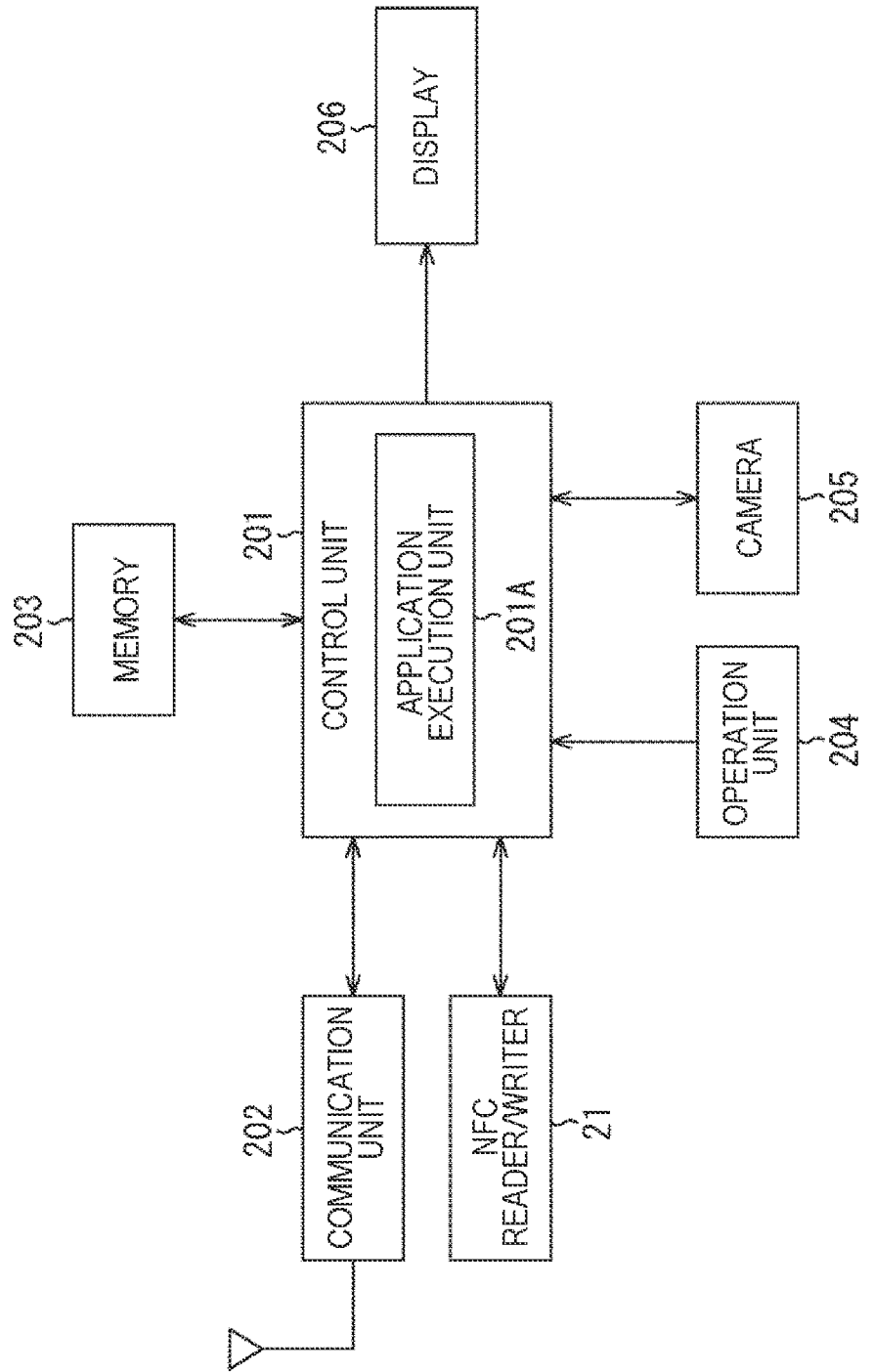
FIG. 47 is a block diagram showing a configuration example of a smartphone.

FIG. 47 is a block diagram showing a configuration example of the smartphone 2.

As shown in FIG. 47, the smartphone 2 is provided with a control unit 201, a communication unit 202, a memory 203, an operation unit 204, a camera 205, and a display 206, in addition to the NFC reader/writer 21.

The control unit 201 includes a central processing unit (CPU), a read only memory (ROM), and a random access memory (RAM). The control unit 201 controls the entire operation of the smartphone 2 by executing a predetermined program.

In the control unit 201, an application execution unit 201A is implemented. Various programs such as a game application for a card game are executed by the application execution unit 201A.

The communication unit 202 is a communication module of mobile communication such as long term evolution (LTE). The communication unit 202 communicates with an external apparatus.

The memory 203 includes a flash memory. The memory 203 stores various types of information such as game management information and a program executed by the control unit 201.

The operation unit 204 includes various buttons and a touchscreen provided to overlap the display 206. The operation unit 204 outputs, to the control unit 201 a signal indicating the content of the user operation.

The camera 205 photographs an image (moving image and still image) in response to an operation by the user.

The display 206 includes an organic EL display and an LCD. Various screens such as a card game screen are displayed on the display 206.

<Game Management Server Configuration>

Figure 48:
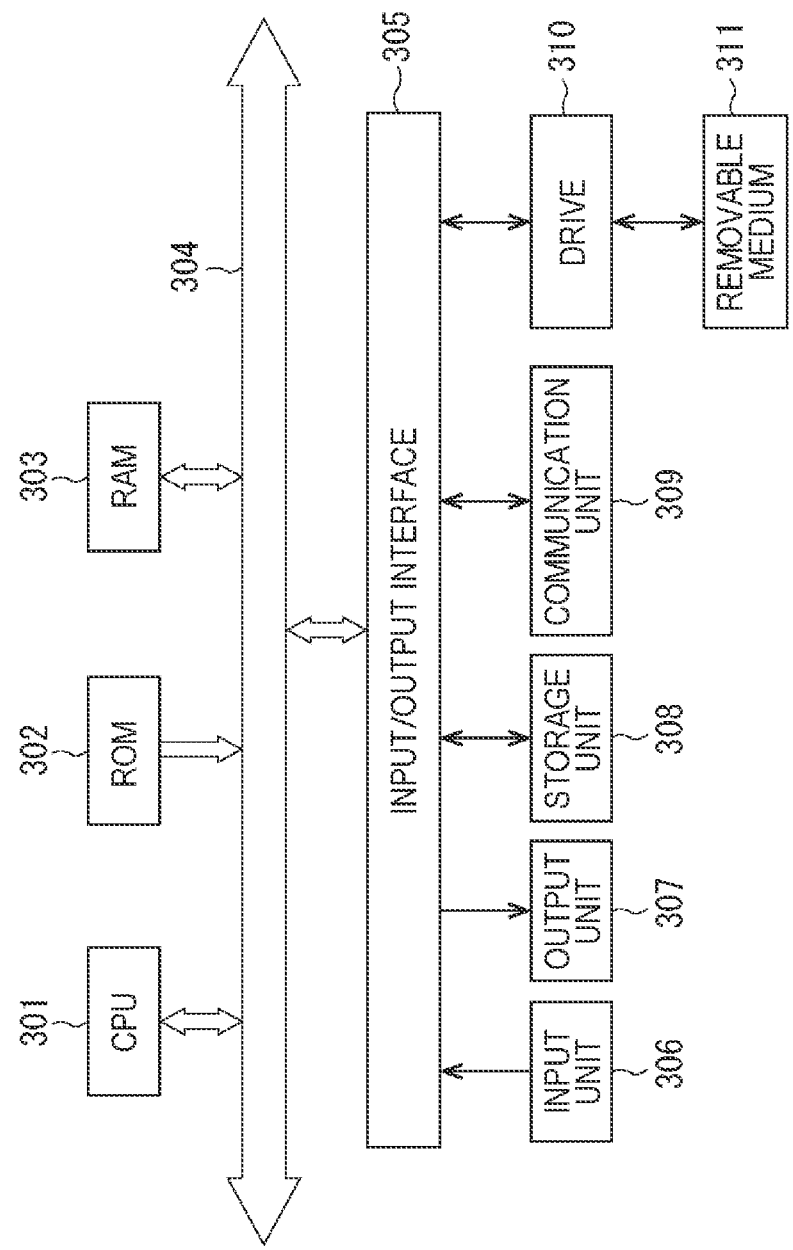
FIG. 48 is a block diagram showing a configuration example of hardware of a game management server.

FIG. 48 is a block diagram showing a configuration example of hardware of a game management server 12.

A CPU 301, a ROM 302, and a RAM 303 are connected to one another by a bus 304.

An input/output interface 305 is moreover connected to the bus 304. An input unit 306 including a keyboard and a mouse, and an output unit 307 including a display and a speaker are connected to the input/output interface 305. Furthermore, a storage unit 308 including a hard disk and a nonvolatile memory, a communication unit 309 including a network interface, and a drive 310 that drives a removable medium 311 are connected to the input/output interface 305.

Thus, the game management server 12 is an information processing apparatus including a computer.

In the computer constituting the game management server 12, the CPU 301 executes a program stored in the storage unit 308, for example, whereby the above-described series of processing is performed.

That is, the execution of the program implements, in addition to the function of managing the subscription purchase site, the function of each of the subscription issuance server, the game player issuance server, the game server, and the tournament organizer server. The CPU 301 functions as a control unit that stores, into an internal IC chip or the like, information regarding the game in association with the mat ID of the play mat 1.

All functions may be shared and implemented by a plurality of computers instead of being implemented by the game management server 12, which is one computer. For example, it is possible to provide the server that manages the subscription purchase site, the subscription issuance server, the game player issuance server, the game server, and the tournament organizer server as different servers from one another.

Others

Various types of information regarding the game associated with the mat ID may be stored in a memory provided outside the IC chip instead of being stored in a memory inside the IC chip. That is, the memory in which various types of information regarding the game are stored may be an internal memory of the IC chip or an external memory provided separately from the IC chip.

As described with reference to FIGS. 7 to 9, in the game management information, various types of information regarding the game such as the game title ID, the player ID of the owner, the result history, the scene ID, the player ID of the player participating in the game, the ID of the smartphone 2, and the card ID of the card 3 used in the game are managed in association with the mat ID. Not all the information but at least any of the information may be managed in association with the mat ID.

Furthermore, the subscription information, the point information, the information of the mat attribute and the scene attribute, and the information on the winner (player ID) can also be managed in association with the mat ID by combining two or more pieces of information.

<Program>

The above-described series of processing can be executed by hardware and can be executed by software. In a case where the series of processing is executed by software, a program constituting the software is installed from a program recording medium to a computer incorporated in dedicated hardware, a general-purpose personal computer, or the like.

The program to be installed is recorded in the removable medium 311 shown in FIG. 48 including an optical disk (compact disc-read only memory (CD-ROM)), (digital versatile disc (DVD)), and the like), and a semiconductor memory, and provided. Furthermore, the program may be provided via a wired or wireless transmission medium such as a local area network, the Internet, or digital broadcasting. The program can be installed in advance in the ROM 302 or the storage unit 308.

Note that the program executed by the computer may be a program in which processing is performed in time series along the order explained in the present description, or may be a program in which processing is performed in parallel or at a necessary timing such as when a call is made.

In the present description, a system means a set of a plurality of components (apparatuses, modules (parts), and so on), and it does not matter whether or not all the components are in the same casing. Therefore, a plurality of apparatuses housed in separate casings and connected via a network and one apparatus in which a plurality of modules is housed in one casing are both systems.

The effects described in the present description are merely examples and are not limited, and other effects may exist.

The embodiment of the present technology is not limited to the above-described embodiment, and various modifications can be made without departing from the gist of the present technology.

For example, the present technology can have a configuration of cloud computing in which one function is shared by a plurality of apparatuses via a network and is processed in cooperation.

Furthermore, each step explained in the above-described flowcharts can be executed by one apparatus or executed by a plurality of apparatuses in a shared manner.

Moreover, in a case where one step includes a plurality of processing, the plurality of processing included in the one step can be executed by one apparatus or executed by a plurality of apparatuses in a shared manner.

<Configuration Combination Example>

The present technology can also have the following configurations.

(1)
A game mat including:
a mobile terminal antenna that receives a radio wave output by a reader/writer of a mobile terminal that communicates with a server that manages a game using an IC card;
an IC card antenna that communicates with the IC card including an IC chip for an IC card in which reading/writing of data is performed contactlessly by a command transmitted from the reader/writer;
a memory that stores a mat ID, which is identification information of a mat; and
an internal IC chip that receives a command transmitted from the reader/writer and stores, into the memory in association with the mat ID, information regarding the game transmitted from the server.

(2)
The game mat according to (1) including
a plurality of the IC card antennas.

(3)
The game mat according to (2), in which
a section representing a placement space of the mobile terminal is formed at a position of a surface of the game mat corresponding to a position of the mobile terminal antenna, and
a section representing a placement space of the IC card is formed at a position of the surface corresponding to a position of each of the plurality of IC card antennas.

(4)
The game mat according to any of (1) to (3), in which
the internal IC chip stores, in the memory in association with the mat ID, at least any of an ID of the game, an ID of an owner of the game mat, a result of the game, an ID of a scene in the game played using the game mat, an ID of a player participating in the game, an ID of the mobile terminal, and an ID of the IC card used in the game.

(5)
The game mat according to (4), in which
the internal IC chip stores, in the memory in association with the mat ID, an ID of each of a plurality of players participating in the game played using the game mat.

(6)
The game mat according to (4), in which
the internal IC chip stores, in the memory in association with the mat ID, an ID of each of a plurality of the IC cards used in the game.

(7)
The game mat according to any of (1) to (6), in which
the internal IC chip stores, in the memory in association with the mat ID, information regarding a subscription for enabling an option function of the game.

(8)
The game mat according to any of (1) to (6), in which
the internal IC chip stores, in the memory in association with the mat ID, information regarding a point issued as a reward for the game.

(9)
The game mat according to any of (1) to (6), in which
the internal IC chip stores, in the memory in association with the mat ID, information regarding an attribute of the game mat.

(10)

The game mat according to any of (1) to (6), in which the internal IC chip stores, in the memory in association with the mat ID, an ID of a winner of the game.

(11)

An information processing method in which a game mat including a mobile terminal antenna that receives a radio wave output by a reader/writer of a mobile terminal that communicates with a server that manages a game using an IC card, an internal IC chip in which a mat ID, which is identification information, is set, an IC card antenna that communicates with the IC card including an IC chip for an IC card in which reading/writing of data is performed contactlessly by a command transmitted from the reader/writer, a memory that stores a mat ID, which is identification information of a mat, and an internal IC chip receives a command transmitted from the reader/writer and stores, into the memory in association with the mat ID, information regarding the game transmitted from the server.

(12)

An information processing apparatus including:

a communication unit that transmits information regarding a game using an IC card to a mobile terminal equipped with a reader/writer placed on a game mat including a mobile terminal antenna that receives a radio wave output by the reader/writer of the mobile terminal that communicates with a server that manages a game using the IC card, an IC card antenna that communicates with the IC card including an IC chip for an IC card in which reading/writing of data is performed contactlessly by a command transmitted from the reader/writer, a memory that stores a mat ID, which is identification information of a mat, and an internal IC chip; and a control unit that stores information regarding the game in the memory of the game mat in association with the mat ID.

(13)

The information processing apparatus according to (12), in which the control unit causes the memory to store, in association with the mat ID, at least any of an ID of the game, an ID of an owner of the game mat, a result of the game, an ID of a scene in the game played using the game mat, an ID of a player participating in the game, an ID of the mobile terminal, and an ID of the IC card used in the game.

(14)

The information processing apparatus according to (12) or (13), in which the control unit causes the memory to store, in association with the mat ID, information regarding a subscription for enabling an option function of the game.

(15)

The information processing apparatus according to (12) or (13), in which the control unit causes the memory to store, in association with the mat ID, information regarding a point issued as a reward for the game.

(16)

The information processing apparatus according to (12) or (13), in which the control unit causes the memory to store, in association with the mat ID, information regarding an attribute of the game mat.

(17)

The information processing apparatus according to (12) or (13), in which the control unit causes the memory to store, in association with the mat ID, an ID of a winner of the game.

(18)

An information processing method in which an information processing apparatus transmits information regarding a game using an IC card to a mobile terminal equipped with a reader/writer placed on a game mat including a mobile terminal antenna that receives a radio wave output by the reader/writer of the mobile terminal that communicates with a server that manages a game using the IC card, an IC card antenna that communicates with the IC card including an IC chip for an IC card in which reading/writing of data is performed contactlessly by a command transmitted from the reader/writer, a memory that stores a mat ID, which is identification information of a mat, and an internal IC chip, and stores information regarding the game in the memory of the game mat in association with the mat ID.

REFERENCE SIGNS LIST

1 Play mat
2 Smartphone
3 Card
12 Game management server
21 NFC reader/writer
51 Control circuit
52 Smartphone antenna
71-1, 71-2 IC card antenna
84 NFC IC

The invention claimed is:

1. A game mat comprising:

a mobile terminal antenna configured to receive a radio wave output by a reader/writer of a mobile terminal that communicates with a server that manages a game using an IC card;

an IC card antenna configured to communicate with the IC card including an IC chip in which reading/writing of data is performed contactlessly by a command transmitted from the reader/writer;

a memory configured to store a mat ID, which is identification information of the game mat; and an internal IC chip configured to receive a command transmitted from the reader/writer, and store, into the memory in association with the mat ID, information regarding the game transmitted from the server, the stored information including an ID of a scene in the game played using the game mat.

2. The game mat according to claim 1, further comprising:
a plurality of IC card antennas.

3. The game mat according to claim 2, wherein
a section representing a placement space of the mobile terminal is formed at a position of a surface of the game mat corresponding to a position of the mobile terminal antenna, and
a section representing a placement space of the IC card is formed at a position of the surface corresponding to a position of each of the plurality of IC card antennas.

4. The game mat according to claim 1, wherein
the internal IC chip is further configured to store, in the memory in association with the mat ID, at least one of an ID of the game, an ID of an owner of the game mat, a result of the game, an ID of a player participating in the game, an ID of the mobile terminal, or an ID of the IC card used in the game.

5. The game mat according to claim 4, wherein
the internal IC chip stores, in the memory in association with the mat ID, an ID of each of a plurality of players participating in the game played using the game mat.

6. The game mat according to claim 4, wherein
the internal IC chip stores, in the memory in association with the mat ID, an ID of each of a plurality of the IC cards used in the game.

7. The game mat according to claim 1, wherein
the internal IC chip stores, in the memory in association with the mat ID, information regarding a subscription for enabling an option function of the game.

8. The game mat according to claim 1, wherein
the internal IC chip stores, in the memory in association with the mat ID, information regarding a point issued as a reward for the game.

9. The game mat according to claim 1, wherein
the internal IC chip stores, in the memory in association with the mat ID, information regarding an attribute of the game mat.

10. The game mat according to claim 1, wherein
the internal IC chip stores, in the memory in association with the mat ID, an ID of a winner of the game.

11. An information processing method wherein
a game mat including
a mobile terminal antenna configured to receive a radio wave output by a reader/writer of a mobile terminal that communicates with a server that manages a game using an IC card,
an IC card antenna configured to communicate with the IC card including an IC chip in which reading/writing of data is performed contactlessly by a command transmitted from the reader/writer,
a memory configured to store a mat ID, which is identification information of the game mat, and
an internal IC chip configured to
receive a command transmitted from the reader/writer and
store, into the memory in association with the mat ID, information regarding the game transmitted from the server, the stored information including an ID of a scene in the game played using the game mat.

12. An information processing apparatus comprising:
a communication unit configured to transmit information regarding a game using an IC card to a mobile terminal equipped with a reader/writer placed on a game mat including
a mobile terminal antenna configured to receive a radio wave output by the reader/writer of the mobile terminal that communicates with a server that manages a game using the IC card,
an IC card antenna configured to communicate with the IC card including an IC chip in which reading/writing of data is performed contactlessly by a command transmitted from the reader/writer,
a memory that stores a mat ID, which is identification information of the game mat, and
an internal IC chip; and
a control unit configured to cause information regarding the game to be stored in the memory of the game mat in association with the mat ID, the stored information including an ID of a scene in the game played using the game mat,
wherein the communication unit and the control unit are each implemented via at least one processor.

13. The information processing apparatus according to claim 12, wherein
the control unit causes the memory to store, in association with the mat ID, at least one of an ID of the game, an ID of an owner of the game mat, a result of the game, an ID of a player participating in the game, an ID of the mobile terminal, and an ID of the IC card used in the game.

14. The information processing apparatus according to claim 12, wherein
the control unit causes the memory to store, in association with the mat ID, information regarding a subscription for enabling an option function of the game.

15. The information processing apparatus according to claim 12, wherein
the control unit causes the memory to store, in association with the mat ID, information regarding a point issued as a reward for the game.

16. The information processing apparatus according to claim 12, wherein
the control unit causes the memory to store, in association with the mat ID, information regarding an attribute of the game mat.

17. The information processing apparatus according to claim 12, wherein
the control unit causes the memory to store, in association with the mat ID, an ID of a winner of the game.

18. An information processing method, executed by an information processing apparatus, the method comprising:
transmitting information regarding a game using an IC card to a mobile terminal equipped with a reader/writer placed on a game mat including
a mobile terminal antenna configured to receive a radio wave output by the reader/writer of the mobile terminal that communicates with a server that manages a game using the IC card,
an IC card antenna configured to communicate with the IC card including an IC chip in which reading/writing of data is performed contactlessly by a command transmitted from the reader/writer,
a memory configured to store a mat ID, which is identification information of the game mat, and
an internal IC chip; and
storing information regarding the game in the memory of the game mat in association with the mat ID, the stored information including an ID of a scene in the game played using the game mat.

* * * * *